(12) United States Patent
Nelson et al.

(10) Patent No.: US 10,974,595 B2
(45) Date of Patent: *Apr. 13, 2021

(54) ALL TERRAIN VEHICLE

(71) Applicant: Polaris Industries Inc., Medina, MN (US)

(72) Inventors: Stephen L. Nelson, Osceola, WI (US); Jeffrey D. Bennett, Roseau, MN (US); Daniel E. Erickson, Manitoba (CA); Benjamin J. Dieter, Roseau, MN (US); John D. Schreier, Lindstrom, MN (US); Louis J. Brady, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,066

(22) Filed: Nov. 15, 2019

(65) Prior Publication Data

US 2020/0079211 A1    Mar. 12, 2020

Related U.S. Application Data

(63) Continuation of application No. 15/795,755, filed on Oct. 27, 2017, now Pat. No. 10,493,846, which is a
(Continued)

(51) Int. Cl.
*B60K 17/22* (2006.01)
*B60G 3/20* (2006.01)
(Continued)

(52) U.S. Cl.
CPC ............ *B60K 17/22* (2013.01); *B60G 3/20* (2013.01); *B60K 5/02* (2013.01); *B60K 17/08* (2013.01);
(Continued)

(58) Field of Classification Search
CPC . B62J 25/00; B60B 3/16; B60B 3/142; B60G 3/20; B60G 2300/124;
(Continued)

(56) References Cited

U.S. PATENT DOCUMENTS 741,211 A     10/1903   Abrahamovitz
939,194 A     11/1909   Hayes
(Continued)

FOREIGN PATENT DOCUMENTS

AT     242150      6/2003
CA     1150752     7/1983
(Continued)

OTHER PUBLICATIONS

Article 34 Amendment filed with the United States Patent Office, dated Nov. 15, 2010, for International Patent Application No. PCT/US2009/066110; 9 pages.
(Continued)

*Primary Examiner* — Paul N Dickson
*Assistant Examiner* — Timothy Wilhelm
(74) *Attorney, Agent, or Firm* — Faegre Drinker Biddle & Reath LLP

(57) ABSTRACT

An all-terrain vehicle including a frame having longitudinally-spaced ends defining a first longitudinal axis, and an engine supported by the frame. The engine includes a crankshaft defining a second longitudinal axis substantially parallel to the first longitudinal axis.

18 Claims, 40 Drawing Sheets

Related U.S. Application Data continuation of application No. 14/570,843, filed on Dec. 15, 2014, now Pat. No. 10,457,140, which is a continuation of application No. 14/095,829, filed on Dec. 3, 2013, now Pat. No. 9,587,689, which is a continuation of application No. 12/272,377, filed on Nov. 17, 2008, now Pat. No. 8,596,398, which is a continuation-in-part of application No. 12/069,515, filed on Feb. 11, 2008, now Pat. No. 7,845,452.

(60) Provisional application No. 60/930,361, filed on May 16, 2007.

(51) Int. Cl.
  B62K 5/01   (2013.01)
  B60T 1/06   (2006.01)
  B60K 5/02   (2006.01)
  B60K 17/08  (2006.01)
  *F16D 65/12*    (2006.01)
  *B62J 25/00*    (2020.01)
  *B62K 5/00*     (2013.01)

(52) U.S. Cl.
  CPC .......... B60T 1/065 (2013.01); B62K 5/01 (2013.01); *B60G 2200/144* (2013.01); *B60G 2300/124* (2013.01); *B62J 25/00* (2013.01); *B62K 2005/001* (2013.01); *F16D 65/123* (2013.01)

(58) Field of Classification Search
  CPC ........ B60G 2200/144; B62K 2005/001; B62K 5/01; B62K 17/354; B62K 17/348; F16H 57/0489; F16H 9/18; F16H 37/0846; B62D 21/02; B60Y 2200/124
  See application file for complete search history.

(56) References Cited

U.S. PATENT DOCUMENTS

| | | |
|---|---|---|
| 1,006,083 A | 10/1911 | Haight |
| 2,834,608 A | 5/1958 | Wixson |
| 3,336,994 A | 8/1967 | Pederson |
| RE26,775 E | 1/1970 | Smieja |
| 3,521,904 A * | 7/1970 | Sheffer ............... B62K 25/283 |
| | | 280/270 |
| 3,527,505 A | 9/1970 | Hetteen |
| 3,545,821 A | 12/1970 | Erickson |
| 3,578,095 A | 5/1971 | Hauser |
| 3,630,301 A | 12/1971 | Henricks |
| 3,684,045 A | 8/1972 | Samuelson |
| 3,688,856 A | 9/1972 | Boehm |
| 3,705,749 A | 12/1972 | Harvey |
| 3,709,312 A | 1/1973 | Gough |
| 3,718,341 A | 2/1973 | Westberg |
| 3,719,369 A | 3/1973 | Savage |
| 3,779,326 A | 12/1973 | Trautwein |
| 3,809,172 A | 5/1974 | Hendrickson |
| 3,822,755 A | 7/1974 | Hine |
| 3,840,082 A | 10/1974 | Olson |
| 3,844,367 A | 10/1974 | Flohr |
| 3,857,578 A | 12/1974 | Alton |
| RE28,423 E | 5/1975 | Higginbotham |
| 3,933,213 A | 1/1976 | Trowbridge |
| 3,964,561 A | 6/1976 | Lunzer |
| 3,969,895 A | 7/1976 | Krizman |
| RE28,922 E | 8/1976 | Lloyd, III |
| 3,977,485 A | 8/1976 | West |
| 3,977,493 A | 8/1976 | Richardson |
| 3,982,597 A | 9/1976 | Callaway |
| 4,034,820 A | 7/1977 | Barnhardt |
| 4,106,751 A | 8/1978 | Niskin |
| 4,131,292 A | 12/1978 | Swech |
| 4,193,322 A | 3/1980 | Morino |
| 4,222,453 A | 9/1980 | Fixsen |
| 4,244,436 A | 1/1981 | Condon |
| 4,339,156 A | 7/1982 | Livesay |
| 4,392,394 A | 7/1983 | Hofbauer |
| 4,407,386 A | 10/1983 | Yasui |
| 4,424,979 A | 1/1984 | Takagi |
| 4,434,867 A | 3/1984 | Grinde |
| 4,437,534 A | 3/1984 | Grinde |
| 4,442,913 A | 4/1984 | Grinde |
| 4,449,602 A | 5/1984 | Dittmann, Jr. |
| 4,502,560 A | 3/1985 | Hisatomi |
| 4,509,766 A | 4/1985 | Yasui |
| 4,526,249 A | 7/1985 | Parker |
| 4,585,429 A | 4/1986 | Marier |
| 4,600,074 A | 7/1986 | Watanabe |
| 4,613,006 A | 9/1986 | Moss |
| 4,644,208 A | 2/1987 | Laing |
| 4,666,015 A | 5/1987 | Matsuda |
| 4,696,148 A | 9/1987 | Brace |
| 4,697,665 A | 10/1987 | Eastman |
| 4,712,629 A | 12/1987 | Takahashi |
| 4,722,235 A | 2/1988 | Kumazawa |
| 4,736,809 A | 4/1988 | Kumazawa |
| 4,768,794 A | 9/1988 | Bibollet |
| 4,770,262 A * | 9/1988 | Yasunaga ............... B60K 11/06 |
| | | 123/41.65 |
| 4,782,912 A | 11/1988 | Wandless |
| 4,784,017 A | 11/1988 | Johnshoy |
| 4,786,075 A * | 11/1988 | Takahashi ............... B60G 3/24 |
| | | 180/254 |
| 4,804,198 A | 2/1989 | Imai |
| 4,858,722 A | 8/1989 | Abbe |
| 4,917,207 A | 4/1990 | Yasui |
| 4,938,098 A | 7/1990 | Sasaki |
| 4,987,965 A | 1/1991 | Bourret |
| 5,036,939 A | 8/1991 | Johnson |
| 5,060,745 A | 10/1991 | Yasui |
| 5,064,208 A | 11/1991 | Bibollet |
| 5,152,361 A | 10/1992 | Hasegawa |
| 5,152,365 A | 10/1992 | Aoshima |
| 5,203,424 A | 4/1993 | Gogo |
| 5,370,198 A | 12/1994 | Karpik |
| 5,406,154 A | 4/1995 | Kawaguchi |
| 5,474,146 A | 12/1995 | Yoshioka |
| 5,480,001 A * | 1/1996 | Hara ....................... B62K 11/04 |
| | | 180/219 |
| 5,514,047 A | 5/1996 | Tibbles |
| 5,586,614 A | 12/1996 | Kouchi |
| 5,660,245 A | 8/1997 | Marier |
| 5,692,759 A | 12/1997 | Flynn |
| 5,697,332 A | 12/1997 | Asai |
| 5,708,238 A | 1/1998 | Asao |
| 5,727,643 A | 3/1998 | Kawano |
| 5,860,486 A | 1/1999 | Boivin |
| 5,904,217 A | 5/1999 | Yamamoto |
| 5,947,217 A | 9/1999 | Snare |
| 5,954,148 A | 9/1999 | Okumura |
| 5,967,286 A | 10/1999 | Hokanson |
| 5,967,633 A | 10/1999 | Jung |
| 5,975,624 A * | 11/1999 | Rasidescu ............ B62D 21/183 |
| | | 180/311 |
| 6,012,728 A | 1/2000 | Noble |
| 6,017,047 A | 1/2000 | Hoose |
| 6,070,683 A | 6/2000 | Izumi |
| 6,079,385 A | 6/2000 | Wicke |
| 6,095,275 A | 8/2000 | Shaw |
| 6,105,979 A | 8/2000 | Desrochers |
| 6,112,840 A | 9/2000 | Forbes |
| 6,142,123 A | 11/2000 | Galasso |
| 6,142,498 A * | 11/2000 | Smith .................... B62K 11/04 |
| | | 180/227 |
| 6,152,253 A | 11/2000 | Monaghan |
| 6,161,908 A | 12/2000 | Takayama |
| 6,170,597 B1 * | 1/2001 | Fukuda .................. B60K 17/08 |
| | | 180/292 |
| 6,170,841 B1 * | 1/2001 | Mizuta .................... B62K 5/01 |
| | | 280/271 |
| 6,216,809 B1 | 4/2001 | Etou |
| 6,227,323 B1 | 5/2001 | Ashida |

(56) References Cited

U.S. PATENT DOCUMENTS

| | | | |
|---|---|---|---|
| 6,234,263 B1 | 5/2001 | Boivin | |
| 6,283,254 B1 | 9/2001 | Bibollet | |
| 6,302,232 B1 | 10/2001 | Forbes | |
| 6,321,864 B1 | 11/2001 | Forbes | |
| 6,343,578 B1 | 2/2002 | Kerkau | |
| 6,364,726 B1 | 4/2002 | Motose | |
| 6,378,645 B1 | 4/2002 | Uegane | |
| 6,379,411 B1 | 4/2002 | Turner | |
| 6,382,338 B1 | 5/2002 | Forbes | |
| 6,390,219 B1 | 5/2002 | Vaisanen | |
| 6,405,823 B1 | 6/2002 | Fukamachi | |
| 6,416,062 B1 | 7/2002 | Scatchard | |
| 6,431,301 B1 | 8/2002 | Forbes | |
| 6,461,208 B2 | 10/2002 | Suzuki | |
| 6,464,033 B2 | 10/2002 | Izumi | |
| 6,505,896 B1 | 1/2003 | Boivin | |
| 6,511,079 B1 | 1/2003 | Charles | |
| 6,520,284 B2 | 2/2003 | Spannbauer | |
| 6,523,634 B1 | 2/2003 | Gagnon | |
| 6,547,027 B1 | 4/2003 | Kalhok | |
| 6,551,385 B2 | 4/2003 | Turner | |
| 6,554,665 B1 | 4/2003 | Kaneko | |
| RE38,124 E | 5/2003 | Mallette | |
| 6,557,530 B1 | 5/2003 | Benson | |
| 6,568,030 B1 | 5/2003 | Watanabe | |
| 6,595,309 B1 | 7/2003 | Savage | |
| 6,622,806 B1 | 9/2003 | Matsuura | |
| 6,626,258 B1 | 9/2003 | Forbes | |
| 6,626,441 B1 | 9/2003 | Hanson | |
| 6,631,912 B2 | 10/2003 | Metheny | |
| 6,663,117 B2 | 12/2003 | Cheney | |
| 6,695,083 B2 | 2/2004 | Nakamura | |
| 6,708,791 B2 | 3/2004 | Alexander | |
| 6,715,379 B2 | 4/2004 | Miguchi | |
| 6,715,460 B2 | 4/2004 | Ashida | |
| 6,725,958 B2 | 4/2004 | Ashida | |
| 6,755,269 B1 | 6/2004 | Davis | |
| 6,755,271 B1 | 6/2004 | Berg | |
| 6,758,187 B2 | 7/2004 | Waters | |
| 6,772,864 B1 | 8/2004 | Luh | |
| 6,782,963 B2 * | 8/2004 | Hori | B60K 17/08 180/233 |
| 6,783,133 B1 | 8/2004 | Araujo | |
| 6,796,395 B1 | 9/2004 | Berg | |
| 6,799,781 B2 * | 10/2004 | Rasidescu | B62K 5/01 180/311 |
| 6,811,504 B2 | 11/2004 | Korenjak | |
| 6,820,708 B2 | 11/2004 | Nakamura | |
| 6,823,834 B2 | 11/2004 | Benson | |
| 6,823,956 B2 * | 11/2004 | Shimizu | F16H 57/0415 180/68.1 |
| 6,852,055 B2 | 2/2005 | Kmicikiewicz | |
| 6,860,826 B1 | 3/2005 | Johnson | |
| 6,863,142 B2 | 3/2005 | Corbeil | |
| 6,868,932 B1 | 3/2005 | Davis | |
| 6,896,087 B2 | 5/2005 | Korenjak | |
| 6,898,932 B2 | 5/2005 | Kajita | |
| 6,920,949 B2 * | 7/2005 | Matsuura | B60T 1/062 180/68.2 |
| 6,923,287 B2 | 8/2005 | Morii | |
| 6,926,108 B1 | 8/2005 | Polakowski | |
| 6,941,924 B2 | 9/2005 | Morii | |
| 6,942,050 B1 | 9/2005 | Honkala | |
| 6,958,024 B2 | 10/2005 | Takano | |
| 7,017,695 B2 | 3/2006 | Meunier | |
| 7,047,924 B1 | 5/2006 | Waters | |
| 7,059,440 B1 | 6/2006 | Berg | |
| 7,063,057 B1 | 6/2006 | Waters | |
| 7,063,063 B2 | 6/2006 | Morii | |
| 7,090,229 B2 | 8/2006 | Monsrud | |
| 7,114,585 B2 | 10/2006 | Man | |
| 7,140,463 B2 | 11/2006 | Morii | |
| 7,182,165 B1 | 2/2007 | Keinath | |
| 7,232,130 B2 | 6/2007 | Reeves | |
| 7,237,803 B2 | 7/2007 | Nguyen | |
| 7,249,652 B2 | 7/2007 | Wolf | |
| 7,258,192 B2 | 8/2007 | Davis | |
| 7,281,603 B2 | 10/2007 | Fukuda | |
| 7,287,619 B2 | 10/2007 | Tanaka | |
| 7,322,581 B2 | 1/2008 | Leung | |
| 7,353,898 B1 | 4/2008 | Bates, Jr. | |
| 7,357,201 B2 | 4/2008 | Jordan | |
| 7,367,420 B1 | 5/2008 | Sherrod | |
| 7,398,753 B2 | 7/2008 | Masuda | |
| 7,401,979 B2 | 7/2008 | Ando | |
| 7,444,236 B2 | 10/2008 | Wiles | |
| 7,455,141 B2 | 11/2008 | Hildebrand | |
| 7,458,354 B1 | 12/2008 | Phaneuf | |
| 7,475,748 B2 | 1/2009 | Nakamura | |
| 7,475,751 B2 | 1/2009 | Pard | |
| 7,481,437 B2 | 1/2009 | Musselman | |
| 7,506,712 B2 | 3/2009 | Kato | |
| 7,506,718 B2 | 3/2009 | Morita | |
| 7,533,749 B1 | 5/2009 | Sampson | |
| 7,540,506 B2 | 6/2009 | Cheney | |
| 7,556,576 B2 | 7/2009 | Mochizuki | |
| 7,562,736 B2 * | 7/2009 | Eguchi | B62J 35/00 180/291 |
| 7,562,753 B2 | 7/2009 | Ima | |
| 7,578,366 B2 | 8/2009 | Moji | |
| 7,588,010 B2 | 9/2009 | Mochizuki | |
| 7,594,557 B2 | 9/2009 | Polakowski | |
| 7,617,889 B2 | 11/2009 | Beccu | |
| 7,631,718 B2 | 12/2009 | Masuda | |
| 7,650,959 B2 | 1/2010 | Kato | |
| 7,665,566 B2 * | 2/2010 | Okada | B62D 5/04 180/291 |
| D612,766 S | 3/2010 | Boivin | |
| 7,694,768 B2 | 4/2010 | Giese | |
| 7,708,097 B1 | 5/2010 | Tharaldson | |
| 7,726,667 B2 | 6/2010 | Ferron | |
| 7,753,154 B2 | 7/2010 | Maltais | |
| 7,761,217 B2 | 7/2010 | Waters | |
| 7,789,183 B2 | 9/2010 | Sadakuni | |
| 7,802,646 B2 | 9/2010 | Matsudo | |
| 7,845,452 B2 * | 12/2010 | Bennett | B60B 3/142 180/233 |
| 7,854,290 B1 | 12/2010 | McKoskey | |
| 7,862,474 B2 | 1/2011 | Kimura | |
| 7,896,362 B1 | 3/2011 | Scatchard | |
| 8,002,653 B2 | 8/2011 | Shiozaki | |
| 8,007,005 B2 * | 8/2011 | Yamashita | B62K 5/01 280/785 |
| 8,127,877 B2 | 3/2012 | Fredrickson | |
| 8,157,044 B2 | 4/2012 | Bennett | |
| 8,167,073 B2 | 5/2012 | Polakowski | |
| 8,403,342 B1 | 3/2013 | McDaniel | |
| 8,418,792 B2 | 4/2013 | Rivard | |
| 8,561,744 B1 | 10/2013 | Belloso | |
| 8,596,398 B2 | 12/2013 | Bennett | |
| 8,602,159 B2 | 12/2013 | Harris | |
| 8,613,335 B2 | 12/2013 | Deckard | |
| 8,651,800 B2 | 2/2014 | Li | |
| 8,739,913 B2 | 6/2014 | Rivard | |
| 8,746,719 B2 | 6/2014 | Safranski | |
| 8,893,835 B2 | 11/2014 | Nam | |
| 8,910,738 B2 | 12/2014 | Mangum | |
| 8,950,290 B2 | 2/2015 | Dieter | |
| 9,096,289 B2 | 8/2015 | Hedlund | |
| 9,174,702 B1 | 11/2015 | Gauthier | |
| 9,506,407 B2 | 11/2016 | Blake | |
| 9,540,072 B2 | 1/2017 | Hedlund | |
| 9,587,689 B2 * | 3/2017 | Pongo | B60G 3/20 |
| 9,592,725 B2 | 3/2017 | Tiry | |
| 9,751,552 B2 | 9/2017 | Mangum | |
| 9,776,654 B2 | 10/2017 | Gentry | |
| 9,845,004 B2 | 12/2017 | Hedlund | |
| 9,873,485 B2 | 1/2018 | Mangum | |
| 9,988,067 B1 | 6/2018 | Mangum | |
| 10,202,169 B2 | 2/2019 | Mangum | |
| 10,232,910 B2 | 3/2019 | Mangum | |
| 10,293,775 B2 | 5/2019 | Wang | |
| 10,457,140 B2 | 10/2019 | Bennett | |
| 10,493,846 B2 * | 12/2019 | Bennett | B60K 5/02 |

(56) References Cited

U.S. PATENT DOCUMENTS

| | | |
|---|---|---|
| 2001/0047901 A1 | 12/2001 | Tsutsumikoshi |
| 2002/0023792 A1 | 2/2002 | Bouffard |
| 2002/0033295 A1 | 3/2002 | Korenjak |
| 2002/0129982 A1 | 9/2002 | Harle |
| 2002/0179356 A1 | 12/2002 | Morii |
| 2003/0024751 A1 | 2/2003 | Lebreux |
| 2003/0098188 A1 | 5/2003 | Gu |
| 2003/0159868 A1 | 8/2003 | Alexander |
| 2003/0172907 A1 | 9/2003 | Nytomt |
| 2003/0221890 A1 | 12/2003 | Fecteau |
| 2004/0035623 A1* | 2/2004 | Fecteau .............. B62K 5/027 180/210 |
| 2004/0040768 A1 | 3/2004 | Yamamoto |
| 2004/0041080 A1 | 3/2004 | Barna |
| 2004/0089193 A1 | 5/2004 | O'Donnell |
| 2004/0089492 A1 | 5/2004 | Eide |
| 2004/0124596 A1 | 7/2004 | Cheney |
| 2004/0163857 A1 | 8/2004 | Corbeil |
| 2004/0187826 A1 | 9/2004 | Kino |
| 2004/0195024 A1 | 10/2004 | Takahiko |
| 2004/0206568 A1 | 10/2004 | Davis |
| 2004/0262064 A1 | 12/2004 | Lefort |
| 2005/0017465 A1 | 1/2005 | Bergstrom |
| 2005/0067220 A1 | 3/2005 | Keller |
| 2005/0119076 A1 | 6/2005 | Chonan |
| 2005/0126842 A1 | 6/2005 | Rasidescu |
| 2005/0161283 A1 | 7/2005 | Emler |
| 2005/0173177 A1 | 8/2005 | Smith |
| 2005/0173918 A1* | 8/2005 | Eguchi ................ B62J 35/00 280/834 |
| 2005/0199432 A1 | 9/2005 | Abe |
| 2005/0199433 A1 | 9/2005 | Abe |
| 2005/0205319 A1 | 9/2005 | Yatagai |
| 2005/0205320 A1 | 9/2005 | Girouard |
| 2005/0225067 A1 | 10/2005 | Nguyen |
| 2005/0252592 A1 | 11/2005 | Albright |
| 2005/0252705 A1 | 11/2005 | Abe |
| 2005/0269141 A1 | 12/2005 | Davis |
| 2005/0279552 A1 | 12/2005 | Schuehmacher |
| 2006/0032692 A1 | 2/2006 | Ima |
| 2006/0032700 A1 | 2/2006 | Vizanko |
| 2006/0049006 A1 | 3/2006 | Hasegawa |
| 2006/0058138 A1 | 3/2006 | Morita |
| 2006/0058143 A1 | 3/2006 | Rickling |
| 2006/0085966 A1 | 4/2006 | Kerner |
| 2006/0175106 A1 | 8/2006 | Vaisanen |
| 2006/0180370 A1 | 8/2006 | Polakowski |
| 2006/0199449 A1 | 9/2006 | Longdill |
| 2006/0232028 A1 | 10/2006 | Pard |
| 2006/0236980 A1 | 10/2006 | Maruo |
| 2007/0000713 A1 | 1/2007 | Mir |
| 2007/0017480 A1 | 1/2007 | Kondo |
| 2007/0023219 A1 | 2/2007 | Aoyama |
| 2007/0028877 A1 | 2/2007 | McDonald |
| 2007/0119650 A1 | 5/2007 | Eide |
| 2007/0199753 A1 | 8/2007 | Geise |
| 2007/0221424 A1 | 9/2007 | Geise |
| 2007/0227810 A1 | 10/2007 | Sakurai |
| 2007/0246268 A1 | 10/2007 | Snyder |
| 2007/0246283 A1 | 10/2007 | Giese |
| 2007/0261904 A1 | 11/2007 | Fecteau |
| 2008/0017431 A1 | 1/2008 | Sadakuni |
| 2008/0023262 A1 | 1/2008 | Hayashi |
| 2008/0029324 A1 | 2/2008 | Plankenhorn |
| 2008/0141957 A1 | 6/2008 | Dea |
| 2008/0257630 A1 | 10/2008 | Takeshima |
| 2009/0038869 A1 | 2/2009 | Beyer |
| 2009/0217908 A1 | 9/2009 | Watanabe |
| 2009/0230641 A1 | 9/2009 | Eugenio |
| 2009/0294197 A1 | 12/2009 | Polakowski |
| 2009/0321167 A1 | 12/2009 | Simmons |
| 2010/0071981 A1 | 3/2010 | Nakamura |
| 2010/0071982 A1 | 3/2010 | Giese |
| 2010/0089355 A1 | 4/2010 | Fredrickson |
| 2010/0108427 A1 | 5/2010 | Richer |
| 2010/0170231 A1 | 7/2010 | Yamaguchi |
| 2010/0269771 A1 | 10/2010 | Wermuth |
| 2011/0073403 A1 | 3/2011 | Bennett |
| 2011/0088968 A1 | 4/2011 | Kempt |
| 2011/0100340 A1 | 5/2011 | Mukkala |
| 2011/0109153 A1 | 5/2011 | Berg |
| 2011/0132679 A1 | 6/2011 | Kerner |
| 2011/0139528 A1 | 6/2011 | Eaton |
| 2011/0139529 A1 | 6/2011 | Eichenberger |
| 2011/0143465 A1 | 6/2011 | Kim |
| 2011/0192667 A1 | 8/2011 | Conn |
| 2011/0226538 A1 | 9/2011 | Brady |
| 2011/0253468 A1 | 10/2011 | Rivard |
| 2011/0266077 A1 | 11/2011 | Nadeau |
| 2012/0205173 A1 | 8/2012 | Mallette |
| 2012/0205902 A1 | 8/2012 | Beavis |
| 2012/0222908 A1 | 9/2012 | Mangum |
| 2012/0247852 A1 | 10/2012 | Fecteau |
| 2013/0032417 A1 | 2/2013 | Sampson |
| 2013/0032418 A1 | 2/2013 | Ripley |
| 2013/0032419 A1 | 2/2013 | Conn |
| 2013/0032420 A1 | 2/2013 | Mills |
| 2013/0125535 A1 | 5/2013 | Schultz |
| 2013/0180798 A1 | 7/2013 | Matsushima |
| 2013/0193676 A1 | 8/2013 | Mertens |
| 2013/0221628 A1 | 8/2013 | Rivard |
| 2013/0233265 A1 | 9/2013 | Zurface |
| 2013/0313794 A1 | 11/2013 | Bach |
| 2014/0035255 A1 | 2/2014 | Erickson |
| 2015/0144412 A1 | 5/2015 | Mangum |
| 2015/0197313 A1 | 7/2015 | Vistad |
| 2015/0251727 A1 | 9/2015 | Thibault |
| 2015/0259032 A1 | 9/2015 | Mangum |
| 2016/0031471 A1 | 2/2016 | Anderson |
| 2016/0167722 A1 | 6/2016 | Anderson |
| 2016/0280331 A1 | 9/2016 | Mangum |
| 2017/0066502 A1 | 3/2017 | Will |
| 2017/0129570 A1 | 5/2017 | Mangum |
| 2017/0259877 A1 | 9/2017 | Thompson |
| 2018/0066721 A1 | 3/2018 | Bennett |
| 2018/0251168 A1 | 9/2018 | Mangum |
| 2018/0257690 A1 | 9/2018 | Mangum |
| 2018/0273142 A1 | 9/2018 | Mangum |
| 2019/0084643 A1 | 3/2019 | Thompson |

FOREIGN PATENT DOCUMENTS

| | | |
|---|---|---|
| CA | 2321860 | 9/1999 |
| CA | 2555039 | 9/1999 |
| CA | 2555108 | 9/1999 |
| CA | 2561337 | 9/1999 |
| CA | 2345490 | 10/2001 |
| CA | 2375653 | 9/2003 |
| CA | 2863952 | 8/2013 |
| CA | 2935034 | 7/2015 |
| CA | 2935113 | 7/2015 |
| CA | 2885569 | 9/2015 |
| CA | 2887975 | 9/2016 |
| CA | 2996760 | 9/2018 |
| CA | 2998616 | 9/2018 |
| DE | 69908558 | 4/2004 |
| DE | 69922609 | 12/2005 |
| DE | 202006017459 | 6/2007 |
| EP | 0287038 | 10/1988 |
| EP | 0391282 | 10/1990 |
| EP | 0897074 | 2/1999 |
| EP | 0994016 | 4/2000 |
| EP | 1056639 | 12/2000 |
| EP | 1355089 | 10/2003 |
| EP | 1712772 | 10/2006 |
| EP | 2812236 | 12/2014 |
| EP | 2886436 | 6/2015 |
| EP | 3092169 | 11/2016 |
| EP | 3092391 | 11/2016 |
| EP | 3306058 | 4/2018 |
| FR | 2307974 | 11/1976 |
| JP | S59122727 | 7/1984 |
| JP | 61-222877 | 10/1986 |
| JP | 01-113527 | 5/1989 |

(56) References Cited

FOREIGN PATENT DOCUMENTS

| | | |
|---|---|---|
| JP | 04-201690 | 7/1992 |
| JP | 2001-065344 | 3/2001 |
| JP | 2001-153168 | 6/2001 |
| JP | 2003-343373 | 12/2003 |
| TW | 243401 | 9/2004 |
| TW | 247468 | 10/2004 |
| WO | WO 95/01503 | 1/1995 |
| WO | WO 99/43540 | 9/1999 |
| WO | WO 01/05613 | 1/2001 |
| WO | WO 02/87957 | 11/2002 |
| WO | WO 2004/031567 | 4/2004 |
| WO | WO 2007/100751 | 9/2007 |
| WO | 2008/143836 | 11/2008 |
| WO | WO 2009/114414 | 9/2009 |
| WO | WO 2011/093847 | 8/2011 |
| WO | WO 2011/099959 | 8/2011 |
| WO | WO 2013/119958 | 8/2013 |
| WO | WO 2015/105974 | 7/2015 |
| WO | WO 2015/105976 | 7/2015 |
| WO | WO 2017/079503 | 5/2017 |

OTHER PUBLICATIONS

Communication Pursuant to Article 94(3) EPC issued by the European Patent Office, dated Apr. 6, 2017, for European Patent Application No. 14194801.8; 5 pages.
Communication Pursuant to Article 94(3) EPC issued by the European Patent Office, dated Feb. 6, 2018, for European Patent Application No. 15700942.4; 4 pages.
Communication Pursuant to Article 94(3) EPC issued by the European Patent Office, dated Nov. 14, 2018, for European Patent Application No. 15700942.4; 4 pages.
International Preliminary Report on Patentability issued by the European Patent Office, dated Jan. 26, 2018, for International Patent Application No. PCT/US2016/060441; 27 pages.
International Preliminary Report on Patentability issued by the European Patent Office, dated Jul. 12, 2016, for International Patent Application No. PCT/US2015/010621; 12 pages.
International Preliminary Report on Patentability issued by the European Patent Office, dated Jun. 10, 2008, for International Patent Application No. PCT/US2007/004895; 22 pages.
International Preliminary Report on Patentability issued by the European Patent Office, dated Jun. 17, 2016, for International Patent Application No. PCT/US2015/010623; 20 pages.
International Preliminary Report on Patentability issued by the European Patent Office, dated Jun. 4, 2014, for International Patent Application No. PCT/US2013/025354; 18 pages.
International Preliminary Report on Patentability issued by the European Patent Office, dated Mar. 30, 2011, for International Patent Application No. PCT/US2009/066110; 12 pages.
International Preliminary Report on Patentability issued by the International Searching Authority, dated Jul. 19, 2011, for International Patent Application No. PCT/US2009/066093; 9 pages.
Office Action issued by the Canadian Intellectual Property Office, dated Dec. 13, 2018, for Canadian Patent Application No. 2,998,616; 3 pages.
Technical Review, SnowTech, Crazy Mountain Xtreme Bike Kit, Sep. 2015; 3 pages.
International Preliminary Report on Patentability received for PCT Patent Application No. PCT/US08/06097, dated Sep. 23, 2009, 21 pages.
International Search Report and Written Opinion issued by the European Patent Office, dated Aug. 12, 2015, for International Patent Application No. PCT/US2015/010621; 17 pages.
International Search Report and Written Opinion issued by the European Patent Office, dated Jul. 2, 2010, for International Patent Application No. PCT/US2009/066093; 14 pages.
International Search Report and Written Opinion issued by the European Patent Office, dated Mar. 18, 2010, for International Patent Application No. PCT/US2009/066110; 9 pages.
International Search Report and Written Opinion issued by the European Patent Office, dated Nov. 6, 2007, for International Patent Application No. PCT/US2007/004895; 16 pages.
International Search Report and Written Opinion issued by the European Patent Office, dated Sep. 18, 2013, for International Patent Application No. PCT/US2013/025354; 13 pages.
International Search Report and Written Opinion of the International Searching Authority, dated Apr. 18, 2017, for International Patent Application No. PCT/US2016/060441; 24 pages.
International Search Report issued by the European Patent Office, dated Mar. 24, 2015, for International Patent Application No. PCT/US2015/010623; 5 pages.
Office Action issued by the Canadian Intellectual Property Office, dated Apr. 10, 2019, for Canadian Patent Application No. 3,003,473; 4 pages.
Office Action issued by the Canadian Intellectual Property Office, dated Dec. 14, 2018, for Canadian Patent Application No. 2,996,760; 3 pages.
Office Action issued by the Canadian Intellectual Property Office, dated Feb. 8, 2019, for Canadian Patent Application No. 2,863,952; 4 pages.
International Search Report and Written Opinion for PCT/US2008/006097 issued by the European Patent Office dated Nov. 25, 2008; 17 pages.
SnoWest Snowmobile Forum, View Single Post-380 mountain mini, Jan. 11, 2017, available at http://snowest.com/forum/showpost.php?p=4009975&postcount 61; 4 pages.
Written Opinion issued by the European Patent Office, dated Feb. 5, 2016, for International Patent Application. PCT/US2015/010623; 6 pages.

\* cited by examiner

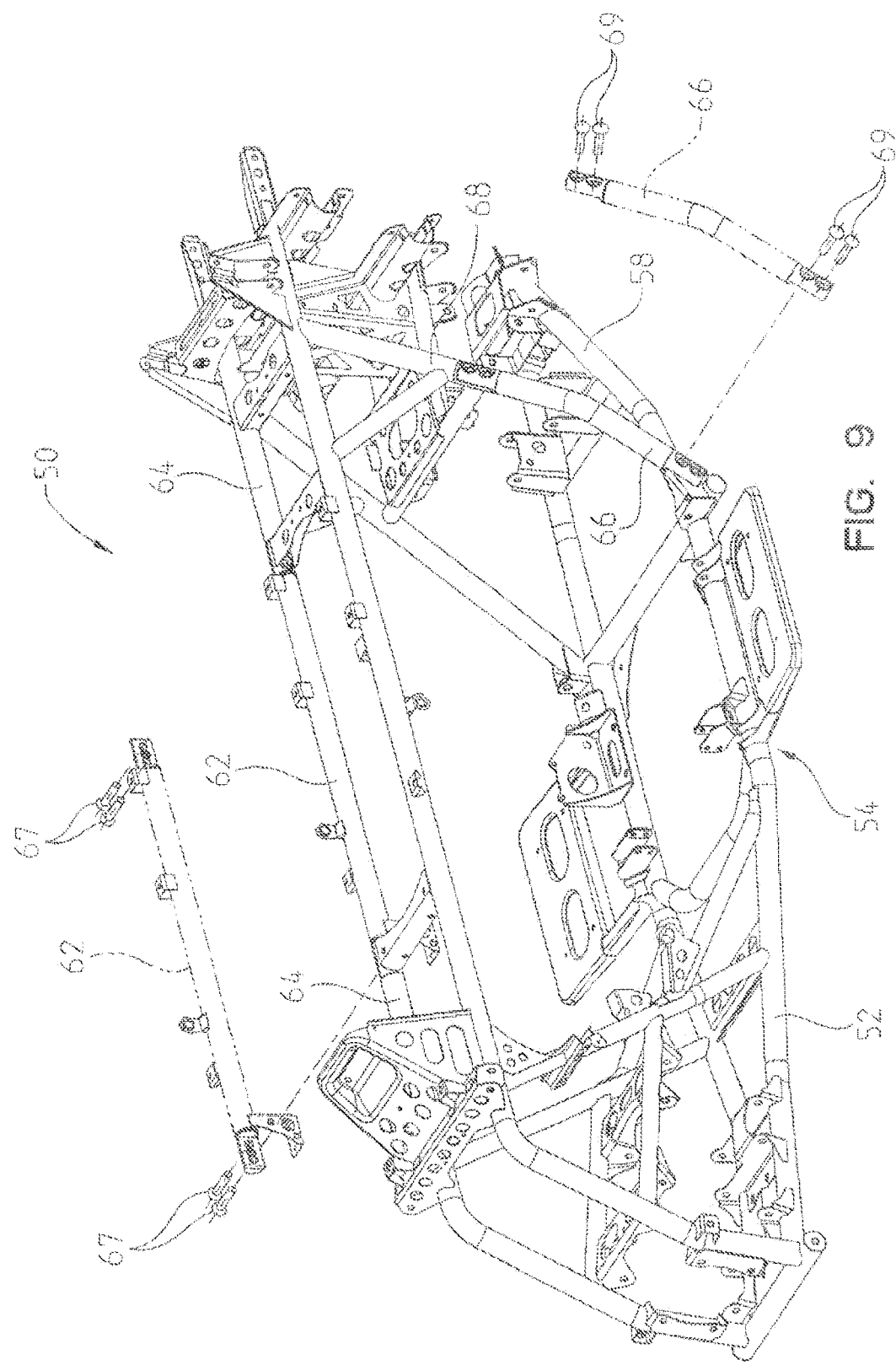

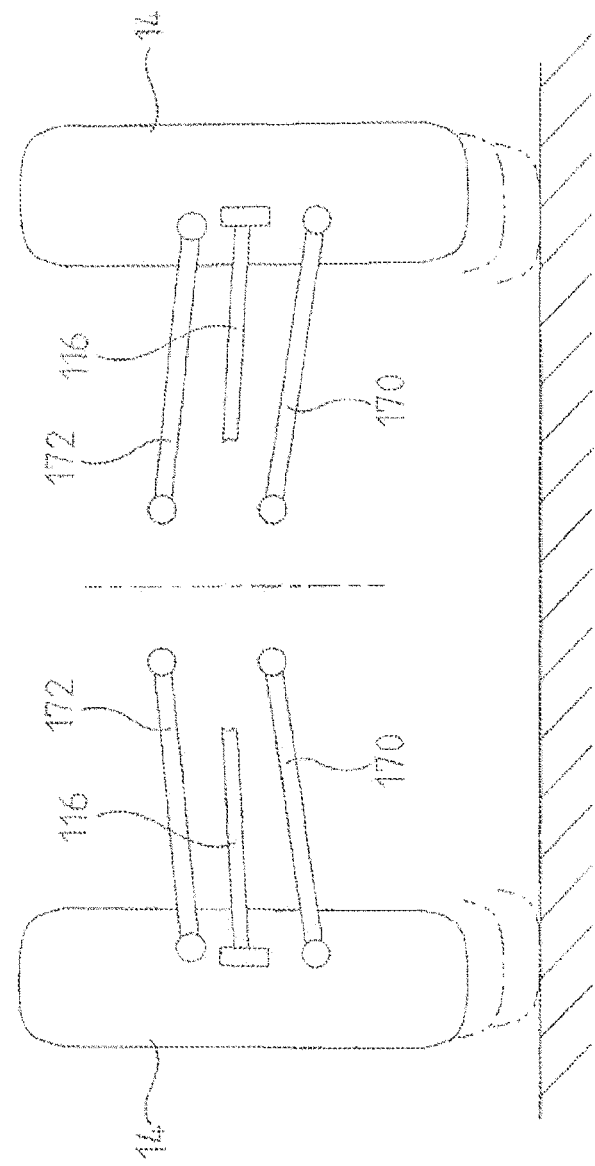

ALL TERRAIN VEHICLE

CROSS-REFERENCE TO RELATED APPLICATIONS

The present application is a continuation of U.S. patent application Ser. No. 15/795,755, filed on Oct. 27, 2017, which is a continuation of U.S. patent application Ser. No. 14/570,843, filed on Dec. 15, 2014, now issued as U.S. Pat. No. 10,457,140, which is a continuation of U.S. patent application Ser. No. 14/095,829, filed on Dec. 3, 2013, now issued as U.S. Pat. No. 9,587,689, which is a continuation of U.S. patent application Ser. No. 12/272,377, filed on Nov. 17, 2008, now issued as U.S. Pat. No. 8,596,398, which is a continuation-in-part of U.S. patent application Ser. No. 12/069,515, filed Feb. 11, 2008, now issued as U.S. Pat. No. 7,845,452, all of which claim priority to U.S. Provisional Patent Application Ser. No. 60/930,361, filed May 16, 2007, the complete disclosures of which are expressly incorporated by reference herein.

FIELD OF THE INVENTION

The present disclosure relates to all-terrain vehicles (ATVs) having a north/south engine orientation. Specifically, the present disclosure relates to ATVs having an engine positioned within a frame of the vehicle in an orientation in which the crankshaft of the engine is positioned longitudinally relative to the vehicle or perpendicular to at least one of a front and rear axle of the ATV.

BACKGROUND AND SUMMARY

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include an engine including between one and three cylinders. Generally, the engine is mounted in the frame of the ATV in an east/west or lateral orientation in which the crankshaft of the engine is parallel to the front or rear axles of the ATV. Most ATVs include a straddle or saddle type seat positioned above the engine. Depending on the engine size and the number of cylinders, the width of the engine may become substantial, thereby requiring a wider seat. A wider seating surface may become uncomfortable for the rider, particularly shorter riders who may have trouble reaching the floorboards. ATVs having east/west mounted engines may have a transmission such as a continuously variable transmission (CVT) directly coupled to the crankshaft thereby adding additional width, or may have a differential type mechanism transferring power to a transmission mounted elsewhere.

According to an illustrative embodiment of the present disclosure, an all-terrain vehicle includes a frame having longitudinally spaced-apart ends defining a first longitudinal axis. A pair of front wheels and a pair of rear wheels are operably coupled to the frame. An engine is supported by the frame and includes a plurality of cylinders and a crankshaft driven by the plurality of cylinders. The crankshaft defines a second longitudinal axis substantially parallel to the first longitudinal axis. A transmission is operably coupled to the engine and is configured to transmit power to a rear transmission shaft for driving the front wheels in motion, and to transmit power to a rear transmission shaft for driving the rear wheels in motion. The front transmission shaft is laterally spaced from, and extends parallel to, the rear transmission shaft.

In a further illustrative embodiment, an all-terrain vehicle includes a frame having longitudinally spaced-apart ends defining a first longitudinal axis. A plurality of wheels are operably coupled to the frame. An engine is supported by the frame and includes at least one cylinder and a crankshaft driven by the at least one cylinder. The crankshaft defines a second longitudinal axis substantially parallel to the first longitudinal axis. The engine includes a cross-sectional profile configured to be received within a perimeter defining trapezoid having a height of approximately 432 millimeters (approximately 17 inches), an upper width of approximately 229 millimeters (approximately 9 inches), and a lower width of approximately 432 millimeters (approximately 17 inches).

According to another illustrative embodiment, an all-terrain vehicle includes a frame having longitudinally spaced-apart ends defining a first longitudinal axis. A plurality of wheels are operably coupled to the frame. An engine is supported by the frame and includes at least one cylinder and a crankshaft driven by the at least one cylinder. A transmission is operably coupled to the engine and is configured to transmit power to a transmission shaft for driving the wheels in motion, the transmission including a starting clutch operably coupled to, and positioned in spaced relation to, the engine.

In yet another illustrative embodiment, an all-terrain vehicle includes a frame having longitudinally spaced-apart ends defining a first longitudinal axis. A plurality of wheels are operably coupled to the frame. An engine is supported by the frame and includes at least one cylinder, a crankshaft driven by the at least one cylinder, and an exhaust conduit. A transmission is operably coupled to the engine and includes a plurality of vanes configured to force cooling air through the housing and across the exhaust conduit.

In a further illustrative embodiment, an all-terrain vehicle includes a frame having longitudinally spaced-apart ends defining a first longitudinal axis. A plurality of wheels are operably coupled to the frame. An engine is supported by the frame and is operably coupled to the wheels. The frame includes an upper frame member having a removable member configured to provide access to the engine.

In another illustrative embodiment, an all-terrain vehicle includes a frame including longitudinally spaced-apart ends defining a longitudinal axis, a straddle-type seat operably coupled to the frame, a pair of front wheels operably coupled to the frame, and a pair of rear wheels operably coupled to the frame. A handlebar assembly is operably coupled to at least one of the wheels for steering the vehicle. An engine is supported by the frame and is operably coupled to at least one of the wheels for propelling the vehicle. A pair of footwells are laterally positioned on opposite sides of the seat and include laterally spaced-apart inner and outer edges, wherein the ratio of the distance between inner edges of the footwells and the distance between the outer edges of the footwells is less than about 0.64.

According to a further illustrative embodiment, an all terrain vehicle includes a frame having longitudinally spaced apart ends defining a first longitudinal axis, a pair of front wheels operably coupled to the frame, and a pair of rear wheels operably coupled to the frame. A straddle-type seat is operably coupled to the frame, and a handlebar assembly is operably coupled to at least one of the wheels for steering the vehicle. An engine is supported by the frame and includes a plurality of cylinders and a crankshaft driven by the plurality of cylinders. The crankshaft defines a second longitudinal axis substantially parallel to the first longitudinal axis. The frame include an upper frame member having a removable member configured to provide access to the engine.

In a further illustrative embodiment, an all terrain vehicle includes a frame having longitudinally spaced-apart ends defining a vehicle longitudinal axis. A pair of front wheels are operably coupled to the frame, each of the front wheels defining a front wheel center axis. A front track width is defined laterally between the front wheel center axes. A pair of rear wheels are operably coupled to the frame, each of the rear wheels defining a rear wheel center axis. A rear track width is defined laterally between the rear wheel center axes. An engine is supported by the frame and is operably coupled to at least one of the wheels. A front suspension includes right and left lower control arms, each lower control arm having an inner pivot coupling operably coupled to the frame and an outer pivot coupling operably to one of the front wheels. Each lower control arm has a control arm length between the inner pivot coupling and the outer pivot coupling, the sum of the control arm lengths of the right and left lower control arms defining a combined control arm length. The ratio of the combined control arm length to the front track width is at least about 0.84.

According to yet another illustrative embodiment, an all terrain vehicle includes a frame having longitudinally spaced-apart ends defining a vehicle longitudinal axis. A plurality of laterally spaced wheels are operably coupled to the frame, each of the wheels defining a wheel center axis. A track width is defined laterally between the wheel center axes. An engine is supported by the frame and is operably coupled to at least one of the wheels. A suspension includes right and left lower control arms, each lower control arm having an inner pivot coupling operably coupled to the frame and an outer pivot coupling operably coupled to one of the wheels. Each lower control arm has a control arm length between the inner pivot coupling and the outer pivot coupling. Each lower control arm is angled from horizontal by less than about 30 degrees and has a control arm length greater than about 423 millimeters (about 16.65 inches).

In a further illustrative embodiment, an all terrain vehicle includes a frame having longitudinally spaced-apart ends defining a vehicle longitudinal axis. A straddle-type seat is supported by the frame. A pair of front wheels are operably coupled to the frame, each front wheel being rotatable about a rotational axis, and defining a front wheel center axis extending perpendicular to the rotational axis. A front track width is defined laterally between the front wheel center axes. A pair of rear wheels are operably coupled to the frame, each rear wheel defining a rear wheel center axis. A rear wheel track width is defined laterally between the rear wheel center axes. An engine is supported by the frame and is operably coupled to at least one of the wheels. A front suspension includes a pair of upper and lower pivot couplings operably coupled to each front wheel, the upper and lower pivot couplings defining a king pin axis about which the front wheel may be rotated by steering the vehicle. The king pin axis of each front wheel is offset from the front wheel axis, as measured along the rotational axis, by less than 30 millimeters (approximately 1.18 inches).

According to still another illustrative embodiment, an all terrain vehicle includes a frame having longitudinally spaced-apart ends defining a vehicle longitudinal axis, and a straddle-type seat supported by the frame. A pair of laterally spaced front wheels are operably coupled to the frame, each front wheel having an outer diameter of at least 355 millimeters (approximately 14 inches). An inflatable tire is supported by each wheel, and a handlebar assembly is operably coupled to at least one of the wheels. An engine is supported by the frame and is operably coupled to at least one of the wheels for propelling the vehicle. Each front wheel is operably coupled to the frame by an upper pivot coupling and a lower pivot coupling. The upper and lower pivot couplings define a king pin axis about which the front wheel may be rotated for steering the vehicle. The pivot couplings are laterally received within the wheel, in a direction from the vehicle longitudinal axis, by at least 48 millimeters (approximately 1.89 inches).

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 9 is another perspective view of the frame of the ATV shown in FIG. 1 with removable frame components shown in phantom.;

FIG. 12 is a cross-sectional view of the drive clutch and the driven clutch, taken in the direction of lines 12-12 of FIG. 19B;

FIG. 26B is a diagrammatical view of the front suspension shown in FIG. 26A during jounce;

Figure 1:
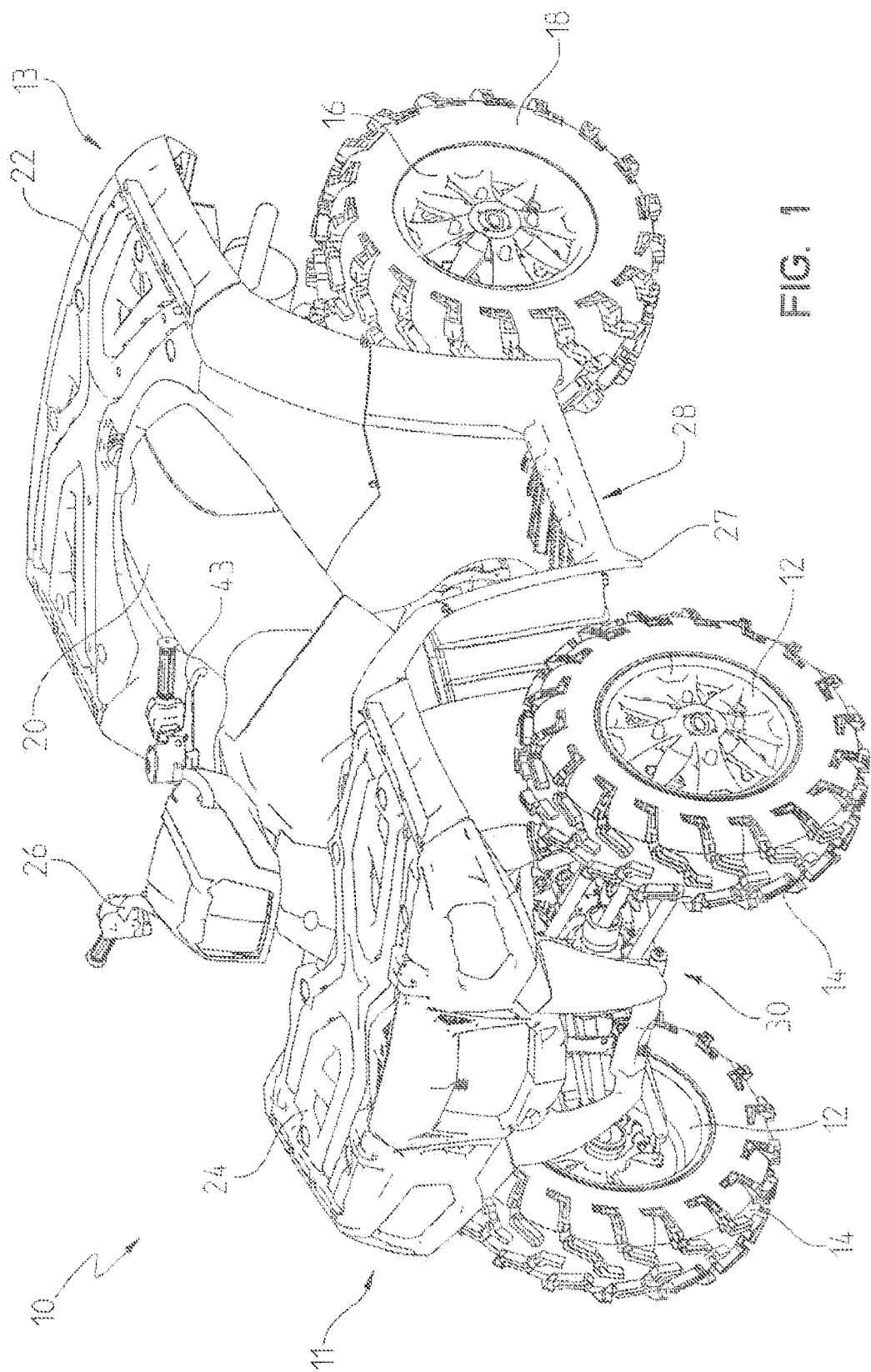
FIG. 1 is a perspective view of an ATV in accordance with illustrative embodiments of the present invention.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to an all terrain vehicle, it should be understood that the invention may have application to other types of vehicles, such as snowmobiles, motorcycles, watercraft, utility vehicles, scooters, golf carts, and mopeds.

Figure 2:
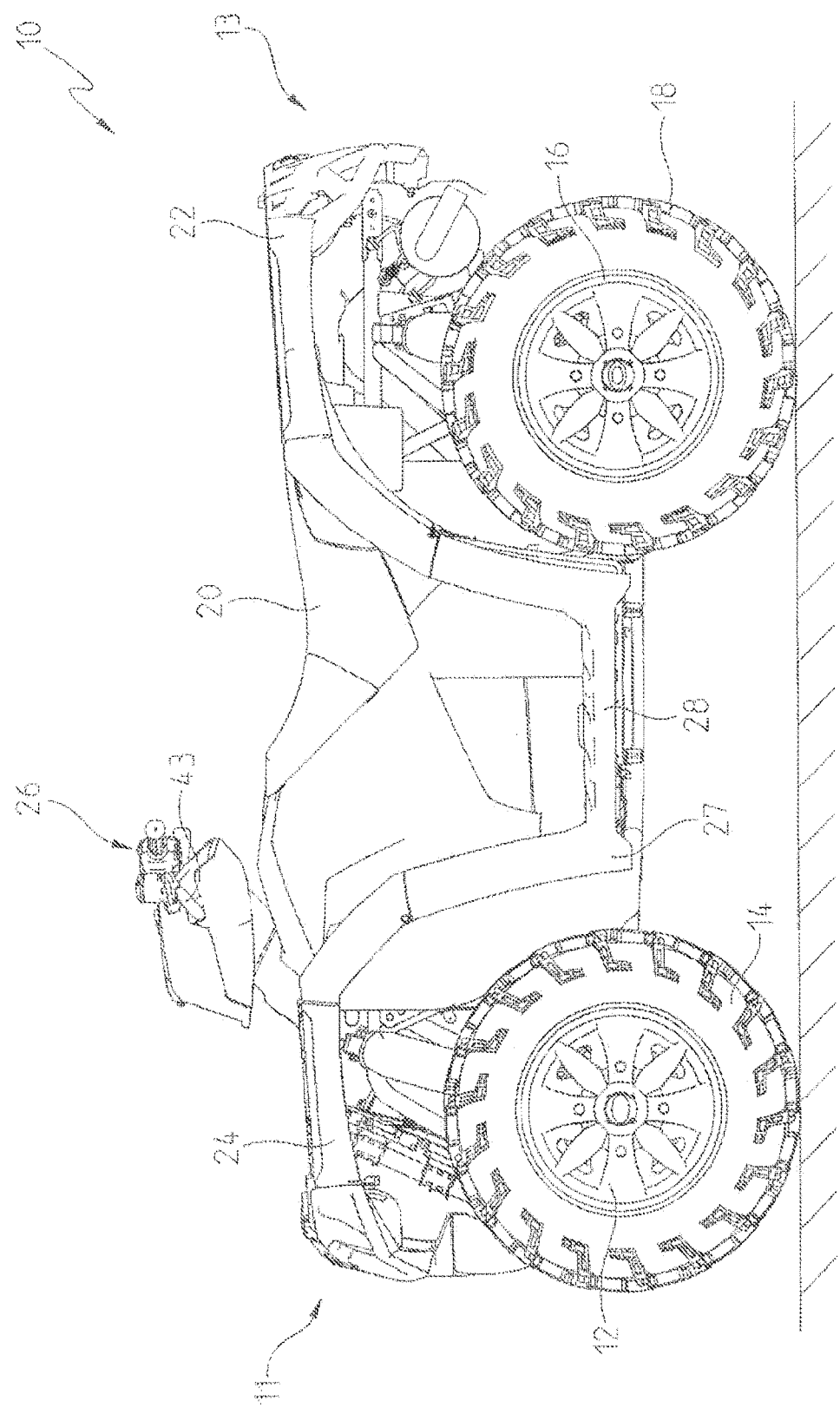
FIG. 2 is a left side view of the ATV shown in FIG. 1.

Referring initially to FIGS. 1 and 2, one illustrative embodiment of an all terrain vehicle (ATV) 10 is shown. ATV 10 includes front end 11, rear end 13, straddle-type seat 20, and handlebar assembly 26. Front end 11 and rear end 13 are separated by footwells 28 on both lateral sides of ATV 10 and separated by seat 20. Front end 11 is supported by front wheels 12 and tires 14 and front suspension 30, which is discussed in greater detail below. Front end 11 also includes front panel 24 which may include a tool storage compartment. Handlebar assembly 26 is operably coupled to front wheels 12 to allow a rider to steer ATV 10 when supported by seat 20 and/or footwells 28. Rear end 13 is supported by rear wheels 16 and tires 18. Rear end 13 also includes rear panel 22 which may include a tool storage compartment. Front panel 24 and rear panel 22 may also include an accessory coupling system such as the one disclosed in U.S. Pat. No. 7,055,454, the disclosure of which is expressly incorporated by reference herein. Side panels 27 may be coupled intermediate front and rear panels 24 and 22.

In this illustrative embodiment, and as further detailed herein, front wheels 12 and rear wheels 16 have outer diameters equal to about 355 millimeters (about 14 inches). Tires 14 and 18 may be constructed to any suitable size and pressure rating, however for the illustrative embodiment, front tires 14 are 26×8R-14 tires (i.e., having an inflated outer diameter of about 660 millimeters (about 26 inches) and an inflated width of about 203 millimeters (about 8 inches)), and rear tires 18 are 26×10R-14 tires (i.e., having an inflated diameter of about 660 millimeters (about 26 inches) and an inflated width of about 254 millimeters (about 10 inches)). Both front tires 14 and rear tires 18 are low pressure tires, illustratively operated at a maximum air pressure of about 7 pounds per square inch (about 0.5 Kg/CM$^2$). For the illustrative embodiment, tires 14 and 18 provide a significant amount of suspension for ATV 10. Front tires 14 extend forward of forwardmost components of ATV 10, illustratively front panel 24, and may act as a front "bumper" for ATV 10. As such, front tires 14 are configured to prevent damage to ATV 10 or a transporting vehicle, especially if ATV 10 is transported in a pickup truck bed or similar vehicle.

Figure 3:
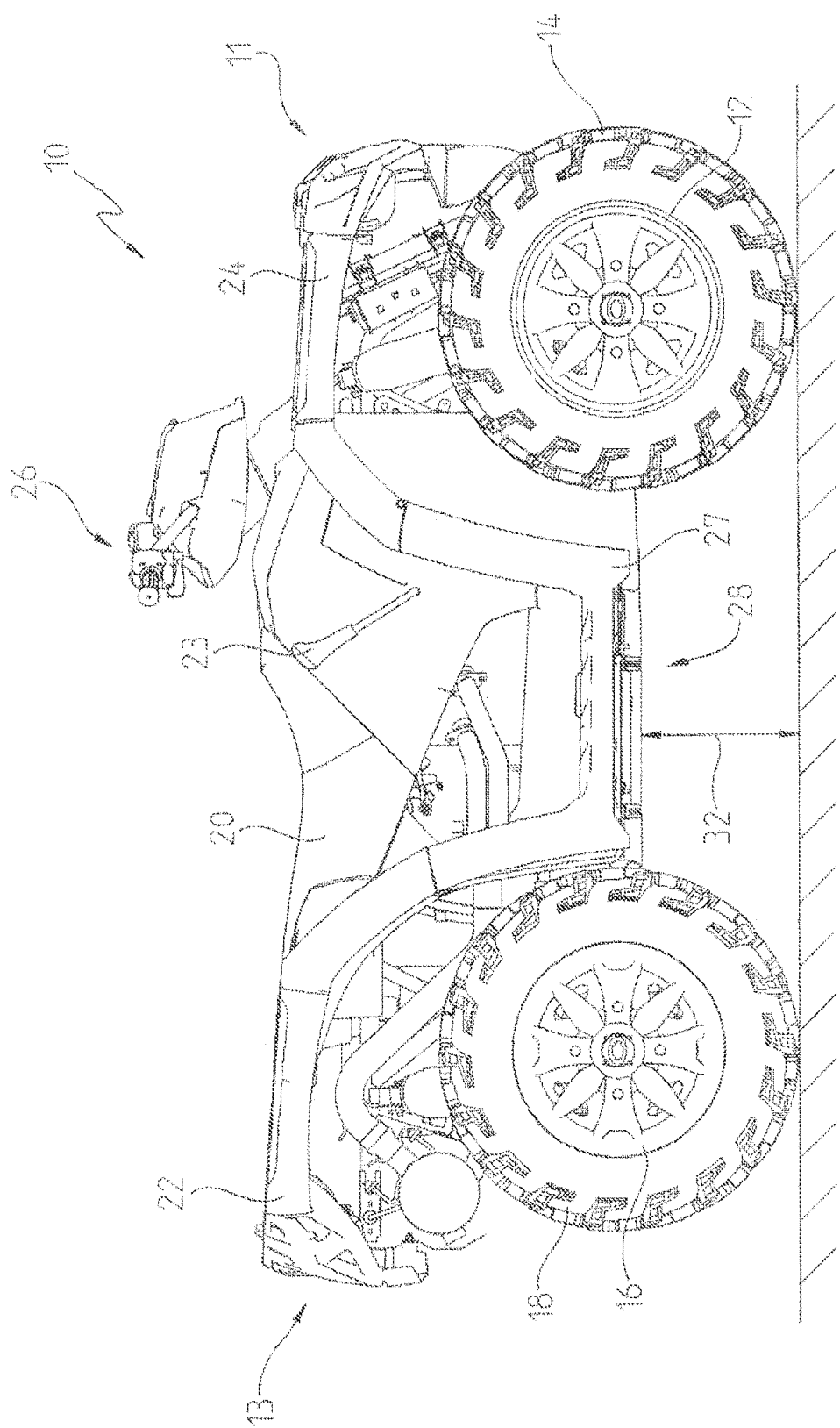
FIG. 3 is a right side view of the ATV shown in FIG. 1.
Figure 4:
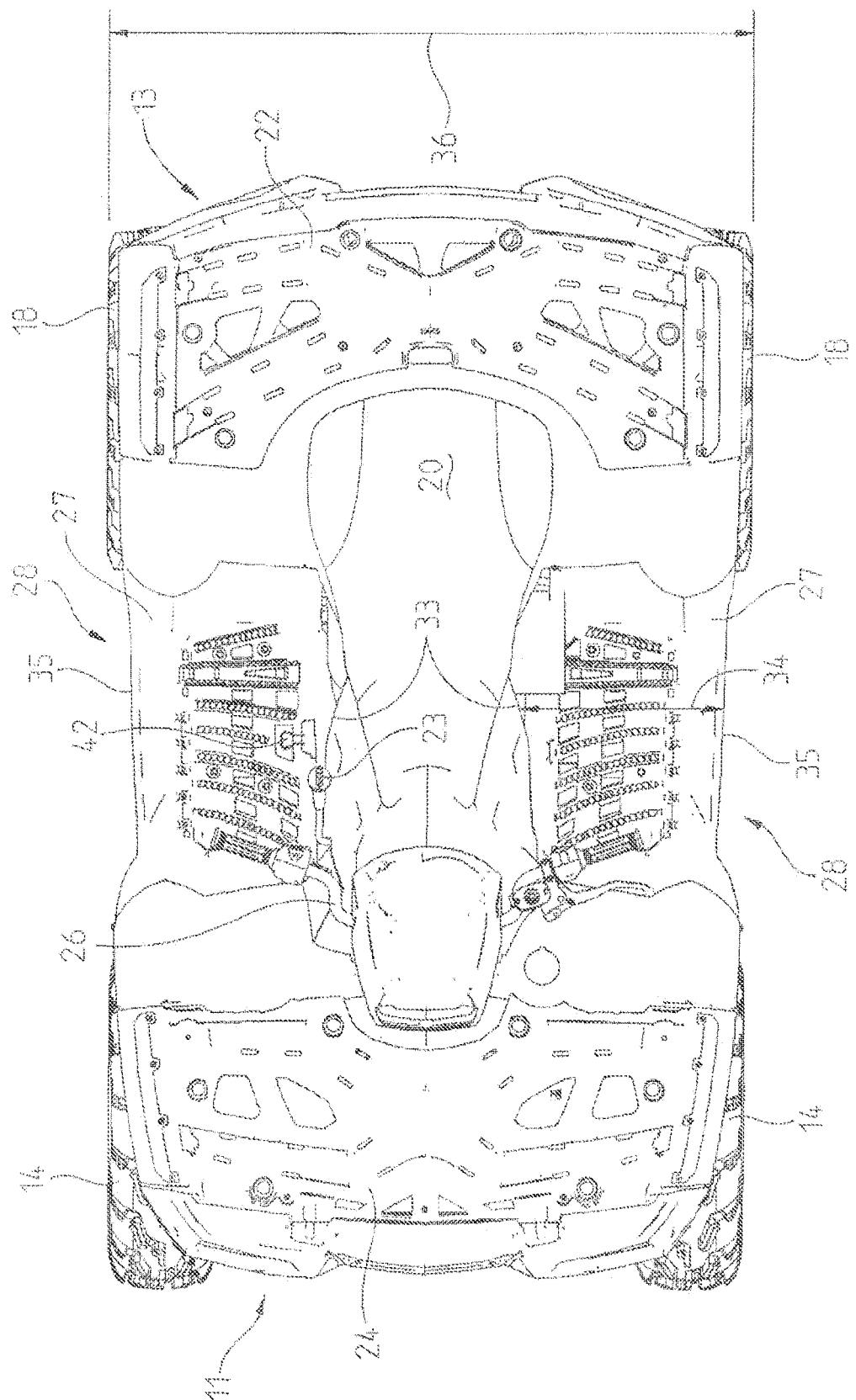
FIG. 4 is a top plan view of the ATV shown in FIG. 1.
Figure 5:
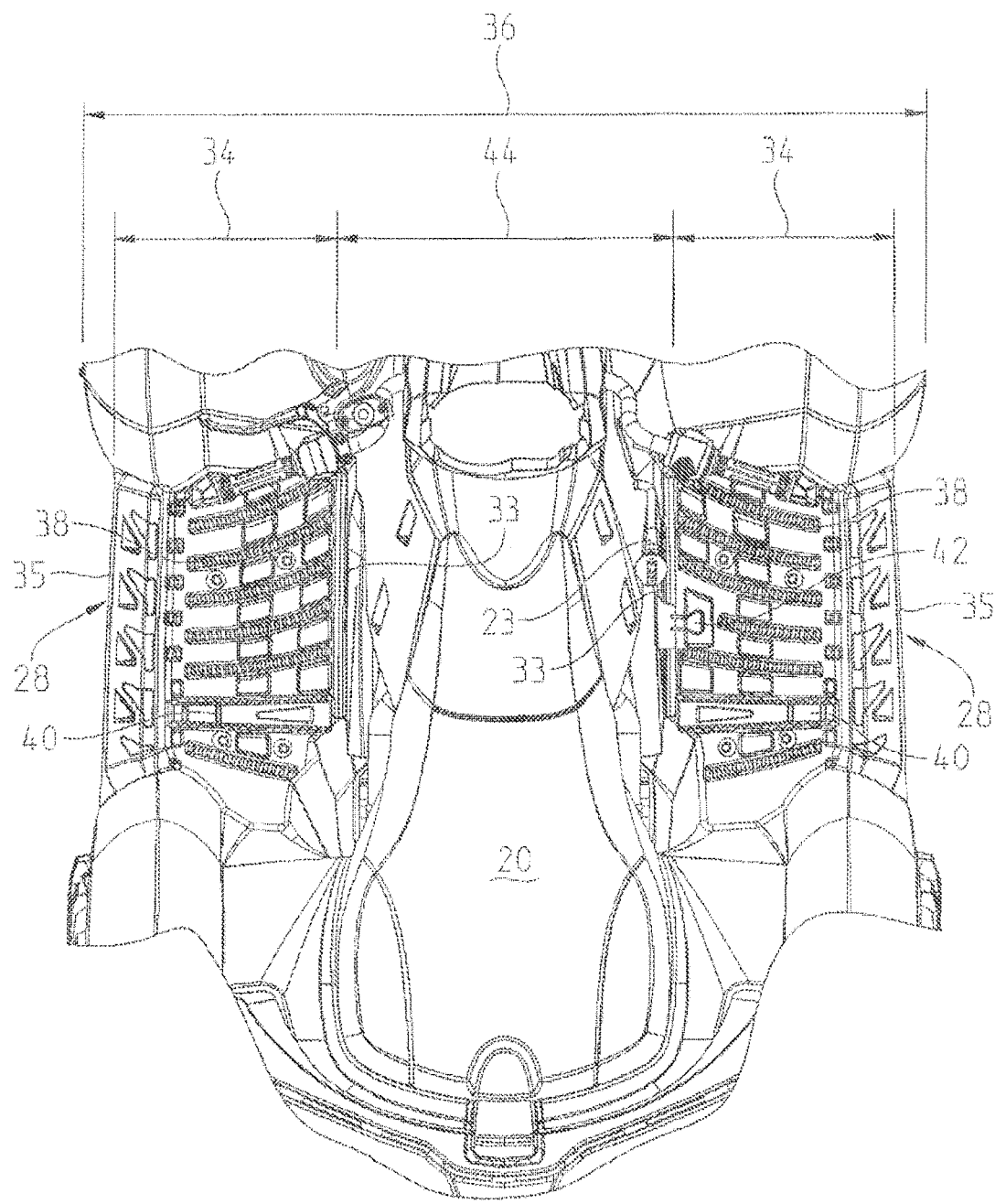
FIG. 5 is a partial top view of a middle section of the ATV shown in FIG. 1.

Referring now to FIG. 3, shift lever 23 is shown on the right side of ATV 10. Shift lever 23 is coupled to a transmission of ATV, which is described in greater detail below. Distance 32 is ground clearance of ATV 10. In this illustrative embodiment, distance 32 is equal to about 305 millimeters (about 12 inches). FIGS. 4 and 5 illustrate a top view of ATV 10. Distance 36 is the overall width of ATV 10. In this illustrative embodiment, distance 36 is defined to be less than 1219 millimeters (approximately 48 inches), and is illustratively equal to about 1206.5 millimeters (about 47.5 inches). Distance 34 is equal to the width of footwells 28 on both lateral sides of ATV 10. In this illustrative embodiment, distance 34 is about 330 millimeters (about 13 inches) measured as from proximate center portion sidewall 33 to outer edge 35 of each respective footwell 28. Referring to FIG. 5, distance 44 is equal to the width of ATV 10 between inner edges 33 of footwells 28. In this illustrative embodiment, distance 44 is about 421.6 millimeters (about 16.6 inches). As may be appreciated, the ratio of the lateral distance between inner of footwells 28 and the lateral distance between the outer edges 35 of footwells 28 is equal to approximately 0.64, and is illustratively less in order to provide a narrower straddle width 44 for the rider. Distance 44, as measured between sidewalls 33, is the distance a rider positioned on seat 20 will straddle. It may be preferable for a rider to straddle seat 20 in the seated position with both feet resting in footwells 28. Footwells 28 include traction devices 38 to contact a rider's footwear. Additionally, right footwell 28 includes foot brake lever 42. A rider may apply one of a hand brake lever 43 on handlebar assembly 26 and foot brake lever 42 to apply either a front brake assembly, a rear brake assembly, or both.

Figure 6:
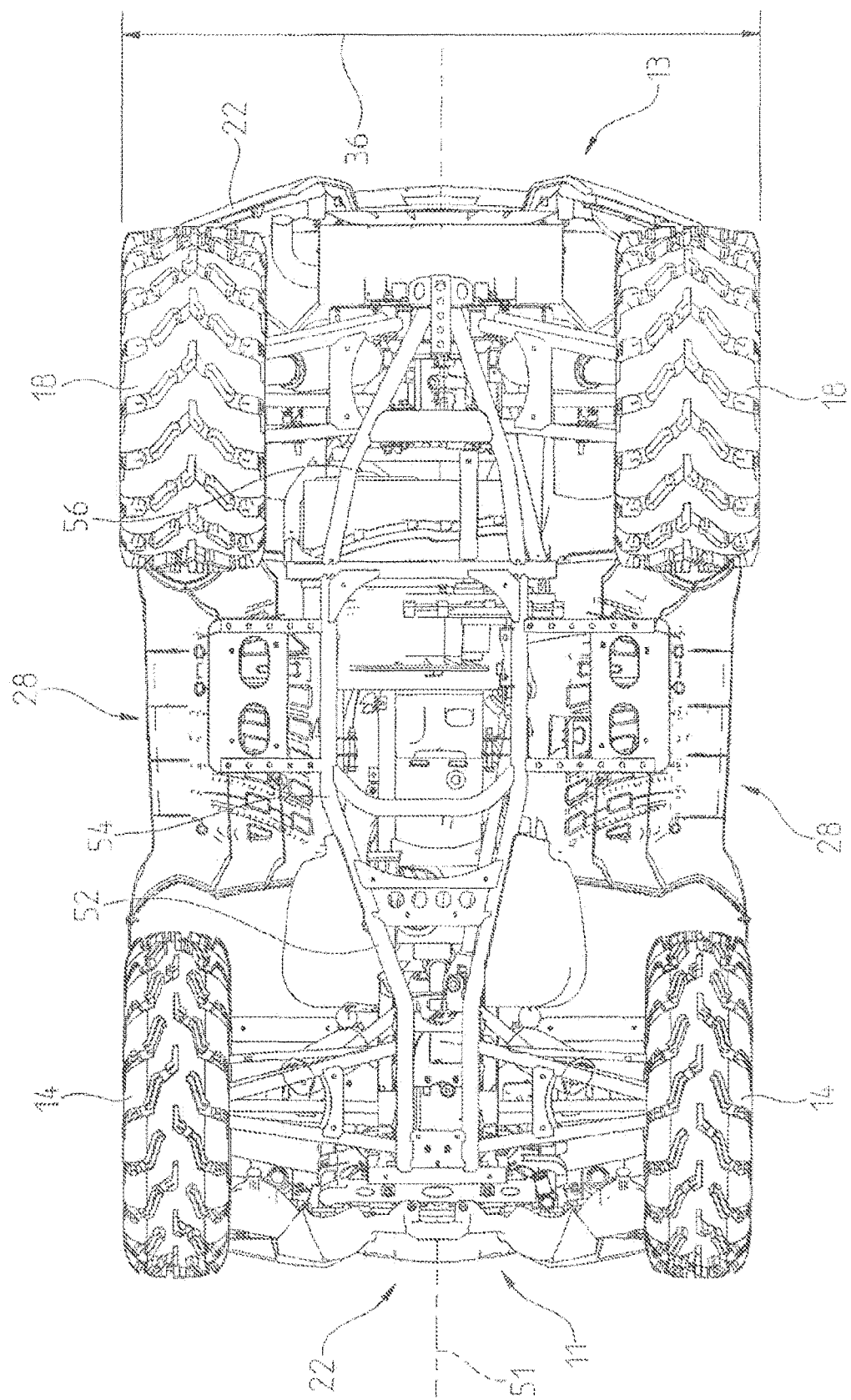
FIG. 6 is a bottom plan view of the ATV shown in FIG. 1.
Figure 7:
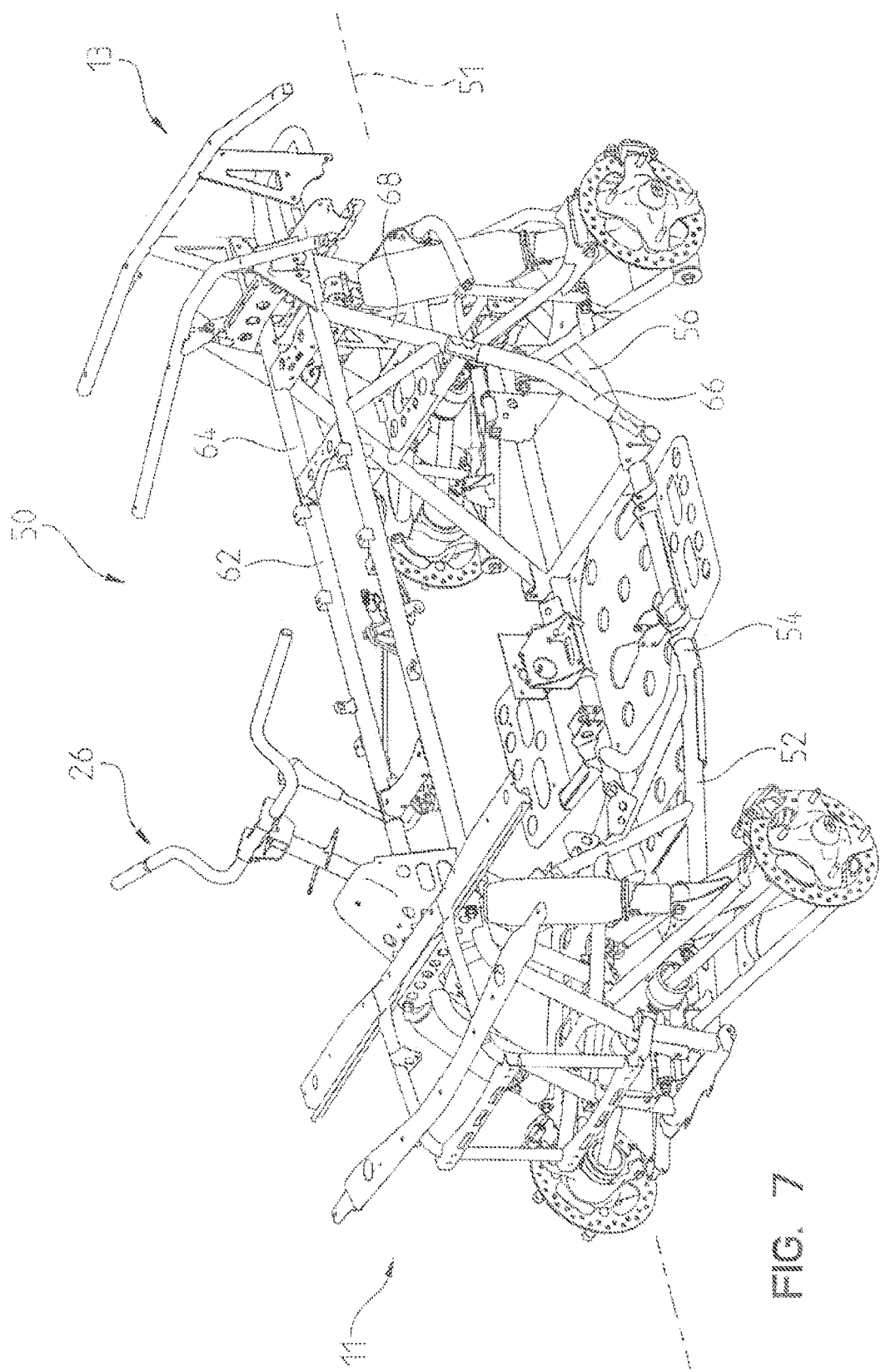
FIG. 7 is a perspective view of the frame and suspension components of the ATV shown in FIG. 1.
Figure 8:
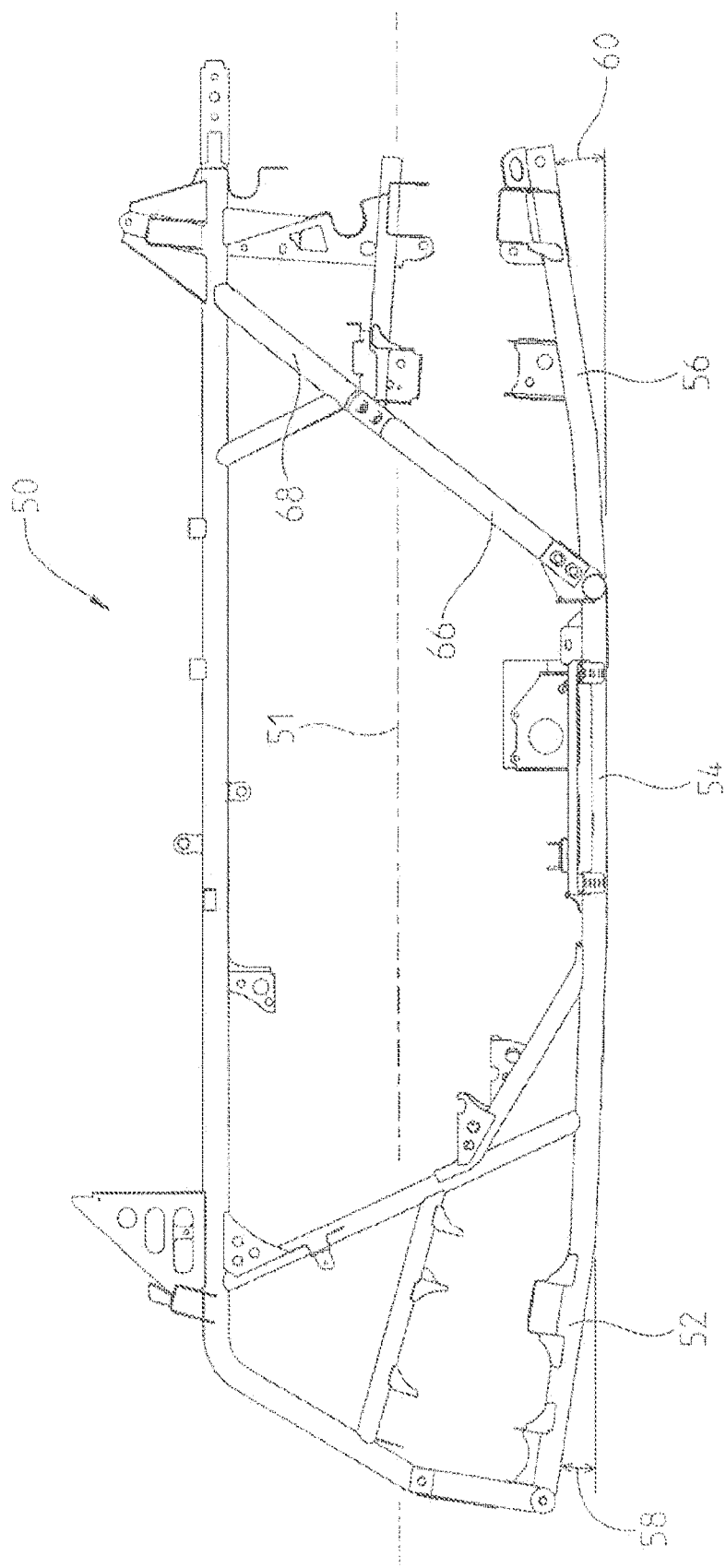
FIG. 8 is a side view of the frame of the ATV shown in FIG. 1.

Referring now to FIGS. 6-8, ATV 10 includes frame 50 defining a longitudinal axis 51 and which includes front portion 52, middle portion 54, and rear portion 56. Frame 50 is shown with the engine 72 and transmission 74, as further detailed herein, removed for simplicity. As shown in FIG. 8, front portion 52 and rear portion 54 of frame 50 are angled upwardly to provide additional ground clearance to front end 11 and rear end 13 of ATV 10. Front portion 52 is angled upwardly at an angle defined by reference numeral 58 relative to middle portion 54. Rear portion 56 is angled upwardly at an angle defined by reference numeral 60 relative to middle portion 54. Middle portion 54 extends generally horizontal between front portion 52 and rear portion 56. In the illustrative embodiment, angles 58 and 60 are defined to be within a range from about 8.5 to 9.5 degrees.

Referring now to FIGS. 7 and 9, frame 50 includes removable frame members 62 and 66. Removable frame member 62 forms a portion of upper frame tube 64 in its default or fixed position. A plurality of fasteners, such as bolts 67, are used on each end of removable frame member 62 to couple it to upper frame tube 64 (FIG. 9). Removable frame member 62 may be removed by the rider or a technician to service the engine 72 or other components of ATV 10. Similarly, removable frame member 66 forms a portion of down tube 68 in its default or fixed position. A plurality of fasteners, such as bolts 69, are used on each end of removable frame member 66 to couple it to down tube 68. Removable member 66 may be removed to service various internal components of ATV 10 such as the CVT belt 155, which is explained in greater below.

Figure 10A:
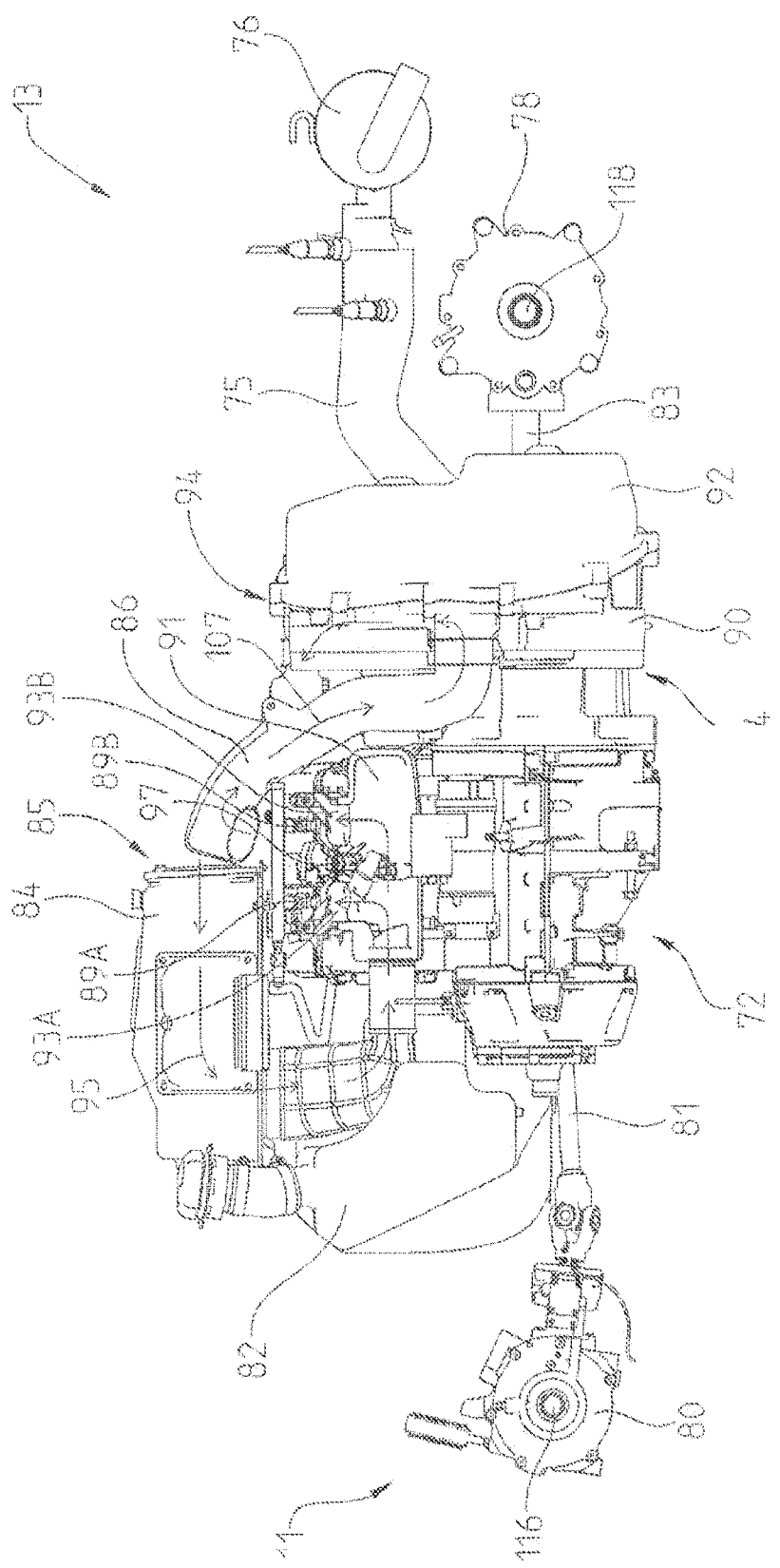
FIG. 10A is a right side view of an engine and transmission that may be used in an ATV such as the one shown in FIG. 1.
Figure 10B:
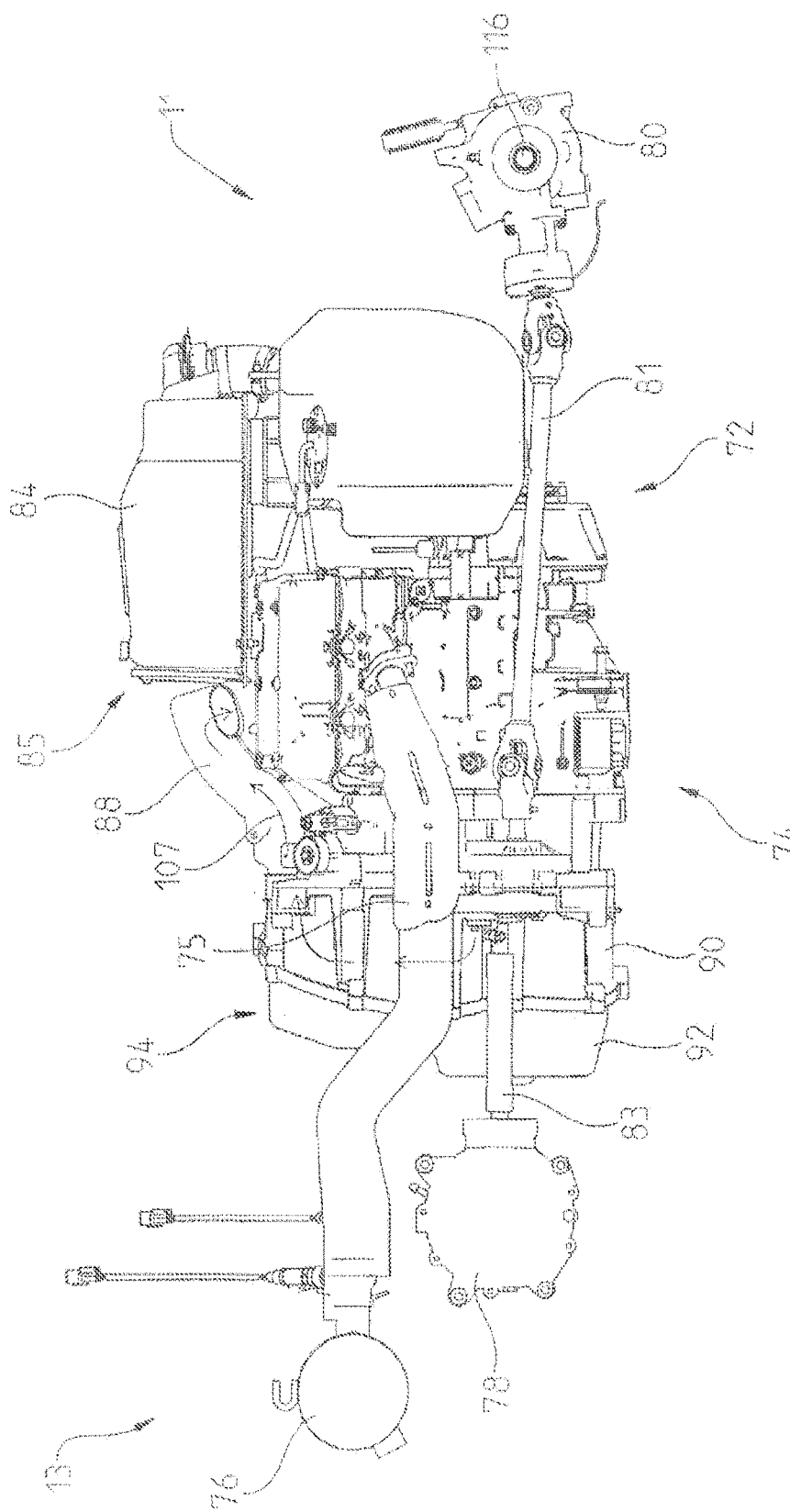
FIG. 10B is a left side view of an engine and transmission similar to FIG. 10A.
Figure 11:
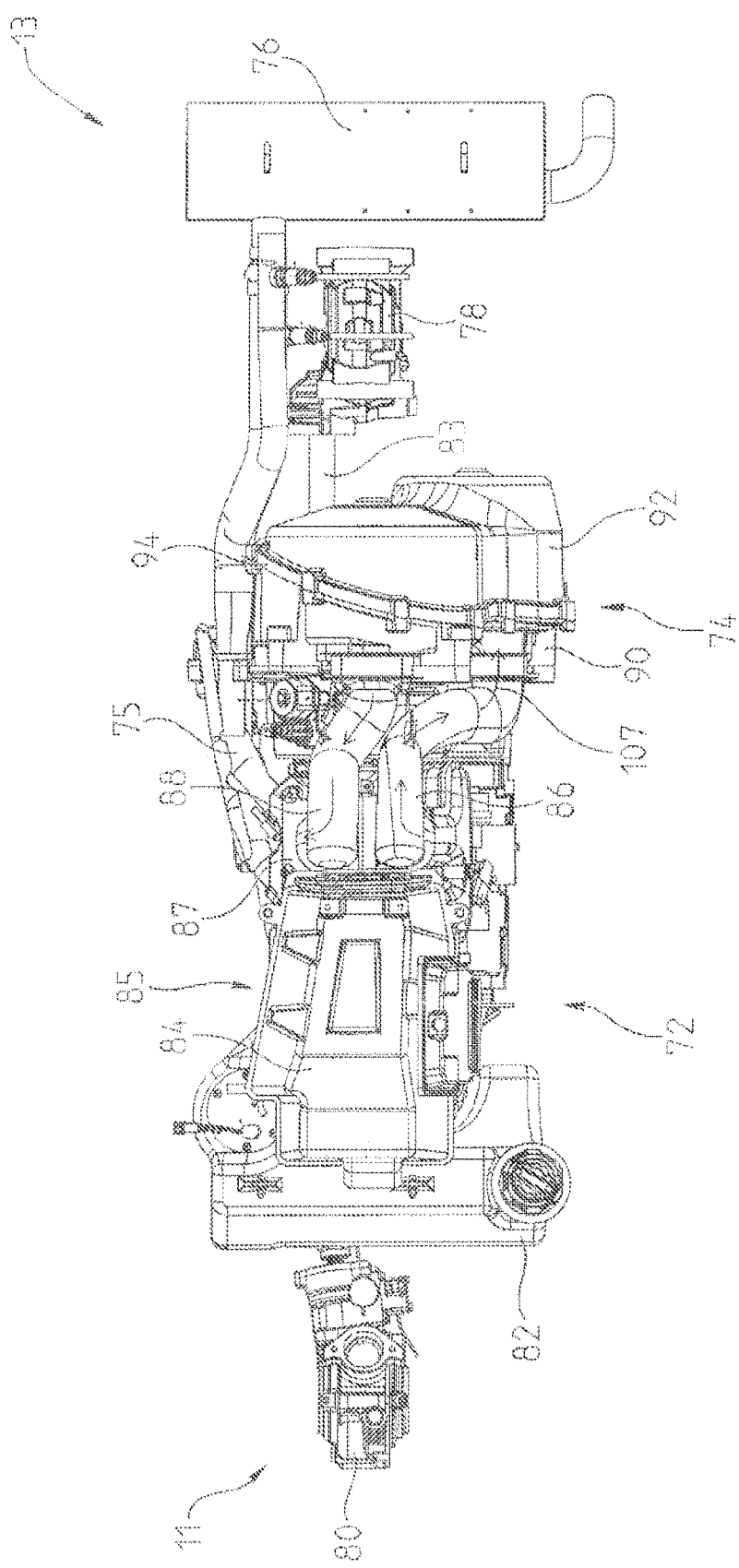
FIG. 11 is a top view of an engine and transmission of FIGS. 10A and 10B.
Figure 92:
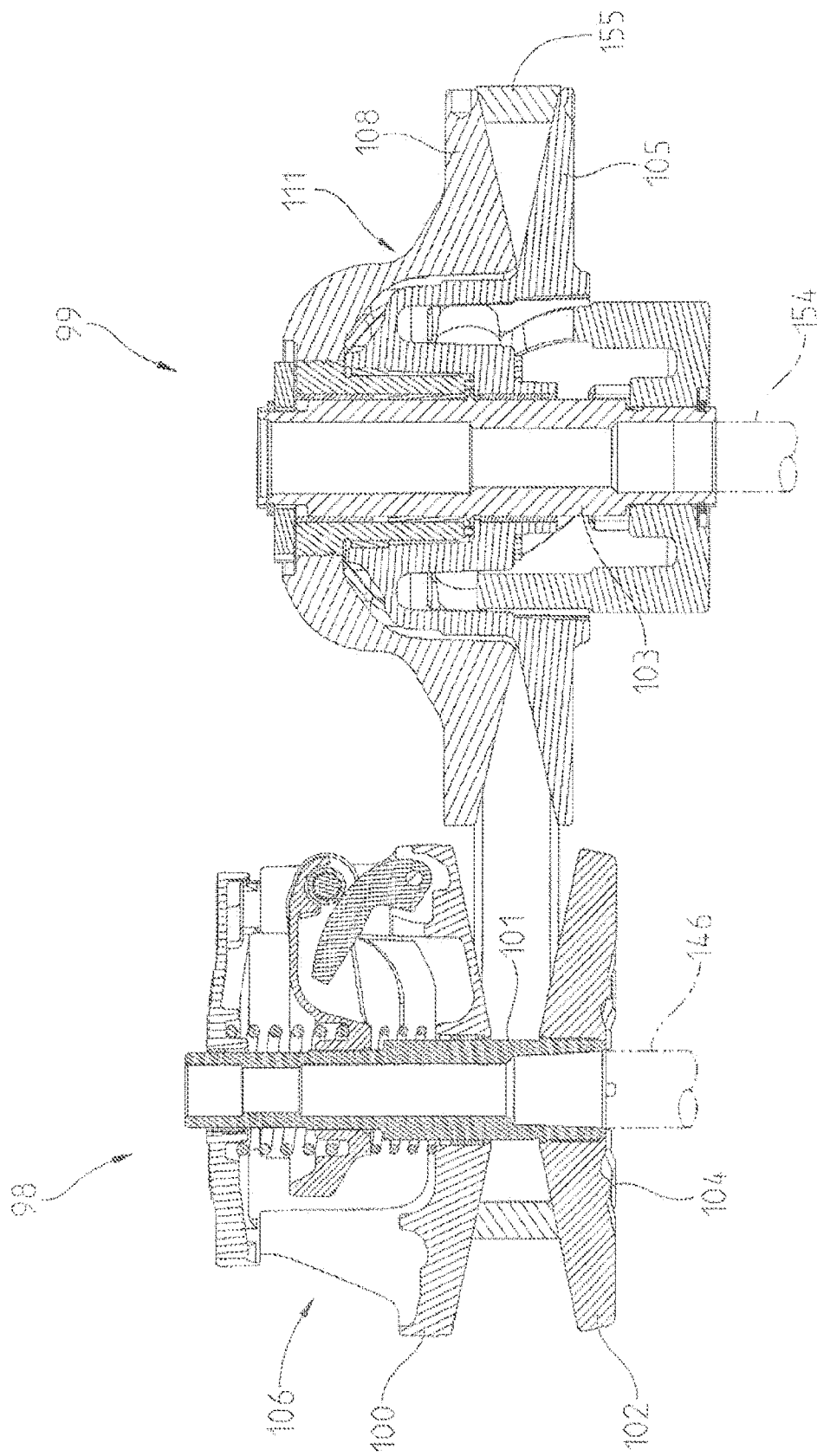
Figure 19A:
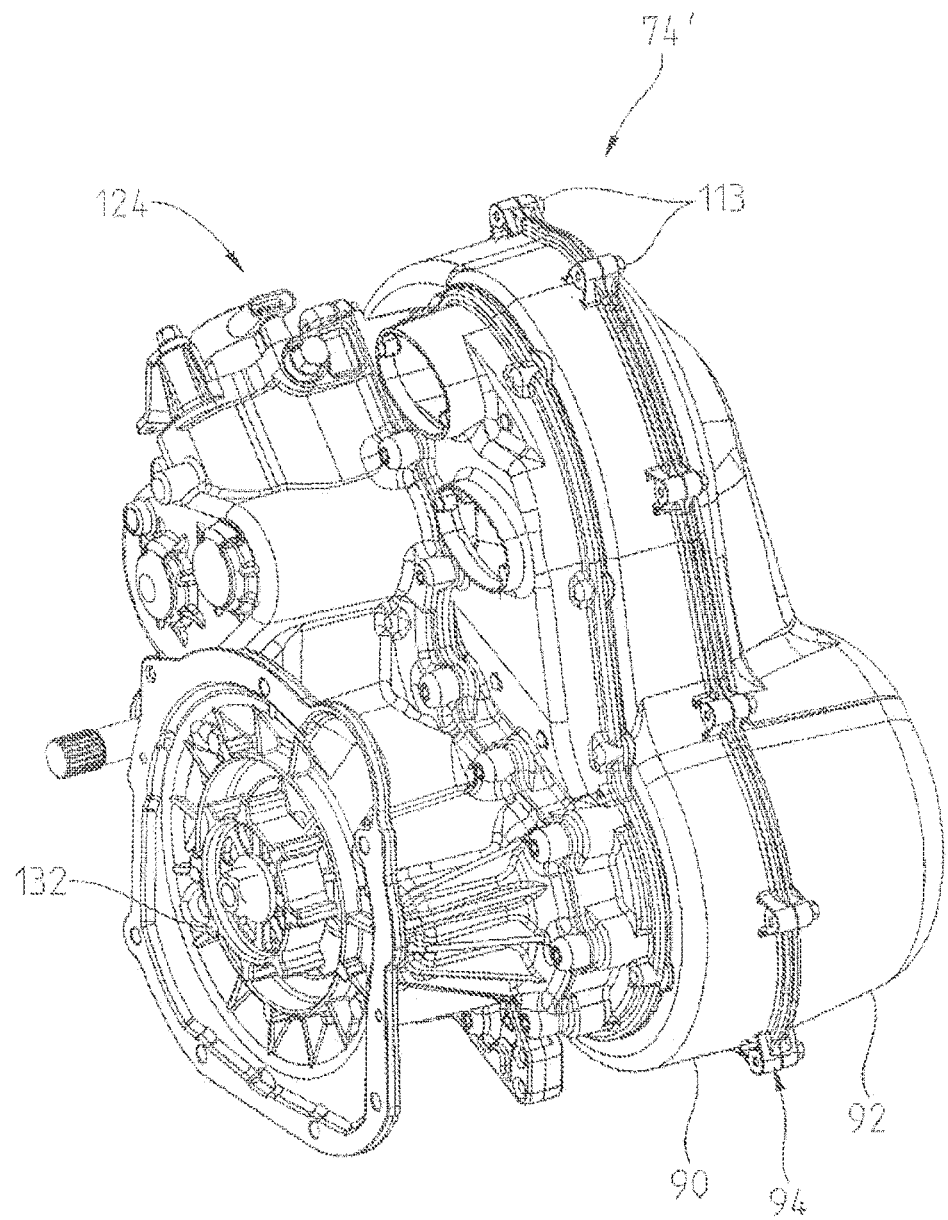
FIG. 19A is a front perspective view of a further illustrative embodiment transmission.
Figure 19B:
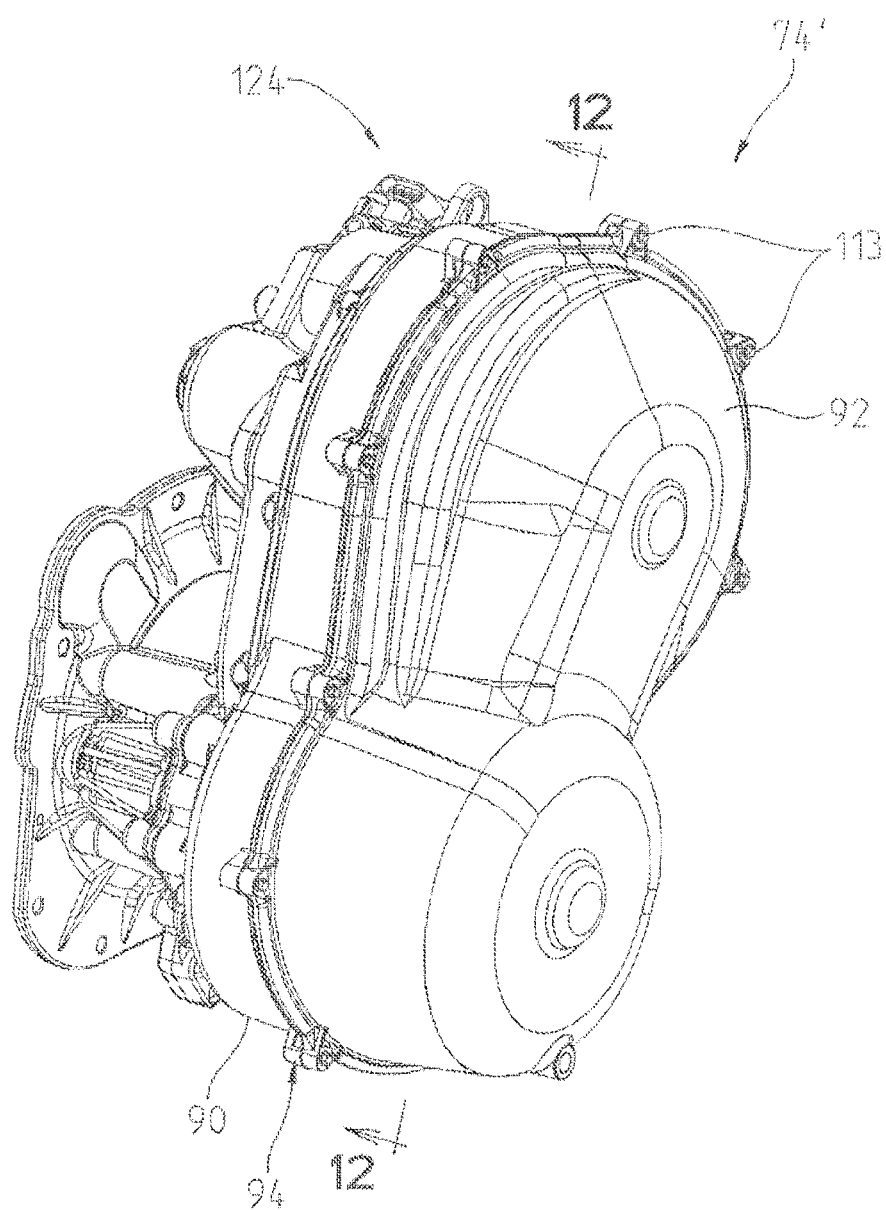
FIG. 19B is a rear perspective view of the transmission of FIG. 19A.

FIGS. 10A-11 are illustrative side and top views of engine 72 and transmission 74 of ATV 10. Engine 72 is positioned adjacent front end 11 of ATV 10. Transmission 74 is illustratively coupled directly to engine 72 in the manner detailed herein. Transmission 74 provides power to front differential 80 through front transmission shaft 81 and to rear differential 78 through rear transmission shaft 83. Front differential 80 powers front axle 116. Rear differential 78 powers rear axle 118. In this illustrative embodiment, transmission 74 also includes housing 90 and clutch cover 92. Clutch cover 92 includes an outer wall of varying depth that cooperates with flange 94 of housing 90. The inwardly curved shape of flange 94 and corresponding shape of clutch cover 92 facilitates removal of clutch cover 92 for service when removable frame member 66 is removed. More particularly, the shape of the clutch cover 92 does not require that left rear wheel 16 be removed for certain servicing of the transmission 74. Furthermore, no air ducts are coupled directly to the clutch cover 92, thereby further facilitating ease of removal and replacement. Clutch cover 92 may be coupled to flange 94 of housing 90 by any suitable fastening means, such as conventional nuts and bolts or machine screws 113 (FIGS. 19A and 19B). While outer wall of clutch cover 92 and flange 94 are shown as having curved shapes, it should be appreciated that any inwardly angled surface may be substituted therefore.

Engine 72 includes removable fuel tank 82 and air intake 84. Muffler 76 is coupled to engine 72 by exhaust conduit 75. In this illustrative embodiment, engine 72 in an inline 2 cylinder engine having a displacement of 850 cubic centimeters, although any suitable engine may be used. Engine 72 is hard mounted to frame 50 and oriented in a north/south or longitudinal position. More particularly, the crankshaft 73 (FIGS. 17 and 18) of engine 72 defines a longitudinal axis 71 which is substantially parallel to frame longitudinal axis 51, and is perpendicular to front axle 116 and rear axle 118.

In the illustrative embodiment of FIGS. 10A-11, an updraft system 85 provides air flow passages from the air intake 84 to the cylinder ports 89a and 89b (FIG. 10A) of engine 82 in a manner facilitating a narrow width of the upper portion of engine 82. As noted herein, such narrow width of engine 82 provides a comfortable riding position for the driver. Air intake 84 is in fluid communication with an updraft intake manifold 91, which defines a chamber below runners 93. Air, represented by arrows 95 in FIG. 10A, flows from air intake 84 through conduit 96 and into manifold 91. Air 95 then flows upwardly from manifold 91 (i.e., updraft) through runners 93A and 93B into cylinder ports 89A and 89B, respectively. A throttle body 97 is illustratively attached to manifold 91, and may be coupled at either end or centered with respect to manifold 91 in order to assist in tuning and in facilitating the flow of air 95 to engine 82. In an alternative arrangement, separate throttle bodies 97 may be used for each cylinder, and mounted below the intake runners 93 and coupled thereto for each cylinder. Such an arrangement permits the ergonomic narrow package at the upper portion of engine 82, while changing the flow and tuning characteristics of the intake chamber of manifold 91.

Figure 13:
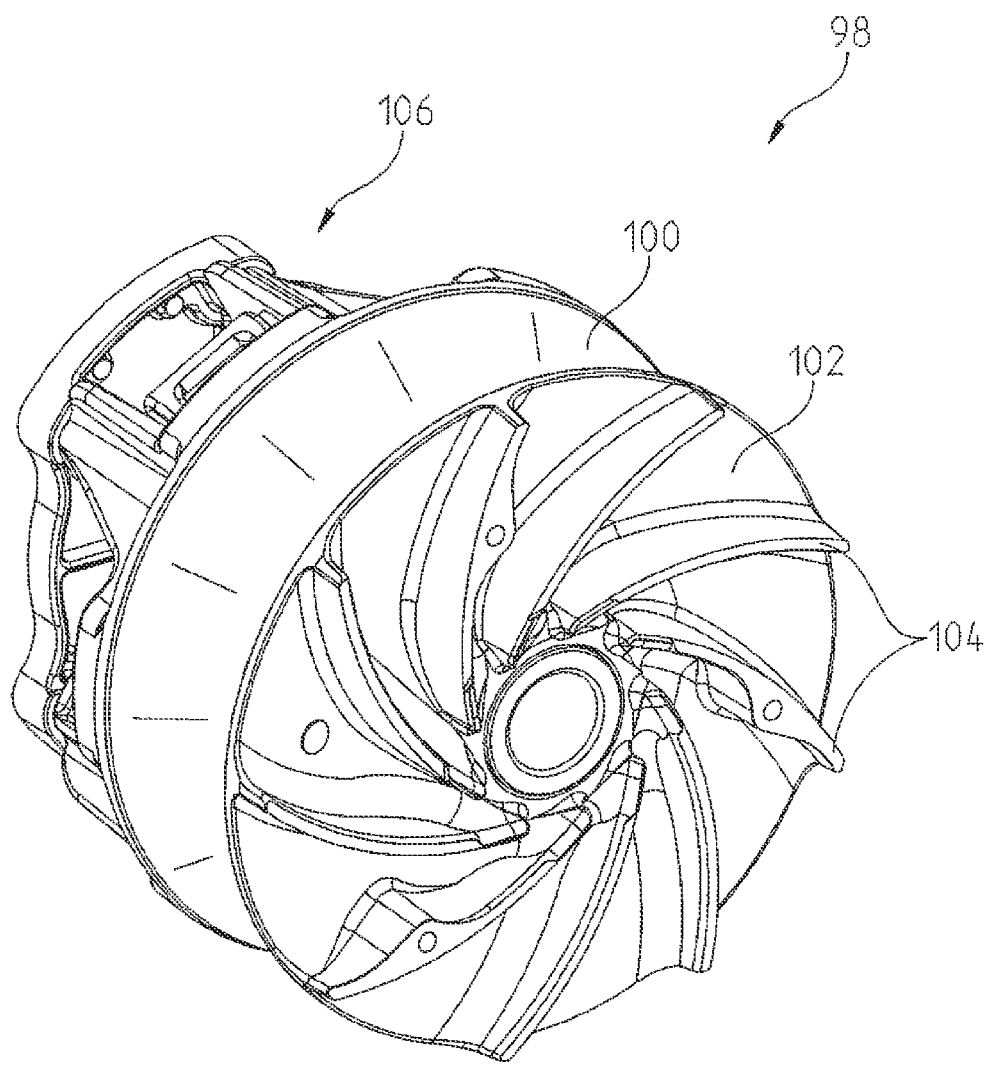
FIG. 13 is a perspective view of the drive clutch of FIG. 12.
Figure 19C:
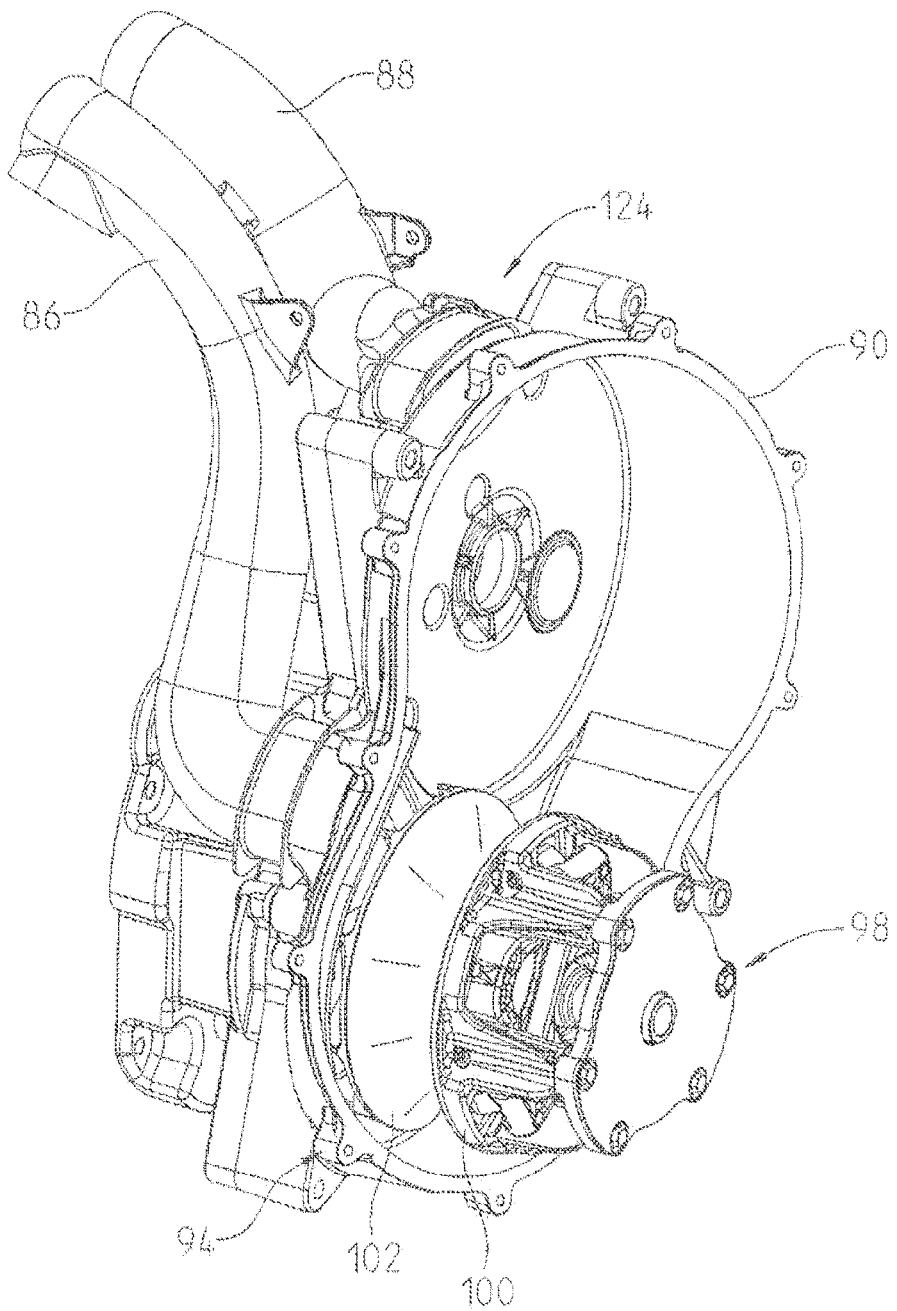
FIG. 19C is a rear perspective view similar to FIG. 19B, with the clutch cover and driven clutch removed from the housing and showing the drive clutch.

Referring now to FIGS. 10A-12, in this illustrative embodiment, transmission 74 is a CVT (Continuously Variable Transmission), sometimes referred to as a variable pulley transmission. Transmission 74 includes a primary variable pulley or drive clutch 98 and a secondary variable pulley or driven clutch 99. With reference to FIGS. 12, 13, and 19C, an illustrative example of primary variable pulley or drive clutch 98 received within housing 90 and clutch cover 92 is shown. Drive clutch 98 is mounted to a rotatable input shaft 101 and includes a movable pulley member or sheave 100 and a stationary pulley member or sheave 102. A clutch mechanism 106 is operably coupled to movable sheave 100 and is configured to control movement of the movable sheave along the shaft 101 closer to and further away from stationary sheave 102.

With reference to FIG. 12, driven clutch 99 is mounted to a rotatable output shaft 103, and is illustratively coupled to additional drive train components as further detailed below. Driven clutch 99 may be of conventional design as including a movable pulley member or sheave 105 and a stationary pulley member or sheave 108. A clutch mechanism 111 is configured to normally urge movable sheave 105 toward stationary sheave 108. A generally V-shaped belt 155 extends between the drive clutch 98 and the driven clutch 99. Additional details of continuously variable transmissions are provided in U.S. Pat. Nos. 6,149,540 and 7,163,477, the disclosures of which are expressly incorporated by reference herein.

With further reference to drive clutch 98 of FIGS. 10A-13, stationary pulley plate 102 includes a plurality of fins or vanes 104 in an impeller shaped orientation. When engine 72 provides power to transmission 74, input shaft 101 rotates outer pulley plate 102. Vanes 104 create air movement and pump cooling air through transmission 74. More particularly, air flow (shown by arrows 107) is received from conduit 86 and enters housing 90 (FIG. 10A). The cooling air 107 is forced by vanes 104 through housing 90 and out though an opening in housing 90 to conduit 88 (FIG. 10B). Conduit 88 is fluidly coupled to vent 87 that is positioned adjacent to exhaust conduit 75. The heated air from transmission 74 exits vent 87 and cools exhaust conduit 75 to reduce heat radiated from the exhaust to body panels 22 and 27. The heated air from transmission 74 is substantially cooler than exhaust conduit 75 and provides a significant cooling effect. In an alternative embodiment, air flow supplied to vent 87 may be provided by an element controlled separately from transmission 74, such as an electric fan that may be used on demand.

Figure 14:
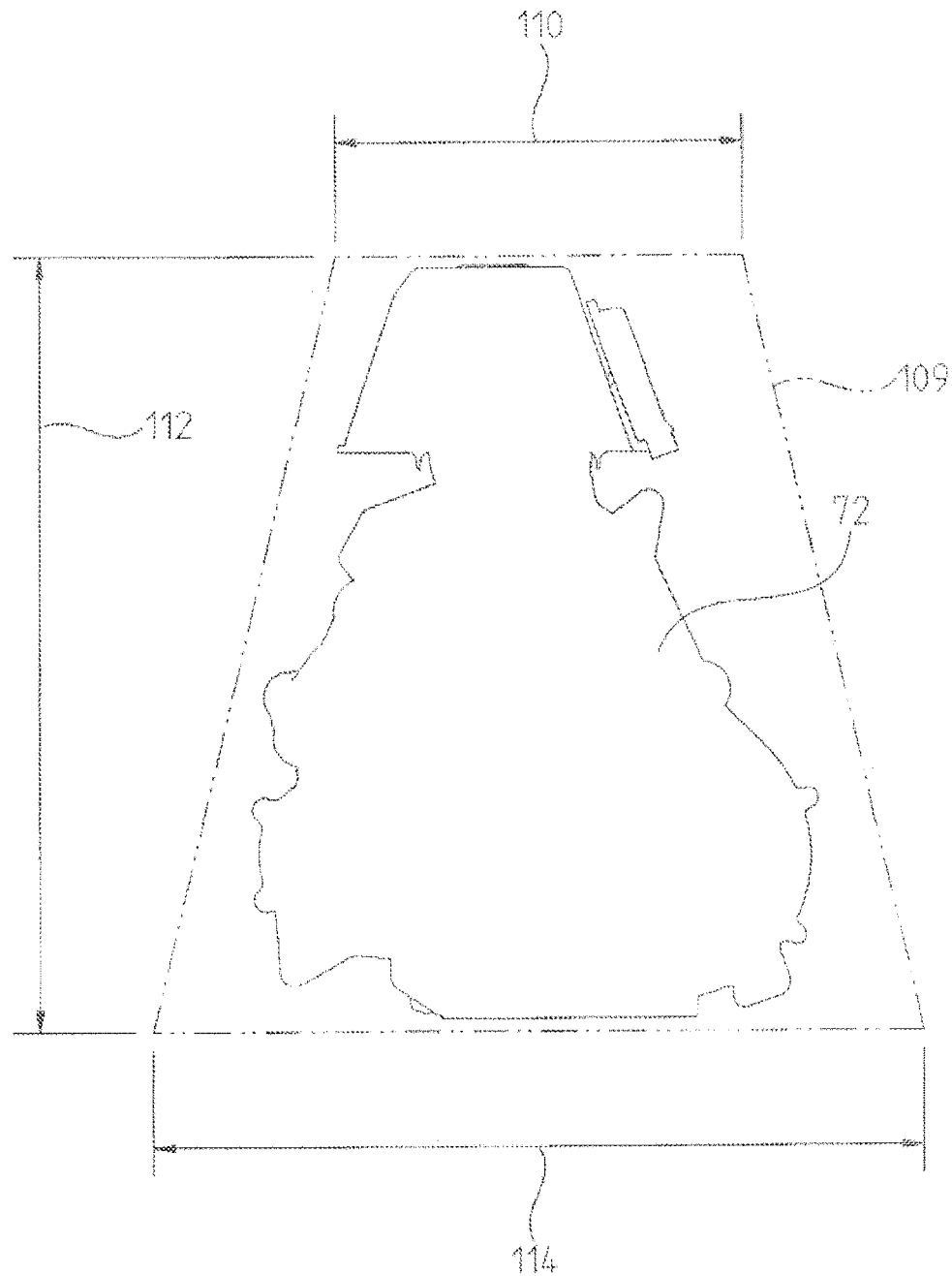
FIG. 14 is a front view of an engine assembly and a trapezoid illustrating limiting dimensions of the engine assembly, in accordance with illustrative embodiments of the present invention.

FIG. 14 is an illustrative cross-sectional view of engine 72 shown within a perimeter defining trapezoid 109. In this illustrative embodiment, engine 72 has been designed to fit within limits of an outer perimeter defined by trapezoid 109. Trapezoid 109 is defined by height 112, upper width 110, and lower width 114. Illustratively, height 112 is within a range of 279 millimeters (about 11 inches) to 518 millimeters (about 20.39 inches), upper width 110 is within a range of 148 millimeters (about 5.83 inches) to 275 millimeters (about 10.38 inches), and lower width 114 is within a range of 279 millimeters (about 11 inches) to 518 millimeters (about 20.39 inches). For this exemplary embodiment, height 112 is equal to about 432 millimeters (about 17 inches), upper width 110 is equal to about 229 millimeters (about 9 inches), and lower width 114 is equal to about 432 millimeters (about 17 inches). Trapezoid 109 defines the approximate shape and size a rider of ATV may straddle to be comfortably seated on seat 20 of ATV 10. Reducing the upper and lower widths 110 and 114 of trapezoid 109 may improve rider comfort, especially shorter riders who may have trouble straddling seat 20 and contacting footwells 28.

Figure 15:
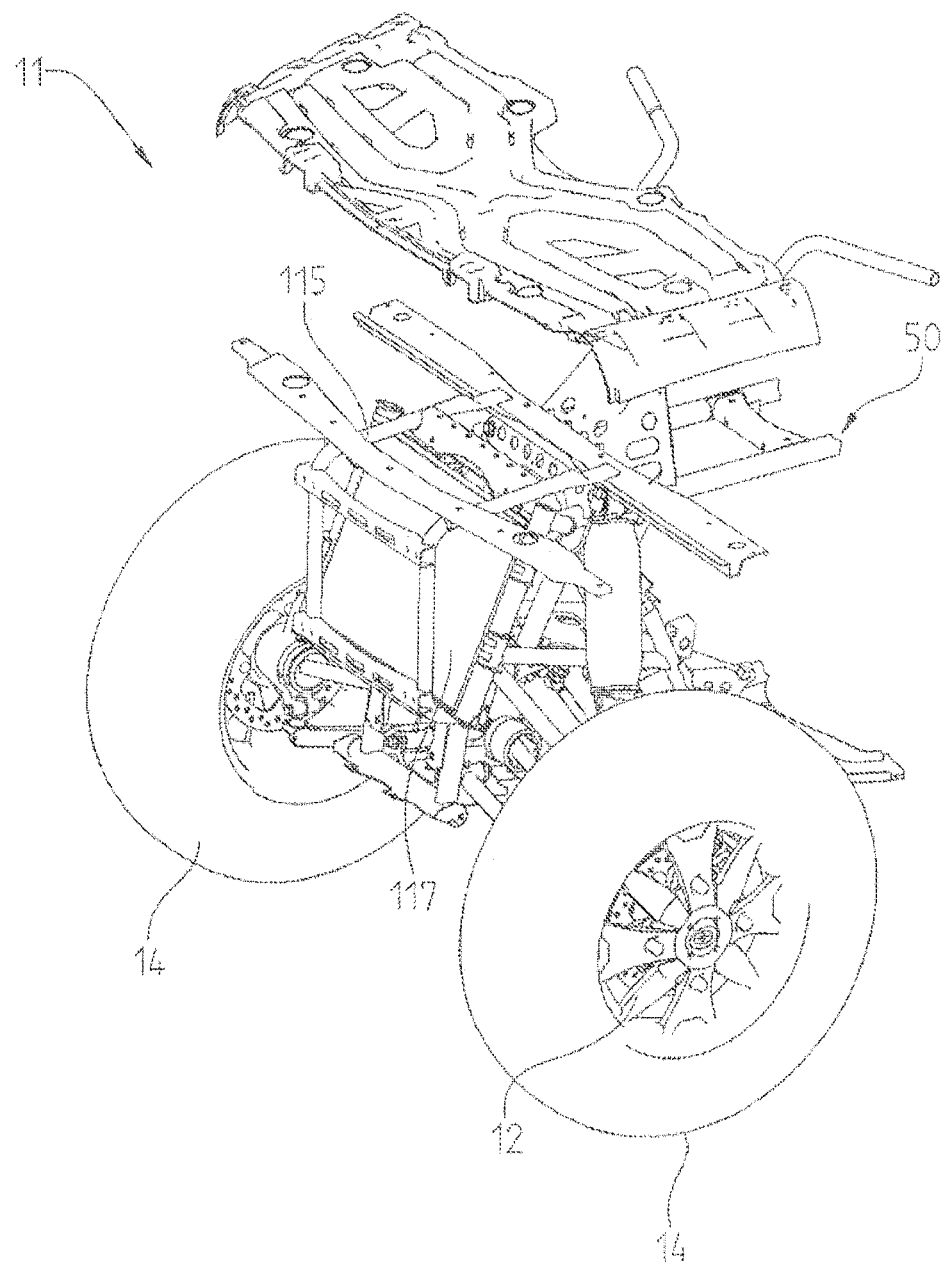
FIG. 15 is a partial perspective view of the radiator assembly of the ATV shown in FIG. 1.
Figure 16:
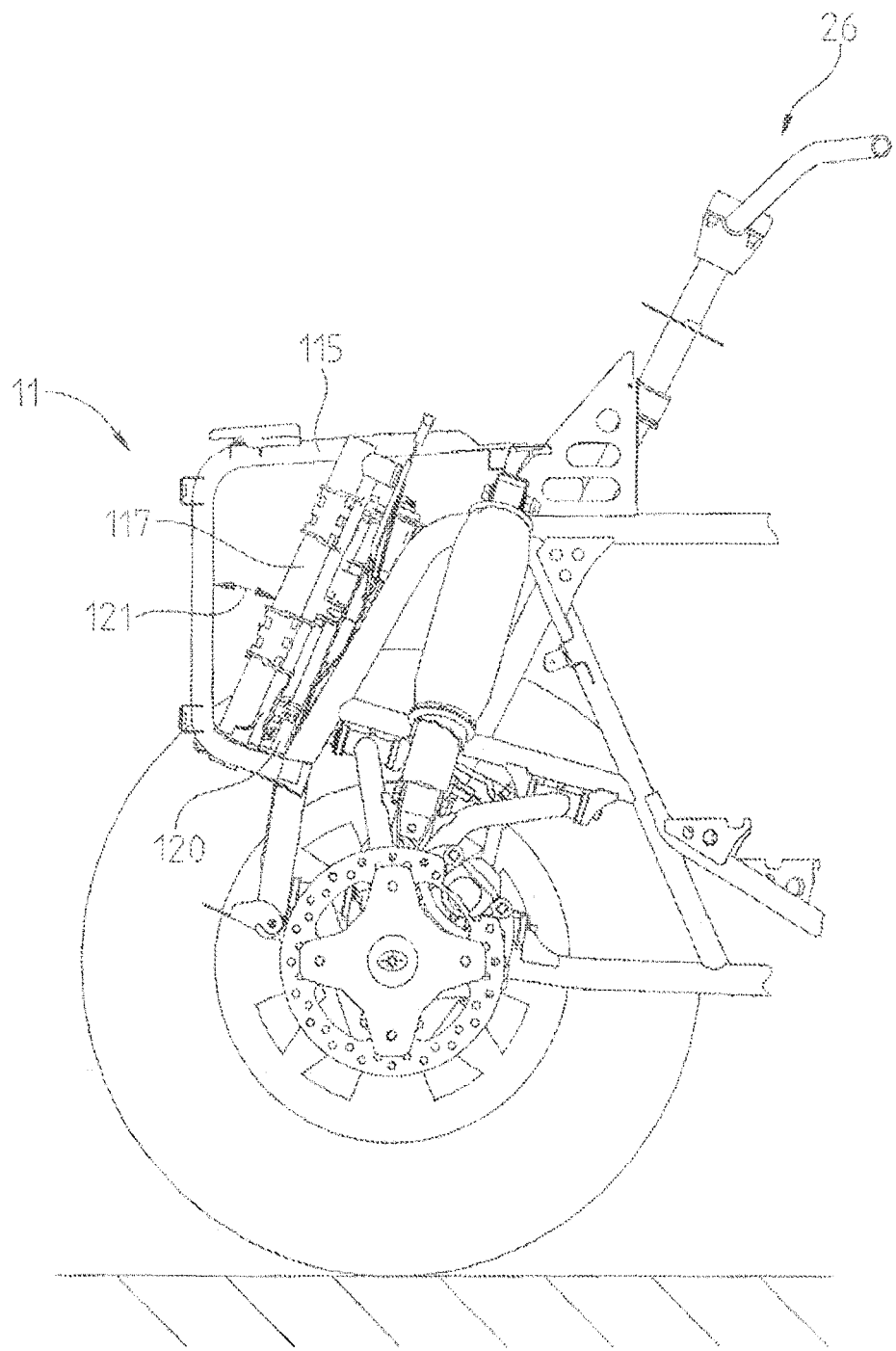
FIG. 16 is a partial side of the radiator of the ATV shown in FIG. 1.
Figure 17:
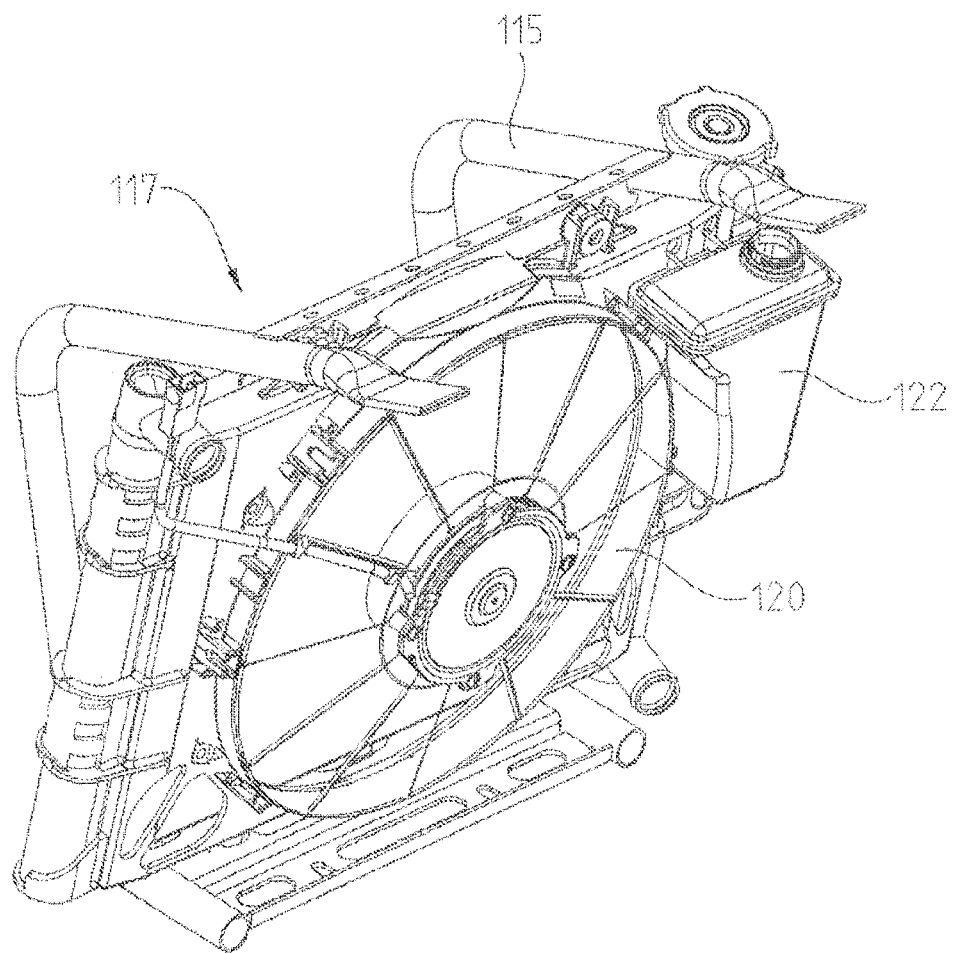
FIG. 17 is a perspective view of the radiator of and cooling system of the ATV shown in FIG. 1.

Referring now to FIGS. 15-17, front end 11 of ATV 10 is shown as including radiator 117. Front end 11 of ATV 10 also includes front portion 115 of frame 50. Radiator 117 is coupled to engine 72 and cools the engine coolant from engine 72. Cooling fan 120 is positioned behind radiator 117 to draw cooling air over radiator 117 (FIGS. 15 and 16). Cooling fan 120 may be powered by any suitable means such as an electric or hydraulic motor, or directly off of engine 72. Coolant overflow bottle 122 is also coupled to radiator 117. As shown best in FIG. 15, radiator 117 is tilted backward relative to a vertical axis at an angle designated by reference numeral 120. In this illustrative embodiment, angle 121 is equal to about 24 degrees. Tilting radiator 117 back allows radiator 117 to have a larger cooling surface area than if it were oriented vertically. For example, the surface area of radiator 117 may be approximately 1155 square centimeters (approximately 179 square inches) compared to approximately 1061 square centimeters (approximately 164.5 square inches) if radiator 117 were oriented vertically. More particularly, the illustrative embodiment angled radiator 117 has dimensions of approximately 393 millimeters (approximately 15.5 inches) by approximately 294 millimeters (approximately 11.6 inches). A radiator oriented in a vertical plane and sized to fit within the same package would have dimensions of approximately 393 millimeters (approximately 15.5 inches) by approximately 270 millimeters (approximately 10.6 inches).

Figure 18A:
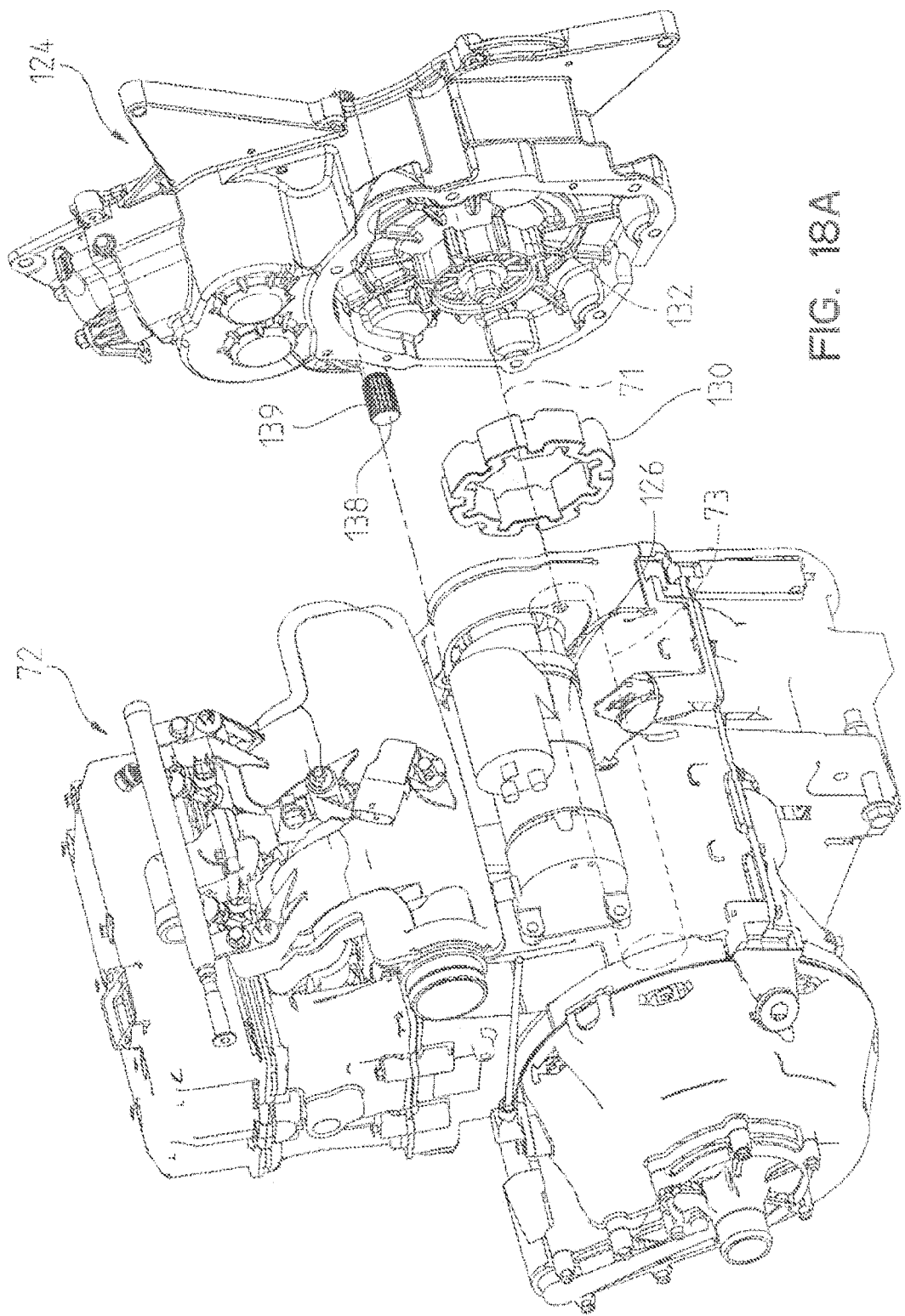
FIG. 18A is a partially exploded front perspective view of an engine and transmission assembly that may be used in an ATV such as the one shown in FIG. 1.
Figure 18B:
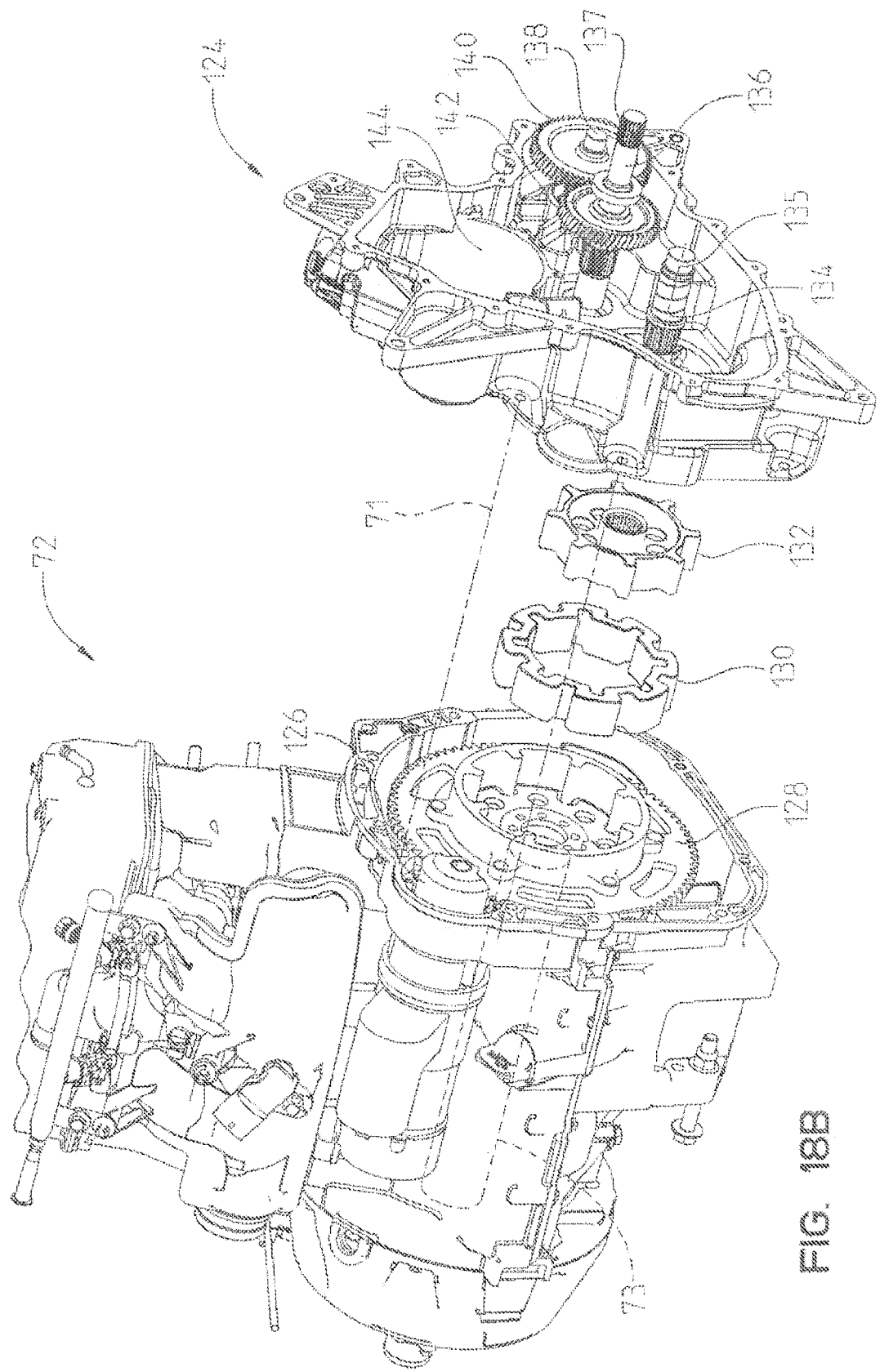
FIG. 18B is a partially exploded rear perspective view of the engine and transmission shown in FIG. 18A.

Referring now to FIGS. 18A and 18B, engine 72 and transmission housing 124 are shown. Engine 72 includes flywheel 128 which is driven off the crankshaft 73 (shown in phantom in FIGS. 17A and 17B) of engine 72. Starter 126 may be used to rotate flywheel 128 when engine 72 is started. Flywheel 128 includes coupler 130 which cooperates with rotational member 132 of transmission housing 124. Rotational member 132 is coupled to one end of shaft 134 and transmits power from flywheel 128 to shaft 134. More particularly, coupler 130 is a female component which receives rotational member 132, a male component, in a rotationally fixed relationship. Coupler 130 is illustratively made of a resilient material, such as elastomeric rubber, and provides torsional dampening between engine 72 and transmission 74. More particularly, coupler 130 reduces gear noise, reduces torque pulses, and reduces impact loading of gear teeth.

A further illustrative transmission 74' is shown in FIGS. 19A-20B for use with a different sized engine (not shown). Transmission 74' is substantially similar to transmission 74 and, as such, like components are identified with like reference numbers.

Figure 20A:
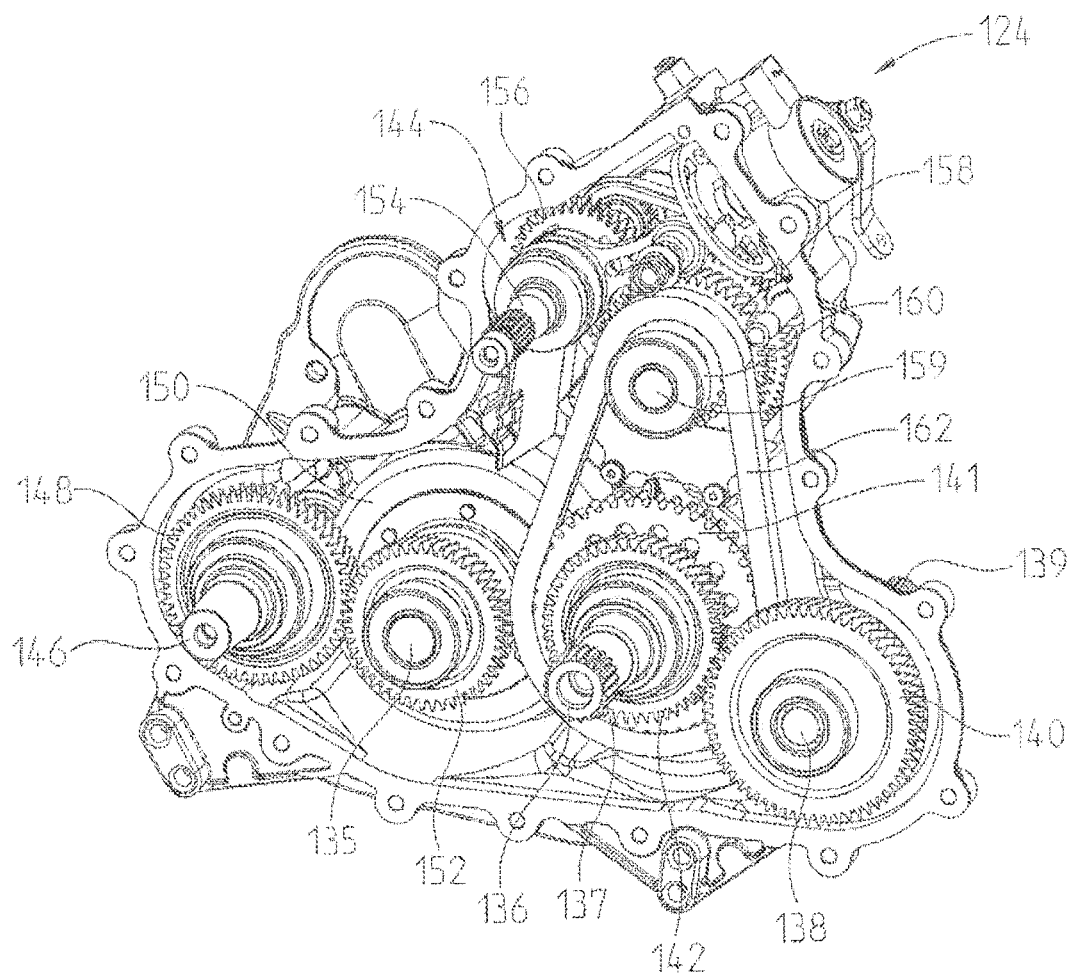
FIG. 20A is first rear perspective view of the internal transmission assembly shown in FIG. 19A.
Figure 20B:
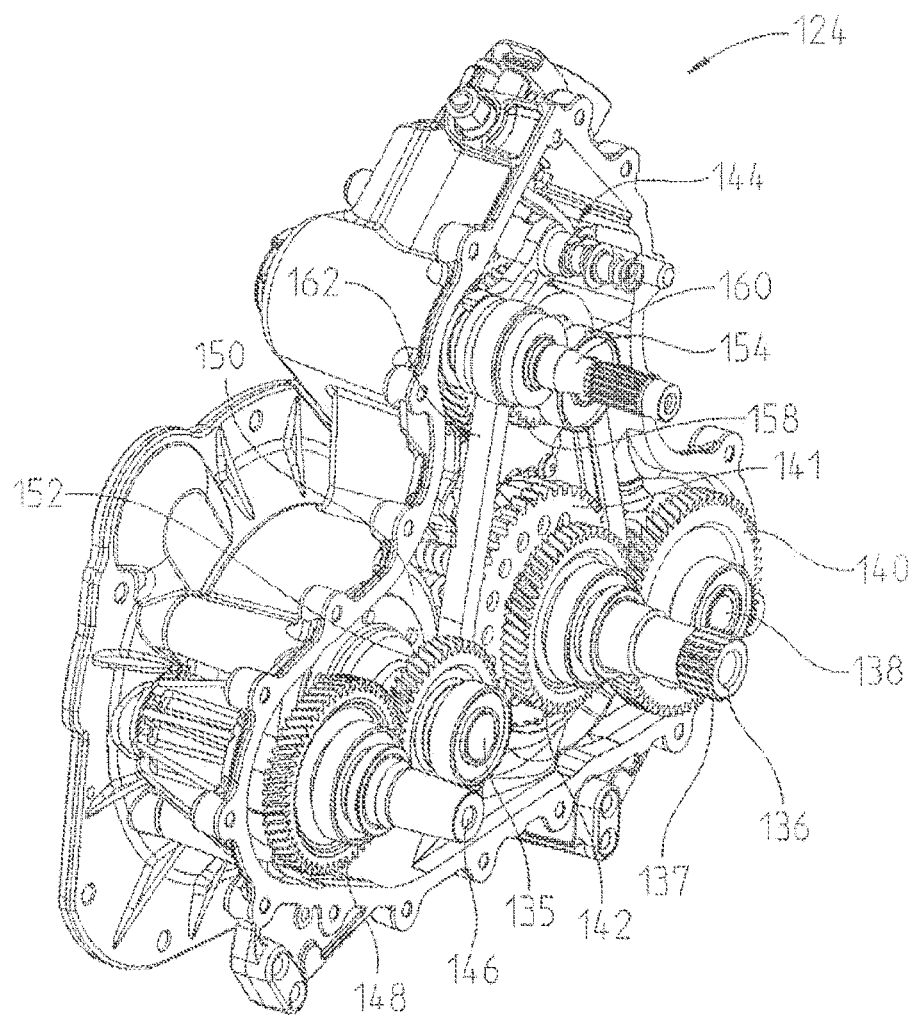
FIG. 20B is a second rear perspective view of the internal transmission assembly shown in FIG. 20A.

With further reference to FIGS. 20A and 20B, a starting clutch 150 is coupled to shaft 134. Shaft 135 and gear 152 extend from starting clutch 150. Starting clutch 150 may be calibrated to engage when shaft 135 reaches any suitable revolutions per minute (RPMs). When the predetermined RPM of shaft 134 is reached, starting clutch 150 rotates shaft 135 and gear 152. Starting clutch 150 may illustratively comprise any conventional centrifugally activated starting clutch positioned within transmission housing 124.

With further reference to FIGS. 12, 20A and 20B, rotation of gear 152 rotates gear 148 and shaft 146. Input shaft 101 of drive clutch 98 (FIG. 12) is coupled to the shaft 146. Output shaft 154 of driven clutch 99 (FIG. 12) is coupled to shaft 154. Belt 155 extends between these variable pulleys 98 and 99 to transfer rotational power from the drive pulley 98 coupled to shaft 146 to the driven pulley 99 coupled to shaft 154, in a known manner. In this embodiment, the drive and driven clutches 98 and 99 rotate in an opposite direction relative to the crankshaft 73 of engine 72 to produce a counterbalancing effect that reduces overall gyro or rotational forces of engine 72 and transmission 74 on frame 50, thereby facilitating hard mounting of engine 72 to frame 50. More particularly, opposing rotational forces offset each other, thereby reducing rotation about the vehicle's roll axis (about the engine crankshaft 73). In other words, vehicle rotational (gyro) effect is reduced by opposing moments of rotation between engine 72 and transmission 74.

With reference to FIGS. 12 and 21A-21C, additional details of illustrative drive clutch 98 are shown. Clutch mechanism 106 of drive clutch 98 includes a first or primary spring 161 for normally biasing movable sheave 100 away from stationary sheave 102. Clutch mechanism 106 also includes a plurality of pivotally mounted centrifugal weights 163 which urge movable sheave 100 toward stationary sheave 102 in response to rotation of drive clutch 98. Thus, drive belt 155 rides near the center of drive clutch 98 when the engine 72 (and, hence, the drive clutch 98) is rotating at slow speeds. At higher speeds, the centrifugal weights 163 urge movable sheave 100 toward stationary sheave 102, thereby pinching belt 155 and causing it to move outwardly between sheaves 100 and 102.

A spider 164 is secured for rotation with input shaft 101, and is captured between movable sheave 100 and a cover 165 which, in turn, is secured to movable sheave 100. First spring 161 urges cover 165 and, therefore, movable sheave 100 away from stationary sheave 102. Radially extending ends of spider 164 provide bearing surfaces 166 against which centrifugal weights 163 act to urge movable sheave 100 toward stationary sheave 102 at rotational speeds above engine idle.

A second or pre-load spring 167 is received intermediate spider 164 and movable sheave 100. Second spring 167 is configured to bias movable sheave 100 toward stationary sheave 102 with sufficient force to pinch belt 155 when there is little or no rotation of drive clutch 98 (i.e., when the centrifugal weights 163 are not urging movable sheave 100 toward stationary sheave 102 with more than a nominal force). Second spring 167 also helps keep belt 155 tight within sheaves 100 and 102, thereby reducing logging or slippage. Second spring 167 further compensates for belt wear by helping the belt maintain its relative position within sheaves 100 and 102, thereby preserving the transmission ratio between clutches 98 and 99.

Figure 21A:
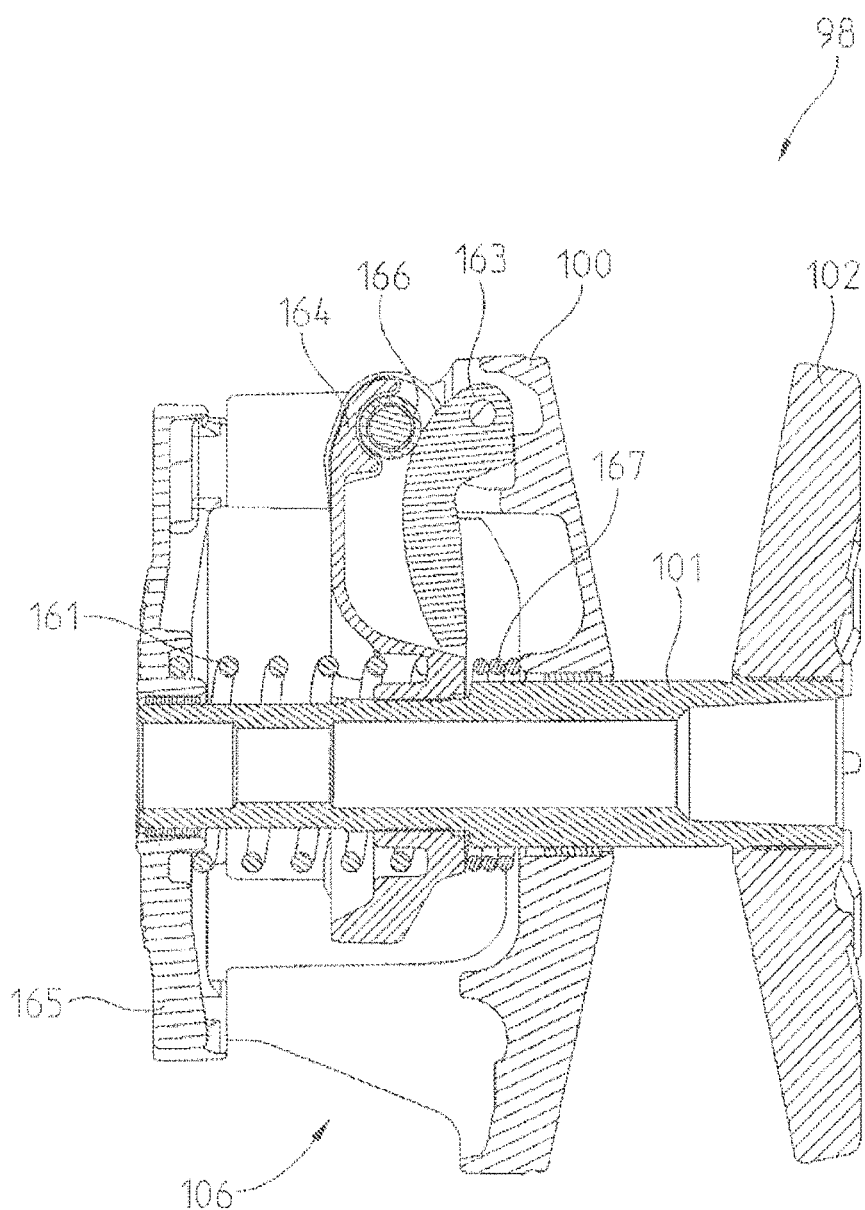
FIG. 21A is a cross-sectional view of the drive clutch of FIG. 12, with the drive clutch shown in a fully opened position.
Figure 21B:
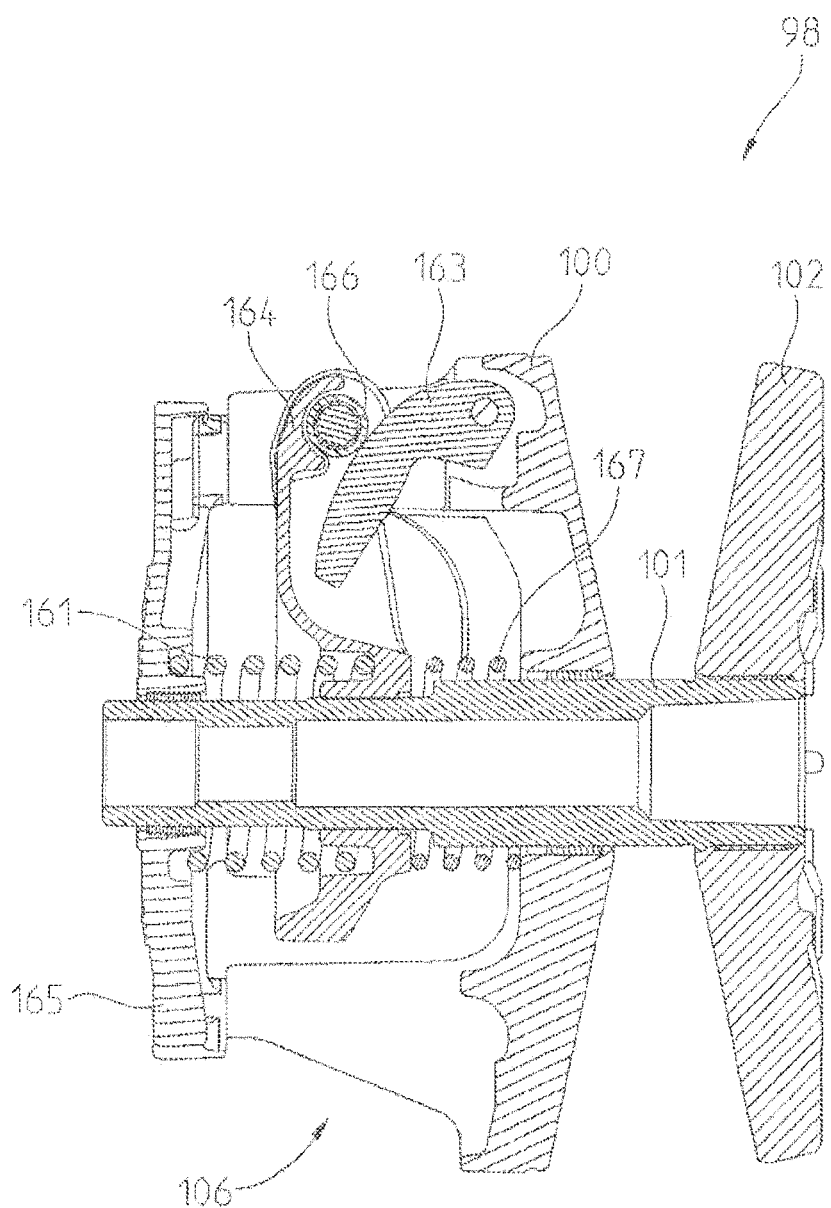
FIG. 21B is a cross-sectional view similar to FIG. 21A, with the drive clutch shown in a static position.
Figure 21C:
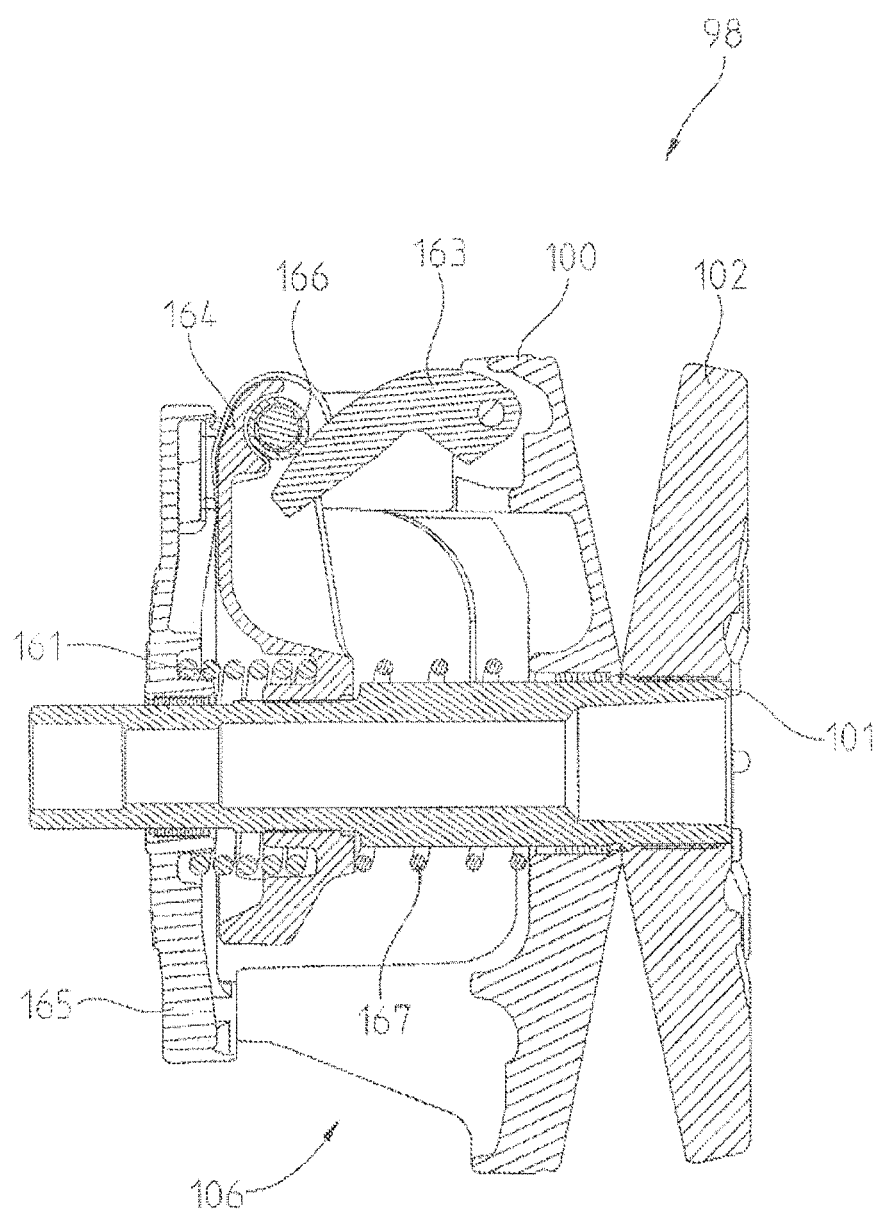
FIG. 21C is a cross-sectional view similar to FIG. 21B, with the drive clutch shown in a fully closed position.

FIGS. 21A-21C illustrate three different positions of drive clutch 98, corresponding to three different speeds of transmission 74. FIG. 21A shows drive clutch 98 in a fully open position. This open position occurs when tension within belt 155 is sufficient to overcome the bias of second spring 167, typically due to torque feedback from driven clutch 99.

FIG. 21B shows drive clutch 98 in a static or partially closed position. This static position occurs when rotation of the flyweights 163 has urged movable sheave 100 toward stationary sheave 102. Secondary spring 167 applies a side force on belt 155. In this position the load of the first spring 161 is substantially equal to the load of the second spring 167 (without belt 155). If the vehicle were to stop suddenly, drive clutch 98 would only open to this position, and belt 155 would remain in contact with sheaves 100 and 102.

FIG. 21C shows drive clutch 98 in a fully closed position. In such a position, second spring 167 has exceeded its free length. As such, second spring 167 is no longer applying force against movable sheave 100.

Drive clutch 99 is configured to operate at optimum rotational speed (RPM) regardless of the type of engine 72 used. More particularly, transmission 74 is configured to facilitate the changing of gears 148 and 152 such that clutches 98 and 99, respectively, operate at efficient rotational speeds for different engines 72 that may be coupled to the transmission 74. This allows the transmission 74 to be adaptable to a wide variety of engines 72.

As shown in FIGS. 12, 20A, and 20B, when driven clutch 99 on shaft 154 rotates, gear 156 on shaft 154 rotates gear 158 on shaft 159. Shaft 159 also includes sprocket 160 which rotates belt or chain 162. Belt 162 rotates sprocket 141 on shaft 136. Shaft 136 includes splined portion 137 which transfers power to rear differential 78. Shaft 136 also rotates gear 142 which, in turn, rotates gear 140 on shaft 138. Shaft 138 includes splined portion 139 which transfers power to front differential 80. In this illustrative embodiment, gears 142 and 140 have different diameters to rotate shafts 136 and 138 at different speeds. It should be noted that although gears 156 and 158 are shown in cavity 144 in housing 124, any suitable gear set may be positioned within cavity 144. Such gear sets may include multiple forward speeds and/or a reverse gear that may be actuated by a shift lever, such as shift lever 23 as shown in FIG. 3. It should be appreciated that the longitudinal orientation of shafts 134, 146, 154, 159, 136, and 138 facilitates the addition and substitution of gear reductions and step-ups within the driveline defined by engine 72 and transmission 74, without affection dimension 44 of rider straddle width (FIG. 5).

Referring now to FIGS. 22-25, front end 11 and front suspension 30 of ATV 10 are shown. Front suspension 30 includes upper and lower control arms, illustratively A arms 172 and 170, on each side of ATV 10. Upper A arms 172 are coupled on one end at upper inner pivot couplings 187 to brackets 188 of tube 186 of front portion 52 of frame 50. On the opposing ends, upper A arms 172 are coupled at upper outer pivot couplings 194, illustratively ball joints, to spindles 190. Lower A arms 170 are coupled on one end at lower inner pivot couplings 189 to brackets 184 of front portion 52 of frame 50. On the opposing ends, lower A arms 170 are coupled at lower outer pivot couplings 196, illustratively ball joints, to spindles 190. Upper A arms 172 also include brackets 182 which are coupled to shock absorbers 180. Shock absorbers 180 dampen the upward and downward travel of frame 50 relative to spindles 190, and thus wheels 12, to provide a comfortable ride to the rider of ATV 10. A wheel hub 174 is supported for rotation relative to each spindle 190 about rotational axis 191, in a known manner. A plurality of fasteners 198 cooperating with lug nuts 207 couple wheel 12 to hub 174.

Front axles or half shafts 116 extend from front differential 80 through spindles 190 on each lateral side of front end 11 of ATV 10. Each half shaft 116 is operably coupled to a respective hub 174 and thus wheel 12. In this illustrative embodiment, ATV 10 is four-wheel drive. As such, front axles 116 are rotated by front differential 80 to power front wheels 12, and rear axles 118 are rotated by rear differential 78 to power rear wheels 16.

Figure 22:
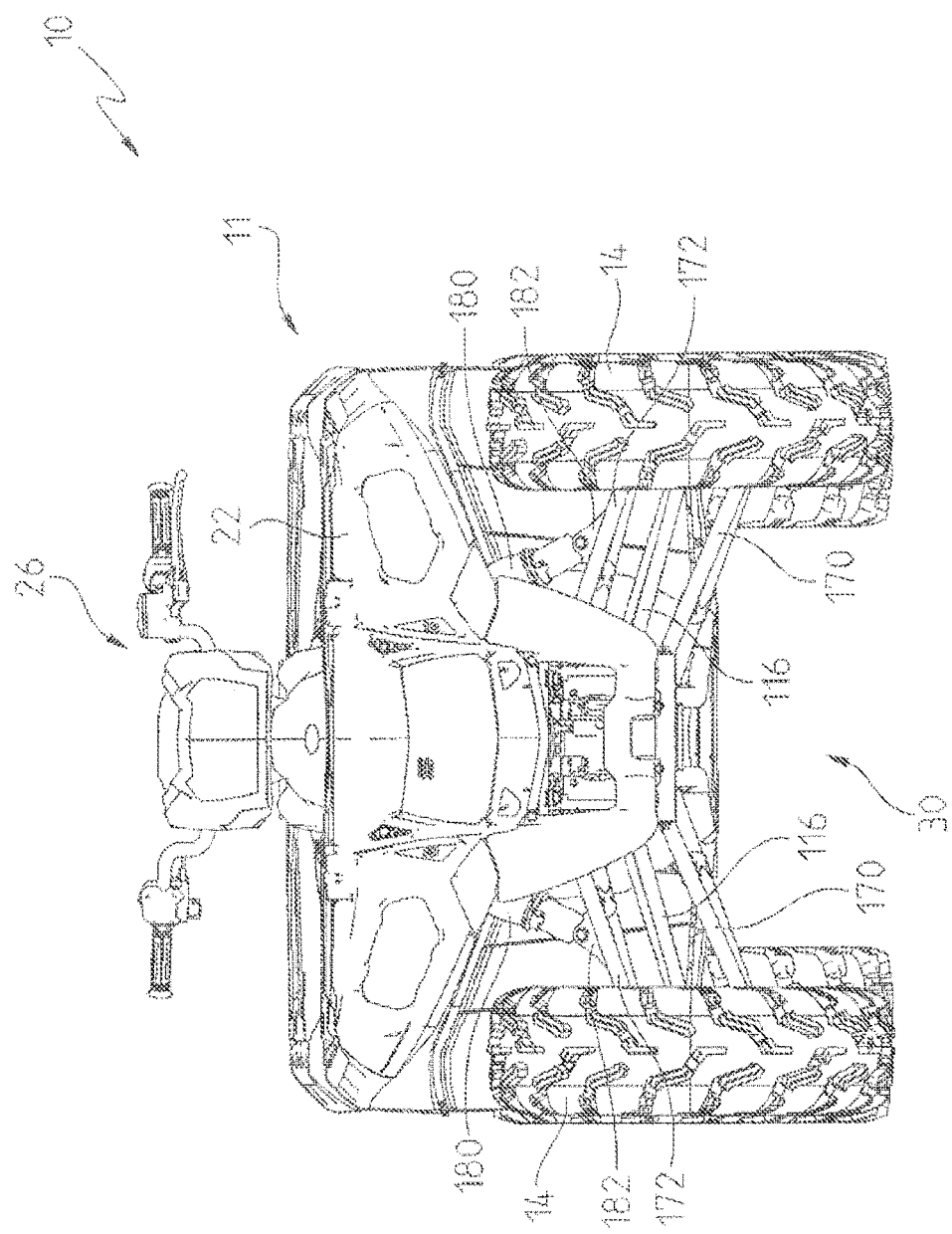
FIG. 22 is a front view of the ATV shown in FIG. 1.
Figure 23:
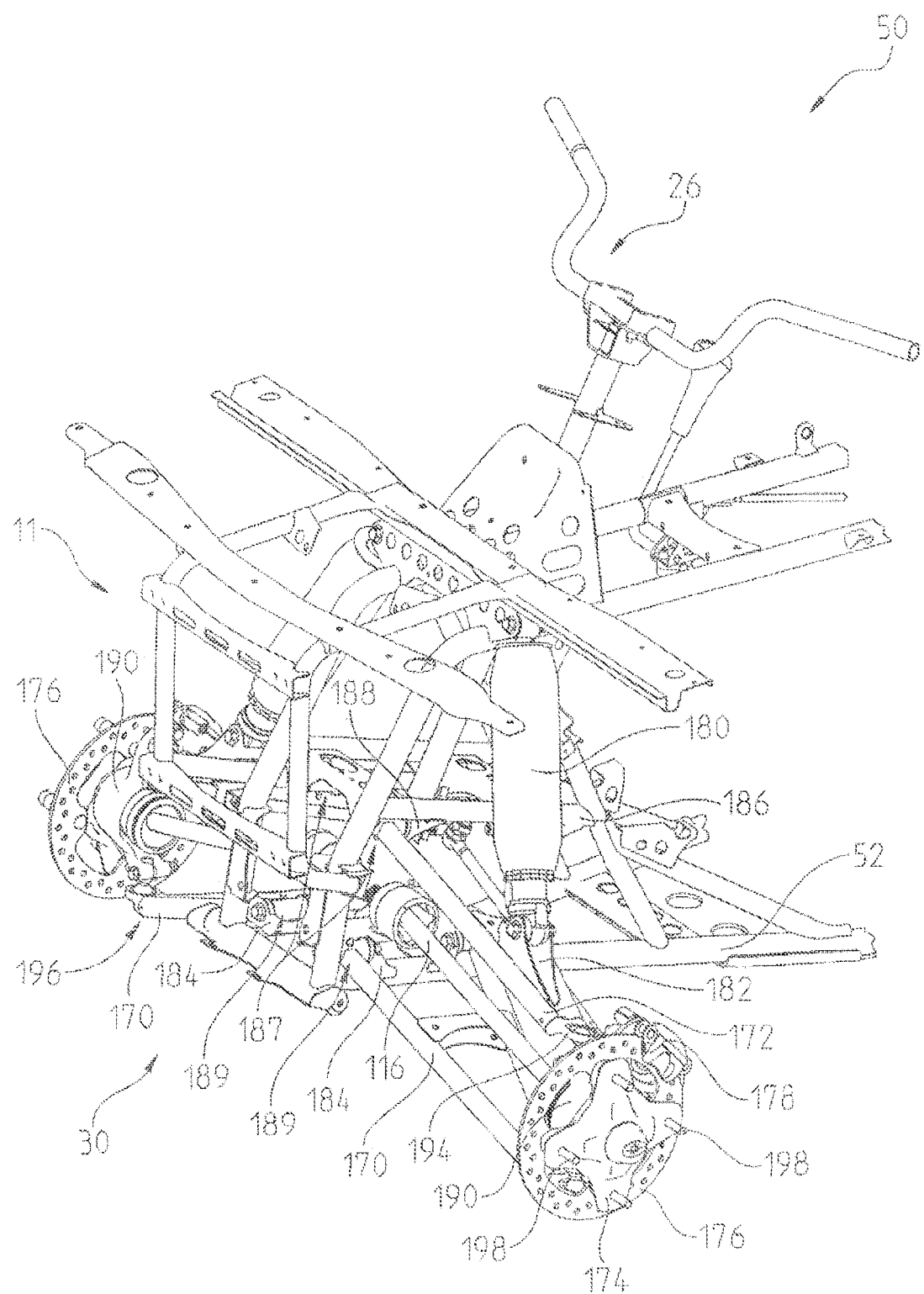
FIG. 23 is a partial perspective view of the front suspension of the ATV shown in FIG. 1.
Figure 24:
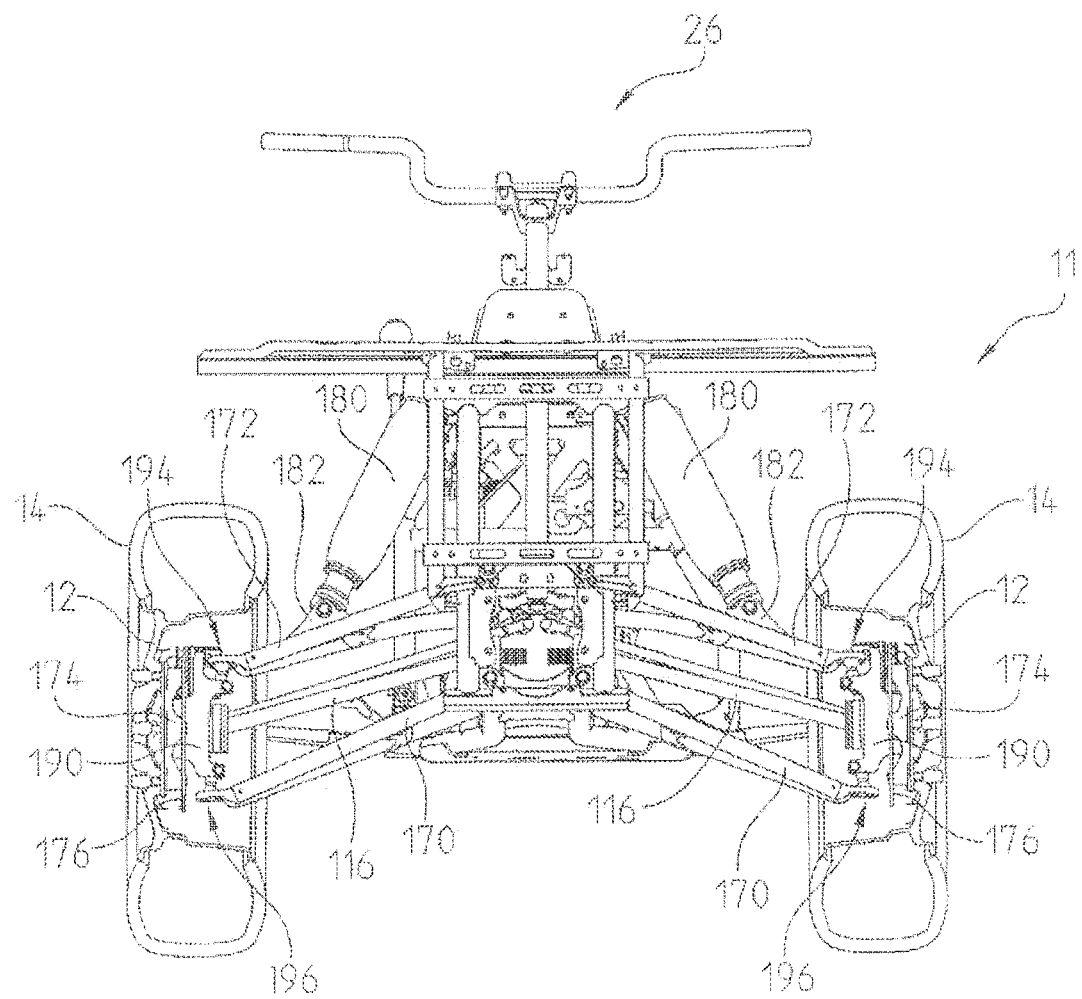
FIG. 24 is front view of the suspension components shown in FIG. 23 with the wheels shown in cross section.

Referring further to FIGS. 22 and 23, cross-sectional views for front wheels 12 and tires 14 are shown. As shown in FIG. 23, properly inflated tires 14 define width 192, while wheels 12 define width 193. In this illustrative embodiment, width 192 is equal to approximately 203 millimeters (approximately 8 inches), while width 193 is equal to approximately 173 millimeters (approximately 6.8 inches). Wheels 12 are configured such that spindle 190 is positioned within width 193. In this configuration, upper and lower A arms 172 and 170 extend into width 193 of wheels 12 to couple to ball joints 194 and 196, respectively. In the illustrative embodiment, upper ball joint 194 is laterally recessed within wheel 12 by approximately 48.3 millimeters (approximately 1.9 inches). This allows upper and lower A arms 172 and 170 to have a substantially longer length than if spindles 190 extended outside of width 193 of wheels 12. Increasing the length of upper and lower A arms 172 and 170 may reduce the travel angles of axles 116 during jounce in addition to increasing the length of travel of wheels 12 during jounce. An example of jounce is shown diagrammatically in FIG. 24B. Jounce occurs when at least one of front wheels 12 encounters a bump.

Figure 25:
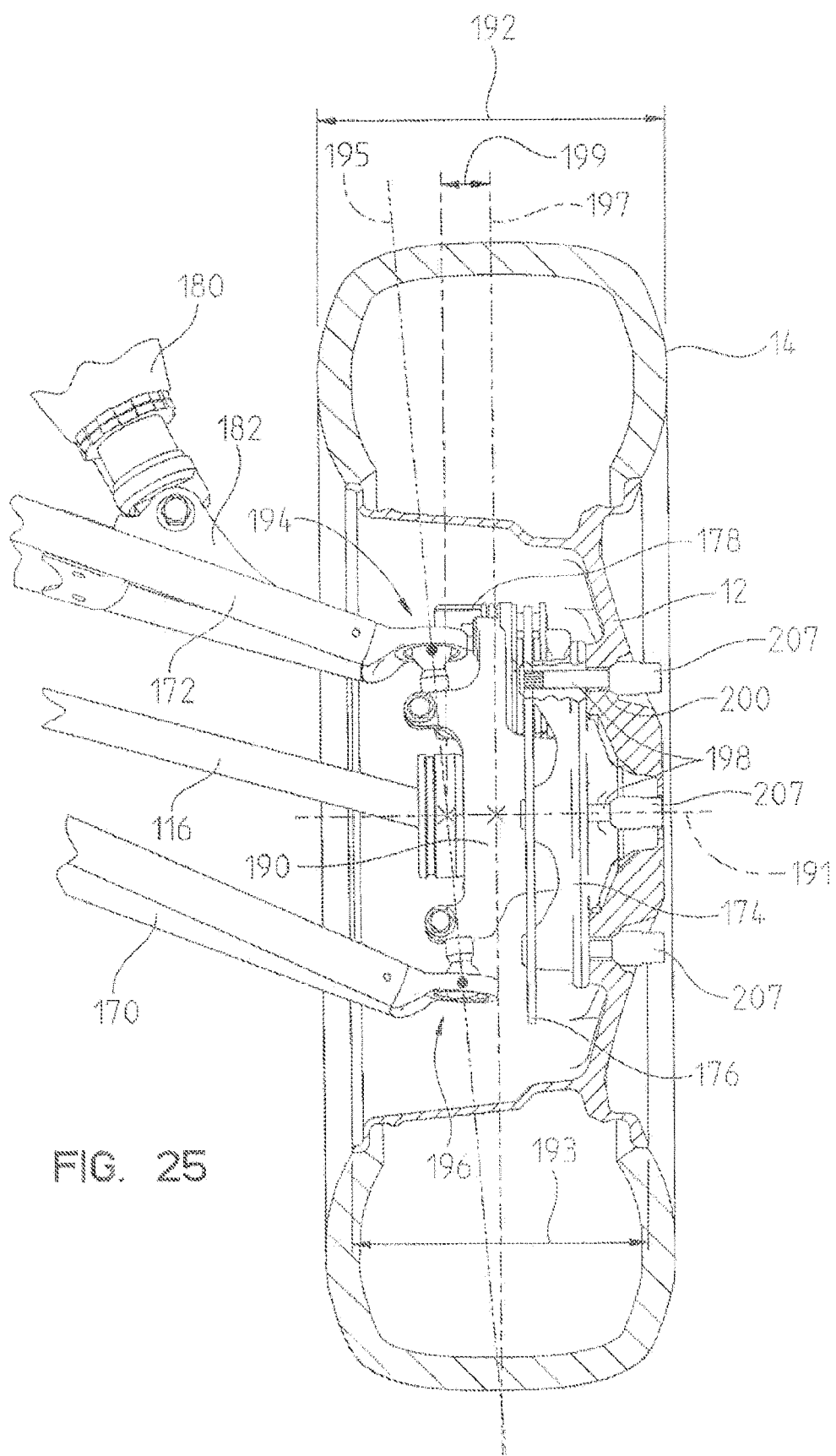
FIG. 25 is a cross-sectional view of one of the front wheels shown in FIG. 24.

With further reference to FIG. 25, upper and lower ball joints 194 and 196 together define an axis of rotation, commonly referred to as a king pin axis 195. Turning of the handlebar assembly 26 results in rotation of the front wheel 12 about the king pin axis 195. Each front wheel 12 and tire 14 defines a front wheel center axis 197. A king pin offset 199 is defined as the distance between the king pin axis 195 and the wheel center axis 197, as measured along the rotational axis 191. The improved ride and handling characteristics detailed above are realized by reducing the king pin offset 199. In the illustrative embodiment, the king pin offset 199 is less than about 30 millimeters (about 1.18 inches), and is illustratively equal to about 28.5 millimeters (about 1.12 inches).

Figure 26A:
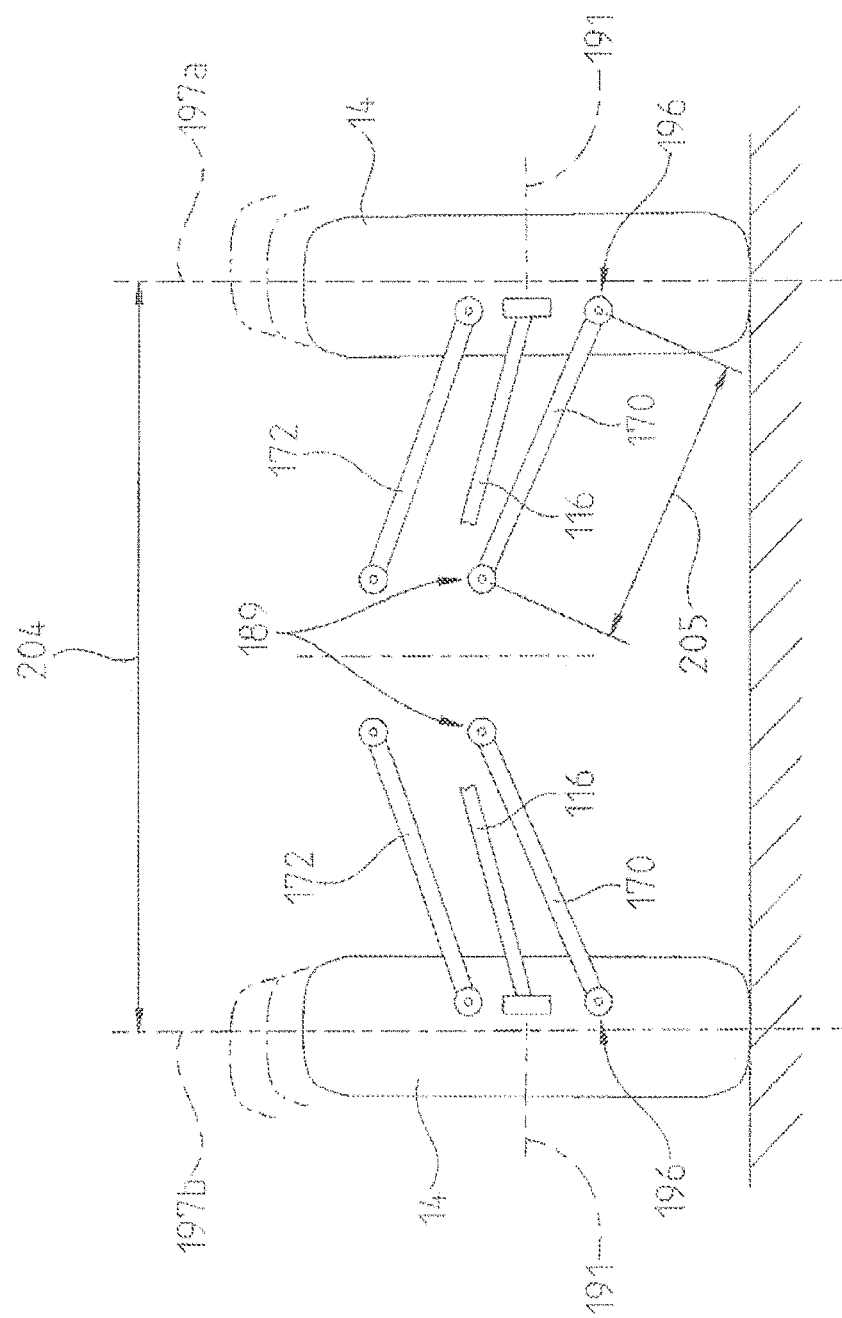
FIG. 26A is a diagrammatical view of the front suspension shown in FIGS. 23-25.

Referring to FIG. 26A, a front track width 204 is defined as the lateral distance between the right and left front wheel center axes 197a and 197b. In the illustrative embodiment, front track width 204 is between about 474 millimeters (about 18.66 inches) and 523 millimeters (about 20.59 inches). In order to facilitate the aforementioned ride and handling characteristics, a high ratio of lower A arm length 205 to track width 204 is desired. In the illustrative embodiment, the length 205 of each lower A arm 170 (between inner and outer pivot couplings 189 and 196) is about 440 millimeters (about 17.32 inches). As such, the ratio of A arm length 205 to track width 204 is illustratively between about 0.84 and 0.93.

Figure 27:
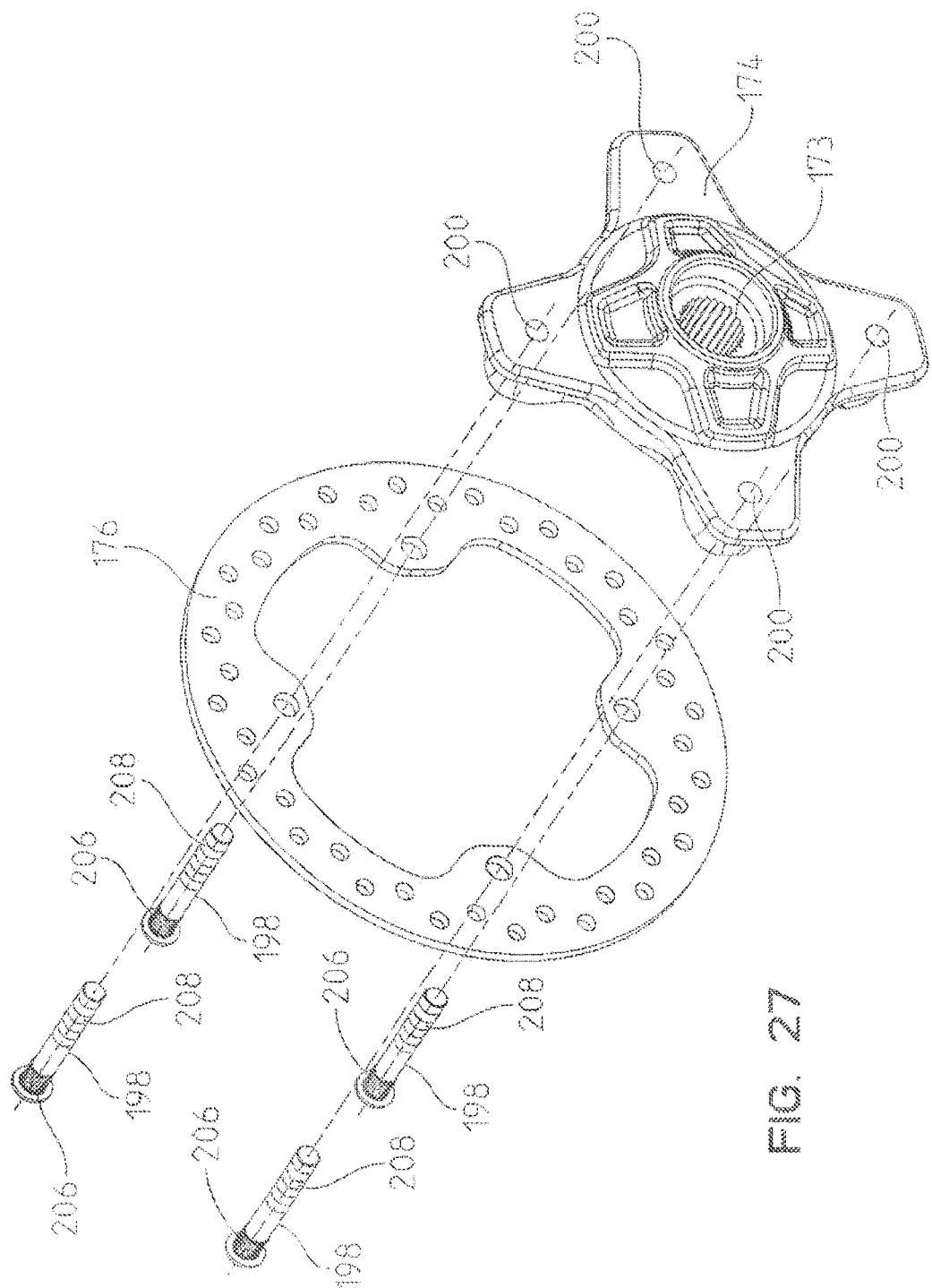
FIG. 27 is an exploded view of the brake disc, hub, and fasteners shown in FIG. 23-25.

Referring to FIGS. 25 and 27, and as noted above, spindle 190 is coupled to hub 174. Hub 174 includes plurality of apertures 200 and internal splined portion 173. Internal splined portion 173 receives one of front axles 116. Brake disc 176 is coupled to hub 174 by fasteners 198 which extend through apertures 200. Serrated or splined portions 206 of fasteners 198 are press fit into frictional engagement with hub 174. Lug nuts 207 are threadably received on a threaded portion 208 of each fastener 198 and engage wheel 12. As such, fasteners 198 act as wheel studs and couple together all of brake disc 176, hub 174, and wheel 12. By fasteners 198 securing brake disc 176 in addition to wheel 12, strength is increased by distributing the load, while reducing cost, weight, part count, and brake noise. In a known manner, brake caliper 178 may be actuated to grip or squeeze brake disc 176 when slowing or stopping ATV 10. Larger (i.e. 14 inch) wheels 12 facilitate the use of greater diameter brake discs 176, thereby providing a larger surface for engagement by the brake caliper 178 and improving braking efficiency. In the illustrative embodiment, each brake disc 176 has an outer diameter of approximately 240 millimeters (approximately 9.45 inches).

Figure 28:
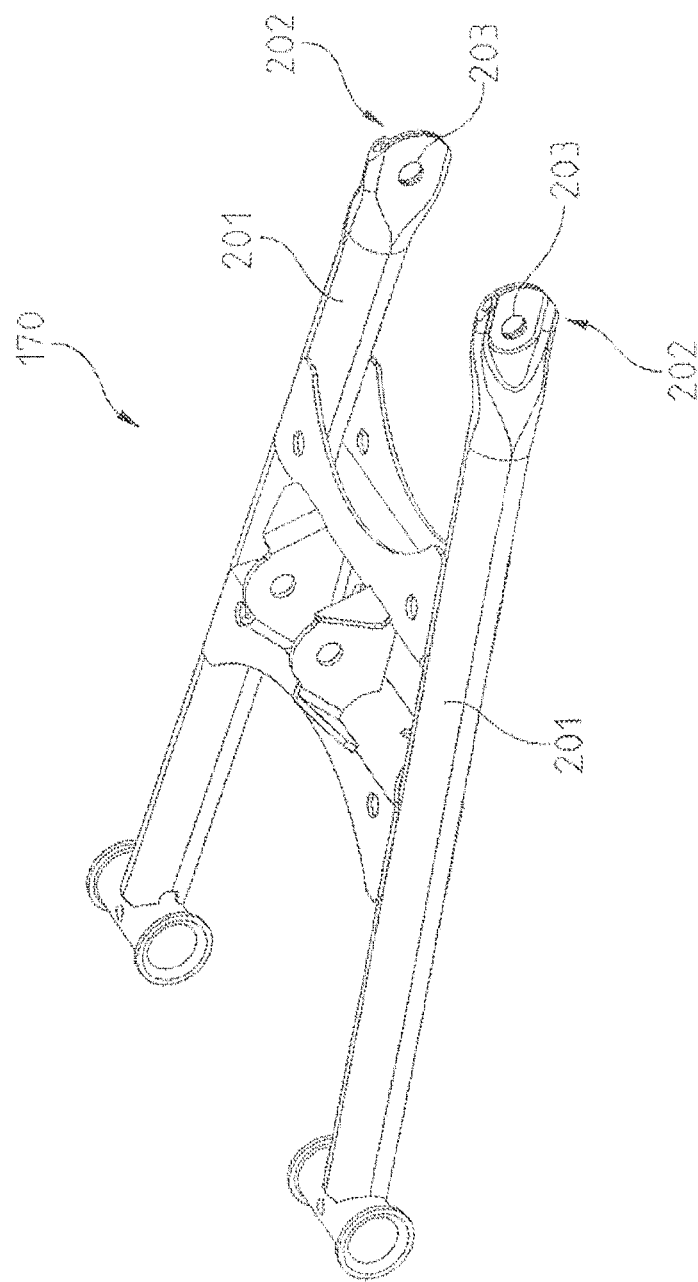
FIG. 28 is a perspective view of a lower A arm shown in FIGS. 23-25.
Figure 29:
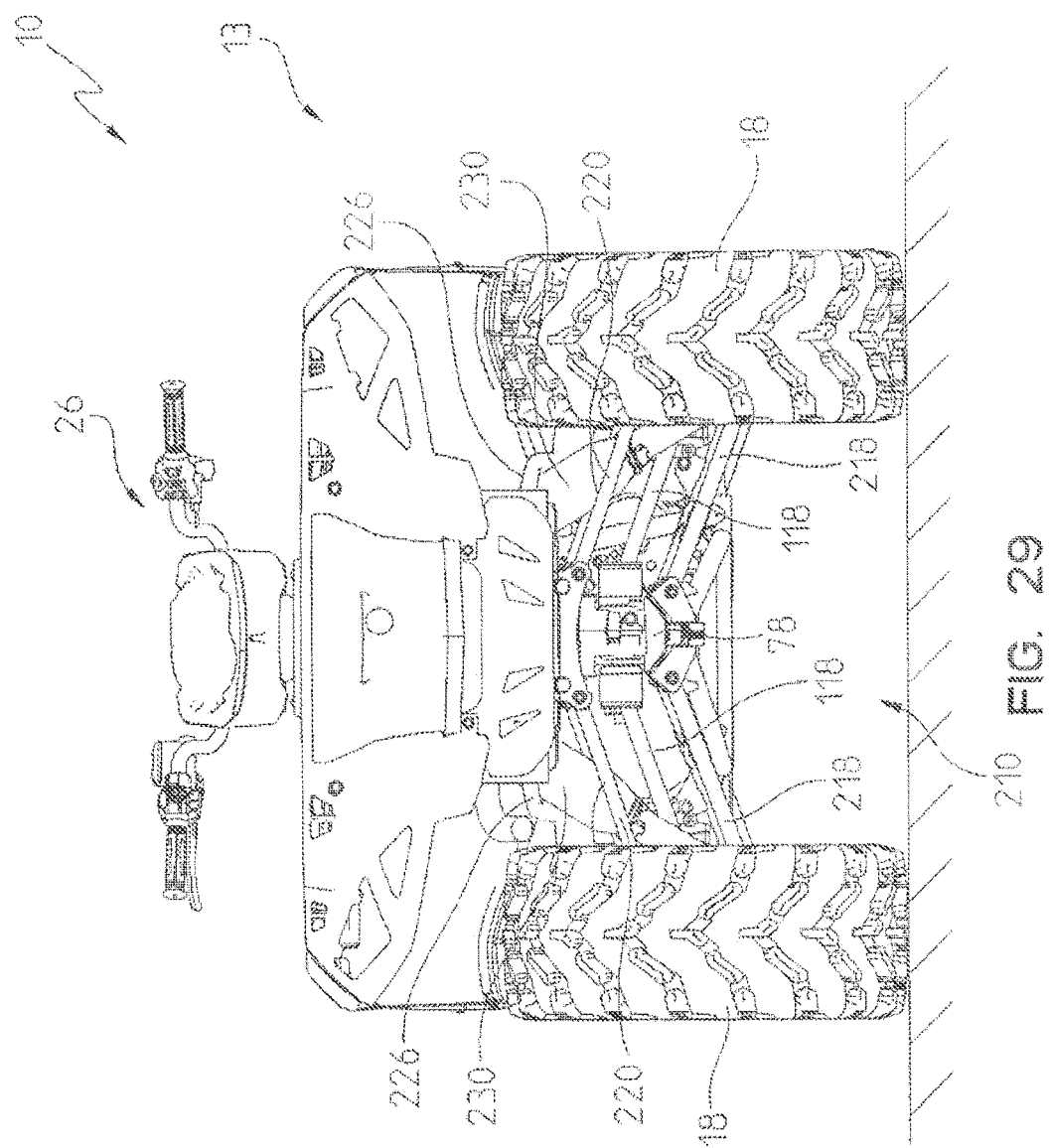
FIG. 29 is a rear view of the ATV shown in FIG. 1.

Referring now to FIG. 28, an exemplary embodiment of lower A arm 170 is shown. For this illustrative embodiment of ATV 10, lower A arm 170 is formed by tubes 201. Tubes 201 include ends 202 which may be used to couple lower A arm 170 to a portion of ball joint 196. Ends 202 are "crushed" or "squeezed" to provide a flat portion to form apertures 203. Crushed ends similar to ends 202 of lower A arm 170 may be used any other suitable tube formed structure of ATV such as frame 50 and upper A arms 172.

Figure 30:
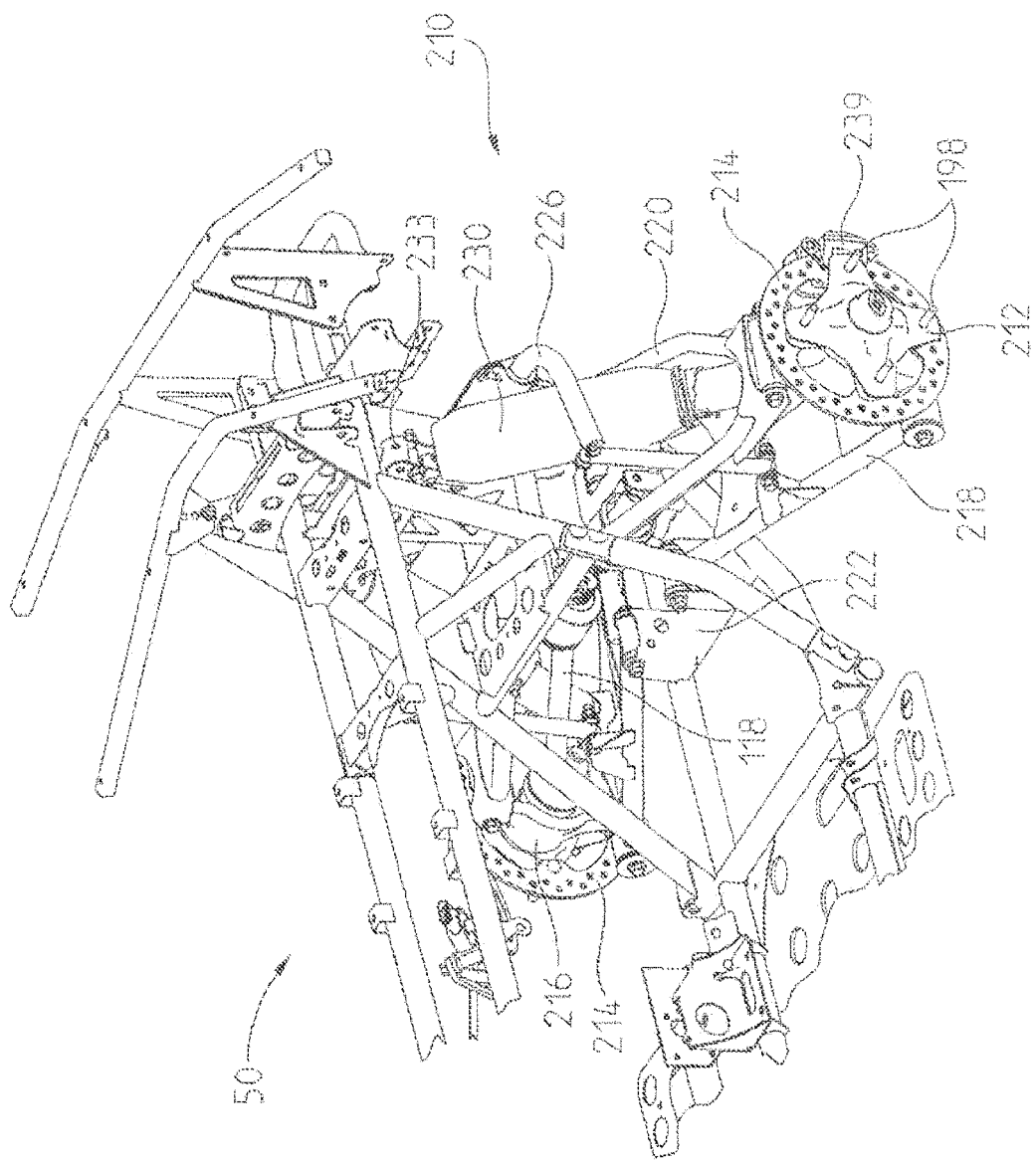
FIG. 30 is a partial perspective view of the rear suspension of the ATV shown in FIG. 1.
Figure 31:
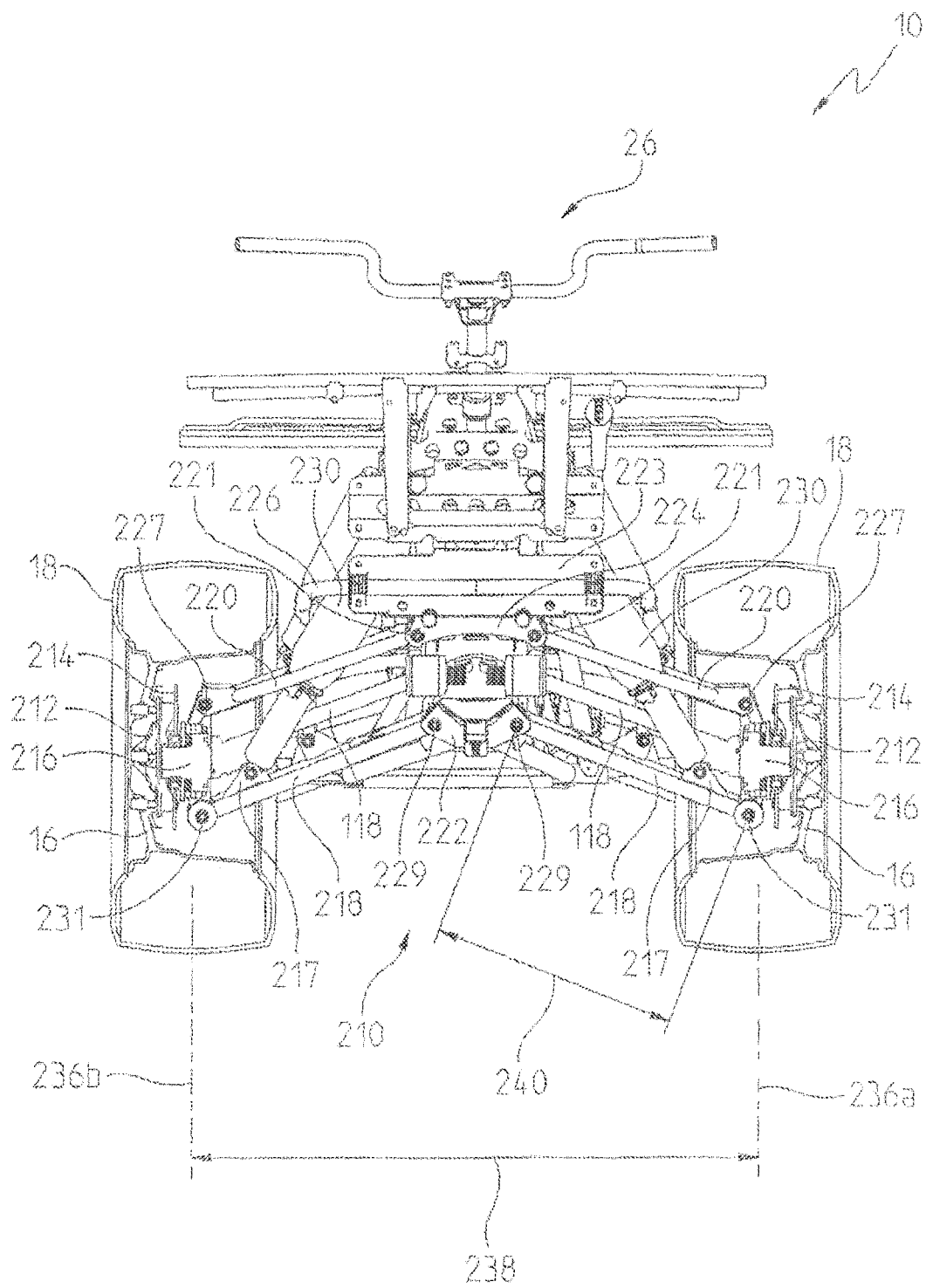
FIG. 31 is front view of the suspension components shown in FIG. 30 with the wheels shown in cross section.
Figure 32:
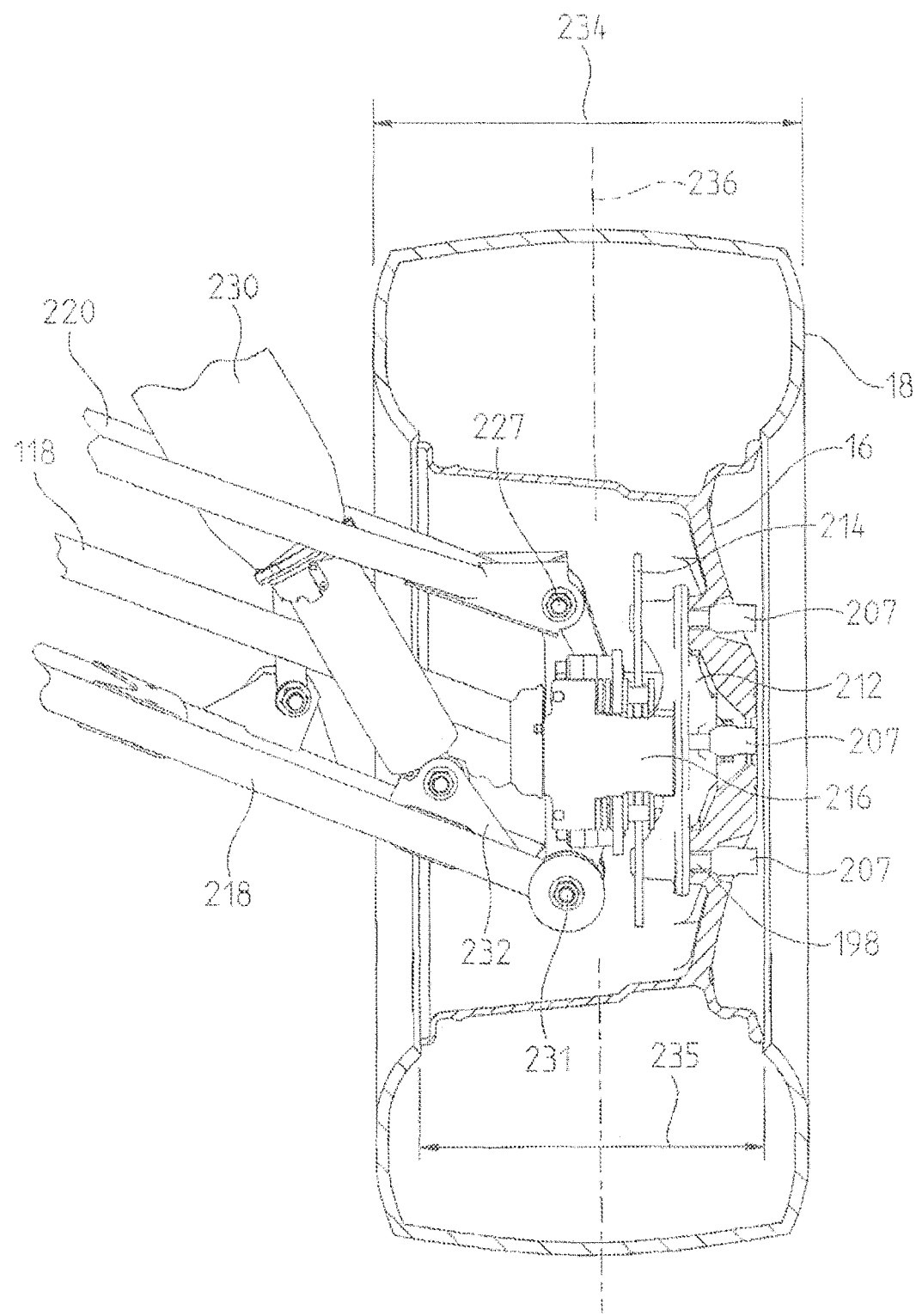
FIG. 32 is a cross-sectional view of one of the rear wheels shown in FIG. 31.

Referring now to FIGS. 29-32, rear suspension 210 of ATV 10 is shown. Rear suspension 210 includes upper and lower control arms, illustratively A arms 220 and 218, on each lateral side of rear end 13 of ATV 10. Upper and lower A arms 220 and 218 couple spindles 216 to rear portion 56 of frame 50. Upper A arms 220 are coupled on one end at upper inner pivot couplings 221 to upper rear frame bracket 224 (FIG. 31). Upper rear frame bracket 224 is also coupled to torsion support 223 which supports torsion bar 226. On the opposing end, upper A arms 220 are coupled at upper outer pivot couplings 227 to spindles 216. Similarly, lower A arms 218 are coupled on one end at lower inner pivot couplings 229 to lower rear frame bracket 222, and to spindles 216 at lower outer pivot couplings 231 on the opposing end.

Rear axles or half shafts 118 extend from rear differential 78 to hubs 216 to power rear wheels 16 of ATV 10. Rear axles 118 are positioned between upper and lower A arms 220 and 218. Shock absorbers 230 are coupled between upper bracket 233 of frame 50 and brackets 217 of lower A arms 218. Shock absorbers 230 extend through an opening of in upper A arms 220 to couple to brackets 217 of lower A arms 218. In operation, shock absorbers 230 dampen the upward and downward movement of frame 50 relative to spindles 216, and thus wheels 16, through the range of motion of upper and lower A arms 220 and 218 during jounce.

Referring further to FIG. 30, a cross-sectional view of one of rear wheels 16 and tires 18 is shown. The orientation of spindles 216 within rear wheels 16 is similar to the orientation of spindles 190 in front wheels 12, discussed above. Properly inflated rear tires 18 define width 234, while rear wheels 16 define width 235. In this illustrative embodiment, width 234 is equal to approximately 279 millimeters (approximately 11 inches), while width 235 is equal to approximately 223.5 millimeters (approximately 8.8 inches). Spindles 216 are positioned in the respective interior cavities of rear wheels 16. Spindles 216 and a portion of upper and lower A arms 220 and 218 are laterally positioned within width 235 of rear wheels 16. As discussed above, this orientation allows upper and lower A arms 220 and 218 to be longer than those in a system in which the spindles 216 are not fully enclosed within the width of the wheel 16. Longer A arms 220 and 218 may lead to a greater range of motion of rear wheels 16 and reduce the angle of rear axles 118 coupling with spindles 216 relative to horizontal.

Referring further to FIG. 31, rear wheel 16 and tire 18 define a rear wheel center axis 236. A rear track width 238 is defined as the lateral distance between the right and left rear wheel center axes 236a and 236b. In the illustrative embodiment, rear track width 238 is between about 455 millimeters (about 17.91 inches) and 502 millimeters (about 19.76 inches). In the illustrative embodiment, the length 240 of each lower A arm 218 (between pivot couplings 229 and 231) is about 424 millimeters (about 16.69 inches). As such, the ratio of A arm length 240 to track width 238 is illustratively between about 0.84 and 0.93.

With further reference to FIGS. 30 and 42, spindles 216 are coupled to hubs 212 which are similar to hubs 174 (FIGS. 25 and 27). Brake disc 214 is coupled to hub 212 by fasteners 198. Rear wheels 16 are coupled to hubs 212 by lug nuts 207 engaging fasteners 198. Brake discs 214 are squeezed by brake calipers 239 when a brake of ATV 10 is actuated and may be of a similar design as brake discs 176 detailed above.

Front suspension 30 and rear suspension 210 may include certain elements of the Predator™ brand ATV and the Outlaw™ brand ATV, both available from Polaris Industries, the assignee of the present disclosure. Details of the Predator™ brand ATV suspension are disclosed in U.S. Pat. Nos. 6,767,022, 7,000,931, and 7,004,484, the disclosures of which are expressly incorporated by reference herein. Details of the Outlaw™ brand ATV suspension are disclosed in U.S. patent application Ser. No. 11/528,889, filed Sep. 27, 2006, and U.S. patent application Ser. No. 11/543,430, filed Oct. 5, 2006, both of which claim the benefit of U.S. Ser. No. 60/813,597, filed Feb. 1, 2006, the disclosures of which are expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising
a plurality of ground engaging members including at least one front ground engaging member and at least one rear ground engaging member;
a frame supported by the plurality of ground engaging members;
a straddle operator seat supported by the frame;
an engine supported by the frame and positioned longitudinally rearward of at least a portion of the at least one front ground engaging member and longitudinally forward of the at least one rear ground engaging member, at least a portion of the engine being positioned forward of at least a portion of the straddle operator seat; and
a continuously variable transmission (CVT) supported by the frame and operatively coupling the engine to the at least one rear ground engaging member, the CVT having a drive clutch operatively coupled to the engine and a driven clutch operatively coupled to the drive clutch through a drive belt, the drive clutch, driven clutch, and drive belt being positioned in a housing, the drive clutch and the driven clutch both being positioned completely longitudinally rearward of the engine.

2. The vehicle of claim 1, further comprising a rear transmission shaft coupling the CVT to the at least one rear ground engaging member, the rear transmission shaft being laterally offset from a longitudinal axis of the vehicle.

3. The vehicle of claim 2, further comprising a plurality of gears coupling the rear transmission shaft to the at least one rear ground engaging member.

4. The vehicle of claim 1, further comprising a fuel tank positioned rearward of the at least one front ground engaging member and forward of at least a portion of the straddle operator seat.

5. The vehicle of claim 4, wherein at least a portion of the fuel tank is positioned forward of at least a portion of the housing of the CVT.

6. The vehicle of claim 5, wherein at least a portion of the housing of the CVT is positioned forward of at least a portion of the straddle operator seat.

7. The vehicle of claim 1, further comprising a steering system including a handlebar, at least a portion of the handlebar being positioned completely rearward of the at least one front ground engaging member.

8. The vehicle of claim 1, wherein the at least one front engaging ground member includes two front engaging ground members.

9. The vehicle of claim 1, wherein a lateral extent of at least one side of the housing of the CVT extends further out than a lateral extent of at least one side of the engine.

10. The vehicle of claim 1, wherein the drive clutch is positioned vertically below the driven clutch.

11. A vehicle, comprising
a plurality of ground engaging members including at least one front ground engaging member and at least one rear ground engaging member;
a frame supported by the plurality of ground engaging members;
a straddle operator seat supported by the frame;
an engine supported by the frame and positioned longitudinally rearward of at least a portion of the at least one front ground engaging member and longitudinally forward of the at least one rear ground engaging member; and
a continuously variable transmission (CVT) supported by the frame and operatively coupling the engine to the at least one rear ground engaging member via a rear transmission shaft, the CVT having a drive clutch operatively coupled to the engine and a driven clutch operatively coupled to the drive clutch through a drive belt, the drive clutch, driven clutch, and drive belt being positioned in a housing, the drive clutch and the driven clutch both being positioned completely longitudinally rearward of the engine, and the rear transmission shaft being laterally offset from a longitudinal axis of the vehicle.

12. The vehicle of claim 11, further comprising a plurality of gears coupling the rear transmission shaft to the at least one rear ground engaging member.

13. The vehicle of claim 11, wherein a bottom portion of the engine is wider than a top portion of the engine.

14. A vehicle, comprising
a plurality of ground engaging members including at least one front ground engaging member and at least one rear ground engaging member;
a frame supported by the plurality of ground engaging members;
a straddle operator seat supported by the frame;
an engine supported by the frame and positioned longitudinally rearward of at least a portion of the at least one front ground engaging member and longitudinally forward of the at least one rear ground engaging member;
a continuously variable transmission (CVT) supported by the frame and operatively coupling the engine to the at least one rear ground engaging member via a rear transmission shaft, the CVT having a drive clutch operatively coupled to the engine and a driven clutch operatively coupled to the drive clutch through a drive belt, the drive clutch, driven clutch, and drive belt being positioned in a housing, the drive clutch and the driven clutch both being positioned completely longitudinally rearward of the engine; and
a fuel tank positioned rearward of the at least one front ground engaging member and forward of at least a portion of the straddle operator seat.

15. The vehicle of claim 14, wherein a bottom portion of the engine is wider than a top portion of the engine.

16. The vehicle of claim 14, wherein at least a portion of the housing of the CVT is positioned forward of at least a portion of the straddle operator seat.

17. A vehicle, comprising
a frame;
a plurality of ground engaging members supporting the frame, the plurality of ground engaging members including a left front ground engaging member positioned completely to a first side of a vertically extending longitudinal centerline of the vehicle and rotatable about a first axis, a right front ground engaging member positioned completely to a second side of the vertically extending longitudinal centerline of the vehicle, the second side being opposite the first side, and a third ground engaging member positioned completely rearward of the first ground engaging member and the second ground engaging member and rotatable about a second axis;
a straddle operator seat supported by the frame and positioned forward of the second axis of the third ground engaging member and rearward of the first axis of the first ground engaging member;
an engine supported by the frame and positioned forward of the second axis of the third ground engaging member and rearward of the first axis of the first ground engaging member; and
a continuously variable transmission (CVT) supported by the frame and operatively coupling the engine to the third ground engaging member, the CVT having a drive clutch operatively coupled to the engine and a driven clutch operatively coupled to the drive clutch, the drive clutch and the driven clutch being positioned in a housing, the drive clutch and the driven clutch both being positioned completely longitudinally rearward of the engine and forward of the second axis of the third ground engaging member, the drive clutch being rotatable about a third axis, the third axis being angled relative to the second axis.

18. The vehicle of claim 17, wherein the third axis is substantially perpendicular to the second axis.

* * * * *